(12) United States Patent
Ohashi

(10) Patent No.: US 9,470,881 B2
(45) Date of Patent: Oct. 18, 2016

(54) ZOOM LENS AND IMAGING DEVICE USING ZOOM LENS

(71) Applicant: Kazuyasu Ohashi, Funabashi (JP)

(72) Inventor: Kazuyasu Ohashi, Funabashi (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/516,942

(22) Filed: Oct. 17, 2014

(65) Prior Publication Data
US 2015/0116829 A1  Apr. 30, 2015

(30) Foreign Application Priority Data

Oct. 25, 2013 (JP) ................. 2013-222249
Oct. 25, 2013 (JP) ................. 2013-222272

(51) Int. Cl.
| | | |
|---|---|---|
| G02B 15/00 | (2006.01) | |
| G02B 15/17 | (2006.01) | |
| G02B 15/16 | (2006.01) | |
| G02B 15/20 | (2006.01) | |
| G02B 15/173 | (2006.01) | |
| G02B 13/00 | (2006.01) | |

(52) U.S. Cl.
CPC ............. *G02B 15/17* (2013.01); *G02B 13/009* (2013.01); *G02B 15/00* (2013.01); *G02B 15/16* (2013.01); *G02B 15/173* (2013.01); *G02B 15/20* (2013.01)

(58) Field of Classification Search
CPC ...... G02B 15/00; G02B 15/02; G02B 15/04; G02B 15/08; G02B 15/10; G02B 15/12; G02B 15/14; G02B 15/15; G02B 15/155; G02B 15/16; G02B 15/167; G02B 15/17; G02B 15/177; G02B 15/20; G02B 15/22; G02B 15/24; G02B 15/26

USPC ............... 359/558, 676, 677, 682–687, 688, 359/693–695
See application file for complete search history.

(56) References Cited

U.S. PATENT DOCUMENTS

| | | | | |
|---|---|---|---|---|
| 4,518,228 A | * | 5/1985 | Sugiura | G02B 15/17 359/663 |
| 4,576,445 A | * | 3/1986 | Inadome | G02B 15/17 359/688 |
| 5,050,972 A | * | 9/1991 | Mukaiya | G02B 15/167 359/676 |
| 5,153,779 A | | 10/1992 | Ohashi | |

(Continued)

FOREIGN PATENT DOCUMENTS

| | | |
|---|---|---|
| JP | 10-54937 | 2/1998 |
| JP | 11-174327 | 7/1999 |

(Continued)

OTHER PUBLICATIONS

Extended European Search Report issued Feb. 26, 2015 in Patent Application No. 14190132.2.

*Primary Examiner* — Bumsuk Won
*Assistant Examiner* — William R Alexander
(74) *Attorney, Agent, or Firm* — Oblon, McClelland, Maier & Neustadt, L.L.P.

(57) ABSTRACT

A zoom lens includes, in order from an object side to an image surface side, a first lens group having a positive refractive power, a second lens group having a negative refractive power, a third lens group having a negative refractive power, and a fourth lens group having a positive refractive power, the second lens group and the third lens group are moved such that the second lens group is located on a most object side at a wide-angle end and the third lens group is located on a most image surface side at a telephoto end during zooming.

18 Claims, 62 Drawing Sheets

(56) References Cited

U.S. PATENT DOCUMENTS

| | | | |
|---|---|---|---|
| 5,398,135 A | 3/1995 | Ohashi | |
| 5,576,891 A | 11/1996 | Ohashi | |
| 5,581,319 A | 12/1996 | Ohashi | |
| 5,617,254 A | 4/1997 | Ohashi | |
| 5,630,188 A | 5/1997 | Ohashi | |
| 5,687,401 A | 11/1997 | Kawamura et al. | |
| 5,815,322 A | 9/1998 | Enomoto et al. | |
| 5,841,588 A * | 11/1998 | Suzuki | G02B 27/646 359/554 |
| 5,898,525 A * | 4/1999 | Suzuki | G02B 15/17 359/684 |
| 5,917,658 A * | 6/1999 | Yamanashi | G02B 15/173 359/676 |
| 5,930,056 A | 7/1999 | Ohashi | |
| 6,055,114 A * | 4/2000 | Ohtake | G02B 15/17 359/676 |
| 6,285,501 B1 * | 9/2001 | Suzuki | G02B 27/646 359/554 |
| 6,353,506 B1 | 3/2002 | Ohashi | |
| 2002/0024745 A1 | 2/2002 | Ohashi | |
| 2002/0060855 A1 | 5/2002 | Ohashi | |
| 2002/0101665 A1 | 8/2002 | Ohashi et al. | |
| 2003/0210473 A1 | 11/2003 | Ohashi | |
| 2004/0004772 A1 | 1/2004 | Ohashi et al. | |
| 2004/0008420 A1 | 1/2004 | Ohashi | |
| 2004/0136088 A1 | 7/2004 | Ohashi | |
| 2005/0036208 A1 | 2/2005 | Ohashi | |
| 2005/0094002 A1 | 5/2005 | Ohashi | |
| 2005/0094285 A1 | 5/2005 | Ohashi | |
| 2005/0122596 A1 | 6/2005 | Ohashi | |
| 2005/0190457 A1 | 9/2005 | Ohashi | |
| 2005/0270663 A1 | 12/2005 | Ohashi | |
| 2006/0193062 A1 | 8/2006 | Ohashi | |
| 2006/0262422 A1 | 11/2006 | Ohashi | |
| 2007/0097517 A1 | 5/2007 | Ohashi | |
| 2007/0297068 A1 | 12/2007 | Ohashi | |
| 2008/0106799 A1 | 5/2008 | Ohashi | |
| 2008/0151384 A1 | 6/2008 | Suzaki et al. | |
| 2008/0151385 A1 | 6/2008 | Ohashi | |
| 2008/0198477 A1 | 8/2008 | Ohashi | |
| 2008/0204894 A1 | 8/2008 | Ohashi | |
| 2008/0239504 A1 | 10/2008 | Tsutsumi | |
| 2009/0046199 A1 * | 2/2009 | Nanjo | G02B 15/173 348/347 |
| 2009/0080088 A1 | 3/2009 | Ohashi | |
| 2009/0091841 A1 | 4/2009 | Ohashi | |
| 2009/0135496 A1 * | 5/2009 | Nagahara | G02B 15/17 359/682 |
| 2010/0007967 A1 | 1/2010 | Ohashi | |
| 2010/0027136 A1 | 2/2010 | Ohashi et al. | |
| 2010/0271710 A1 | 10/2010 | Ohashi | |
| 2011/0310496 A1 | 12/2011 | Kubota et al. | |
| 2011/0317285 A1 | 12/2011 | Ohashi et al. | |
| 2012/0212838 A1 | 8/2012 | Ohashi | |
| 2012/0224269 A1 | 9/2012 | Sakamoto | |
| 2013/0194488 A1 | 8/2013 | Kubota et al. | |
| 2013/0194681 A1 | 8/2013 | Ohashi et al. | |
| 2013/0201565 A1 * | 8/2013 | Yamanaka | G02B 15/17 359/684 |
| 2013/0242169 A1 | 9/2013 | Okubo | |
| 2013/0258130 A1 | 10/2013 | Mihara et al. | |
| 2013/0258497 A1 * | 10/2013 | Aoi | G02B 15/17 359/688 |
| 2013/0265649 A1 | 10/2013 | Ohashi | |
| 2013/0321936 A1 | 12/2013 | Ohashi | |
| 2014/0016214 A1 | 1/2014 | Kubota et al. | |
| 2014/0078605 A1 | 3/2014 | Ohashi | |
| 2014/0126072 A1 | 5/2014 | Ohashi et al. | |
| 2014/0139932 A1 | 5/2014 | Ohashi | |

FOREIGN PATENT DOCUMENTS

| | | |
|---|---|---|
| JP | 2008-158062 | 7/2008 |
| JP | 2008-197534 | 8/2008 |
| JP | 2008-241884 | 10/2008 |
| JP | 2012-185272 | 9/2012 |
| JP | 2013-24936 | 2/2013 |
| JP | 2013-161005 | 8/2013 |

* cited by examiner

FIG.1
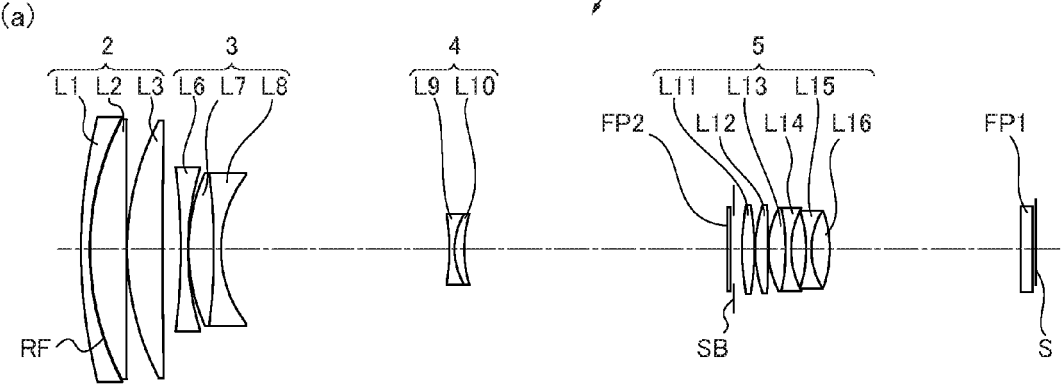
(a)
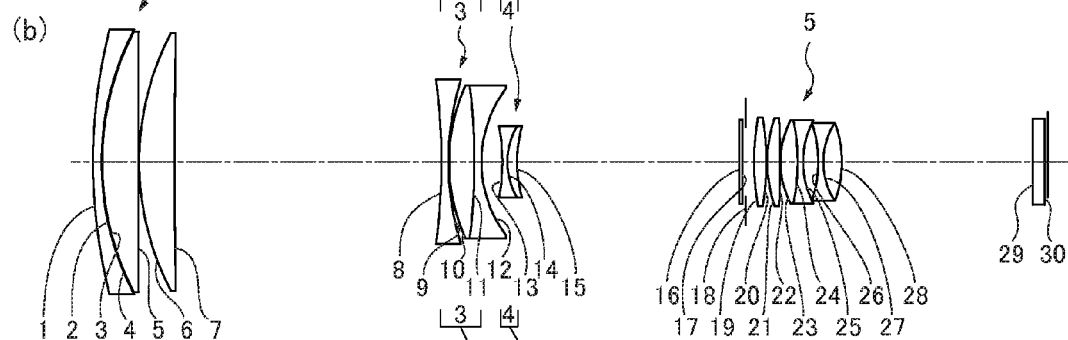
(b)
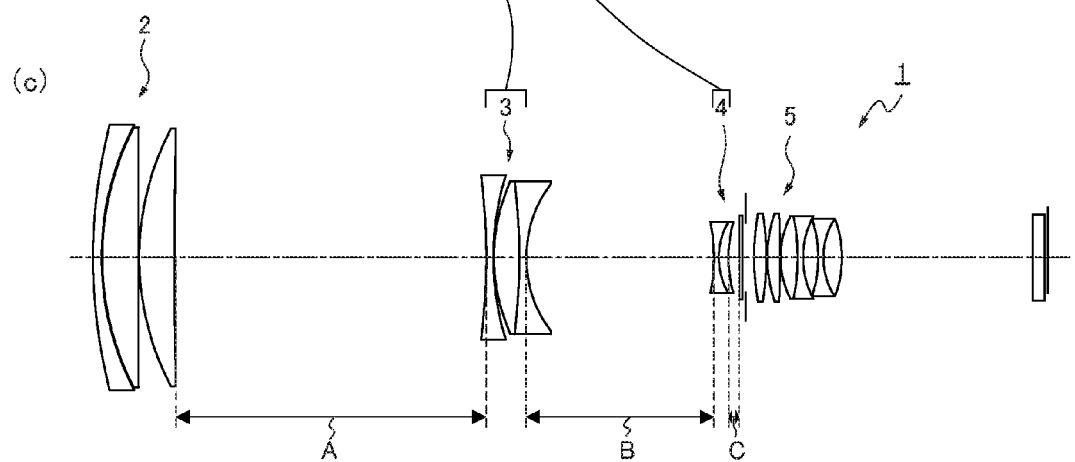
(c)

FIG.2
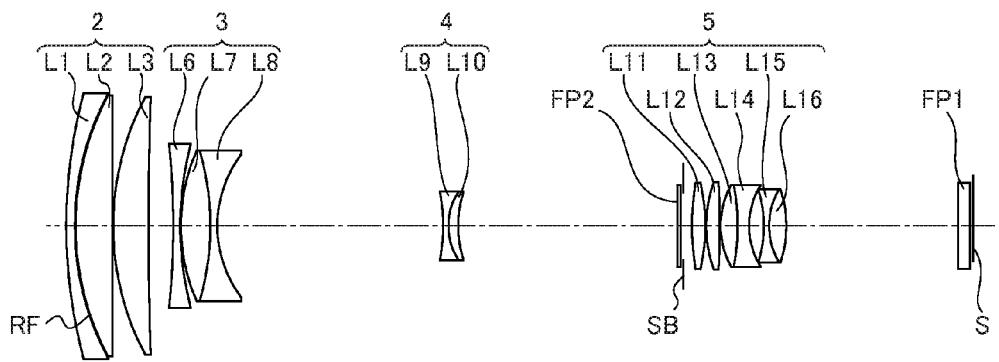
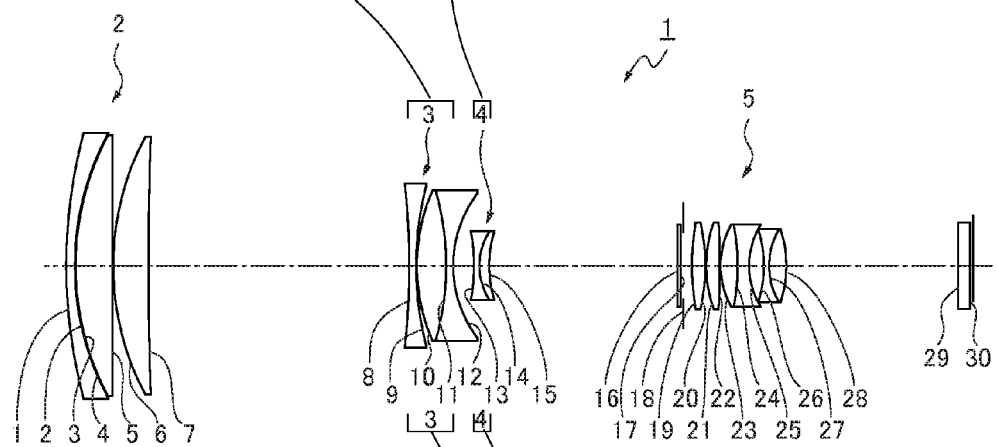
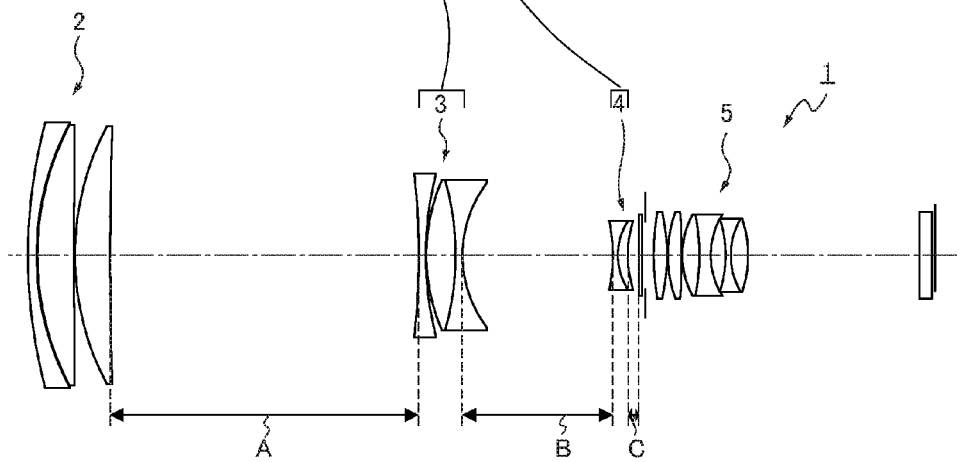

FIG.3
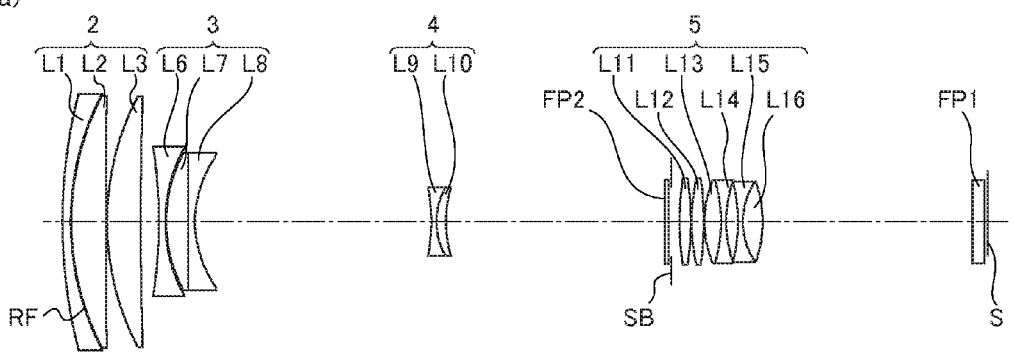
(a)
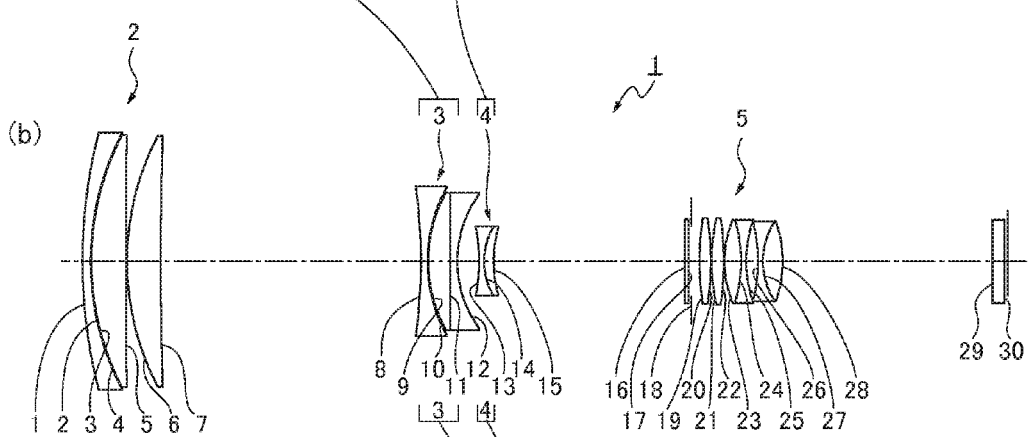
(b)
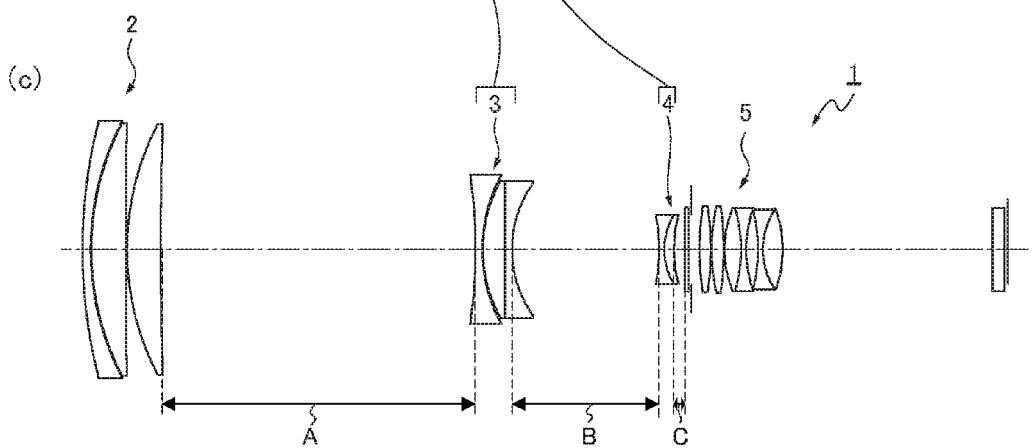
(c)

FIG.4
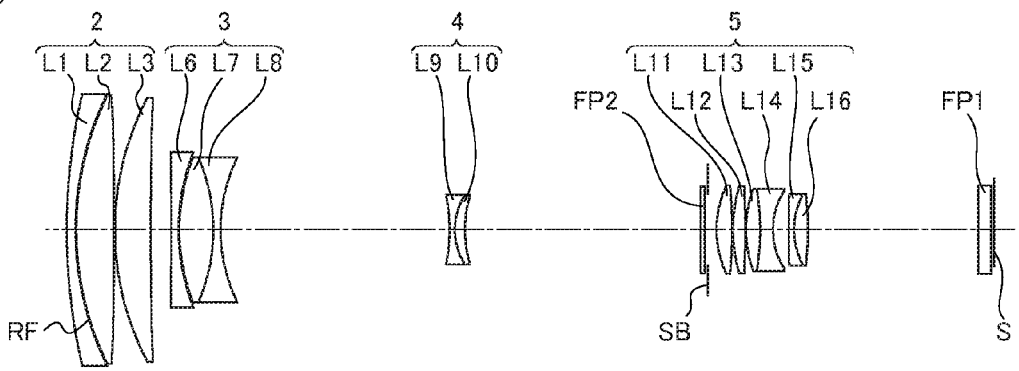
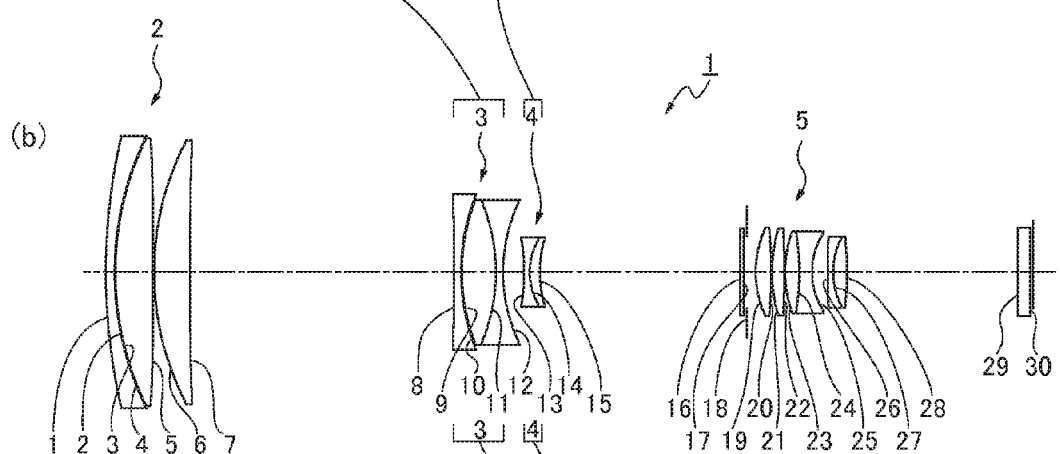
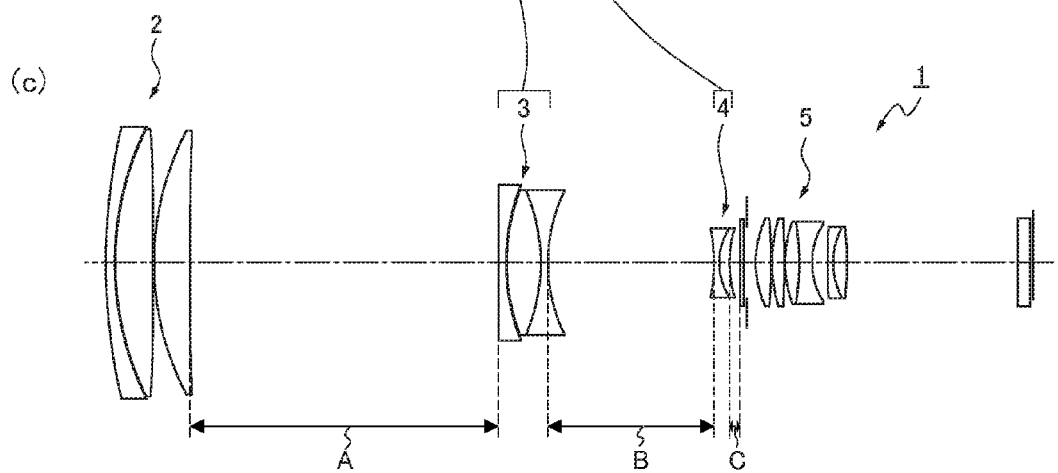

FIG.5
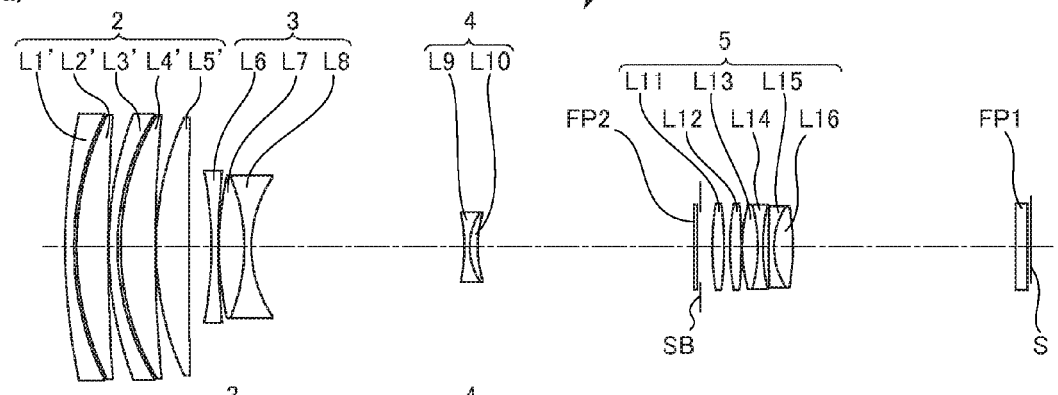
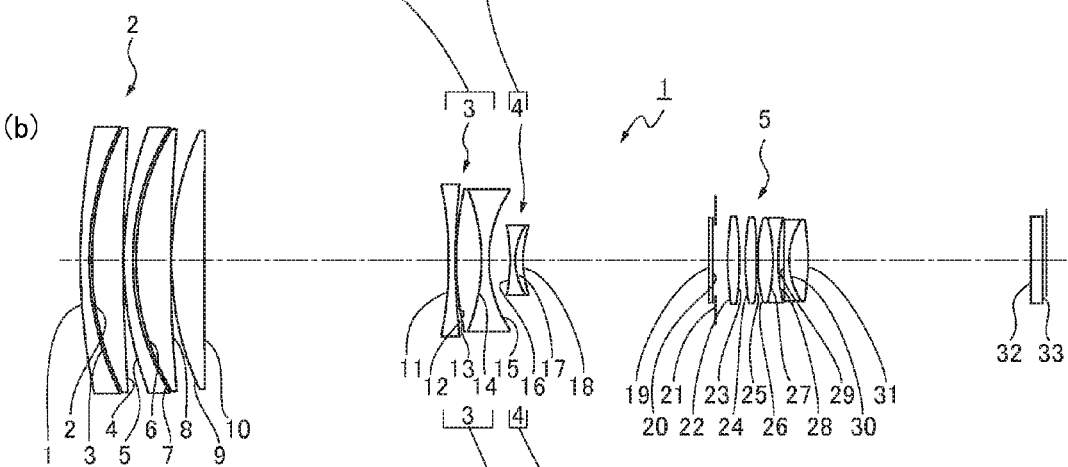
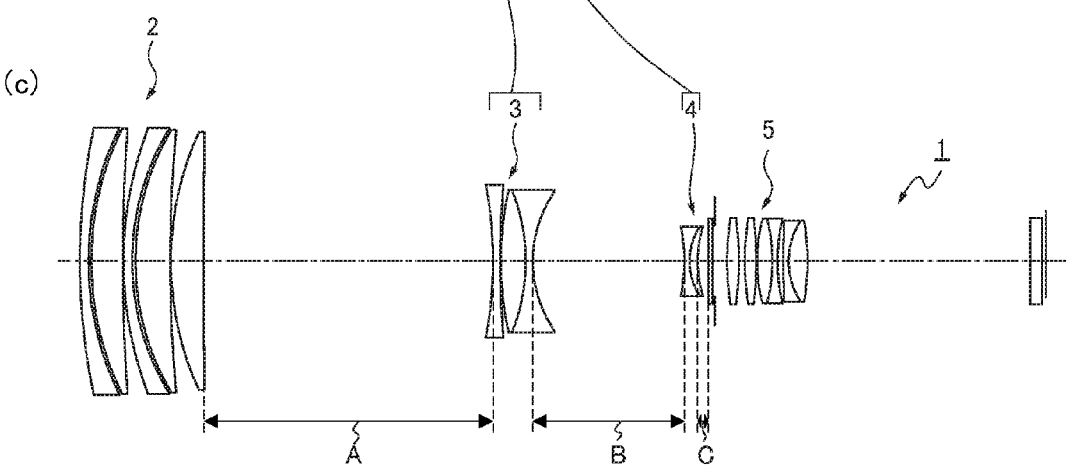

FIG.22
(a)
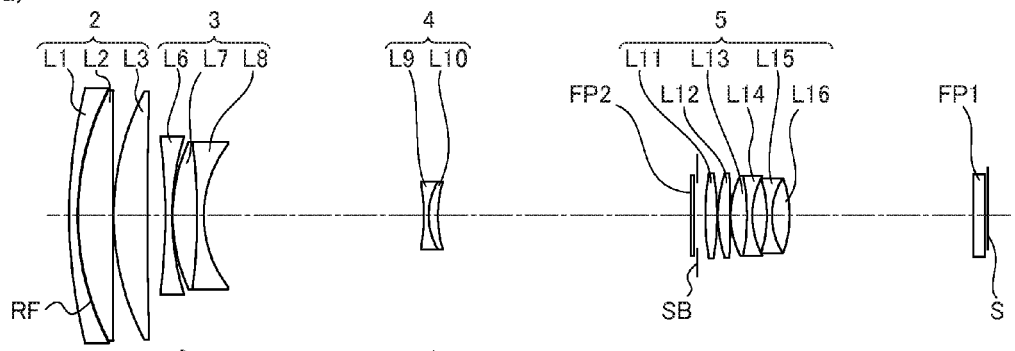
(b)
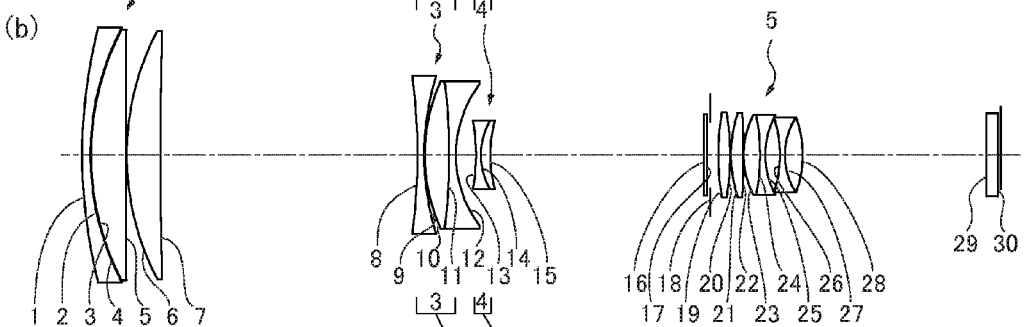
(c)
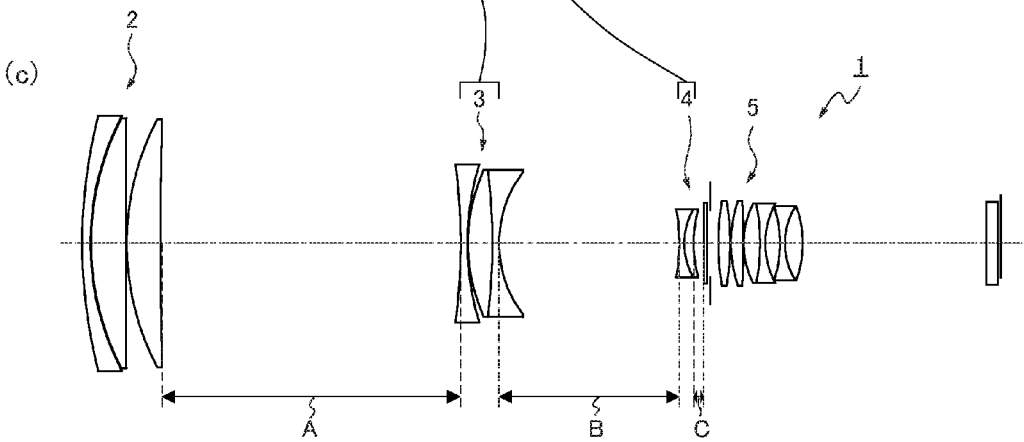

FIG.24
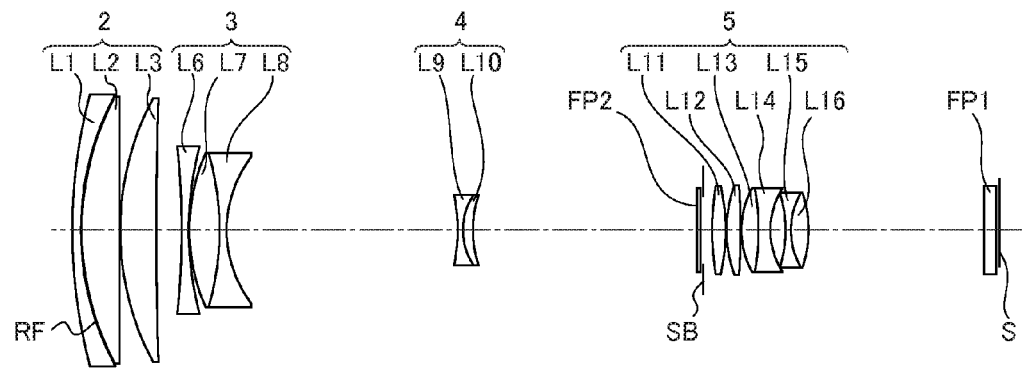
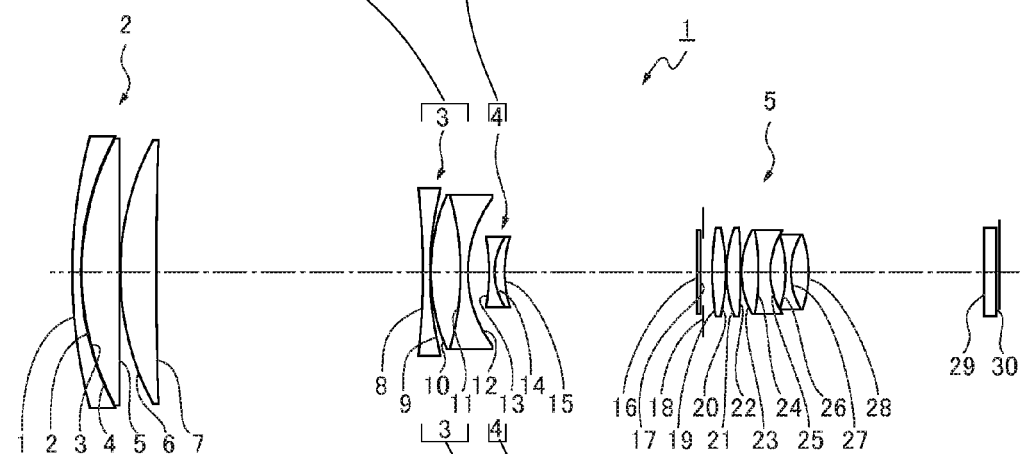
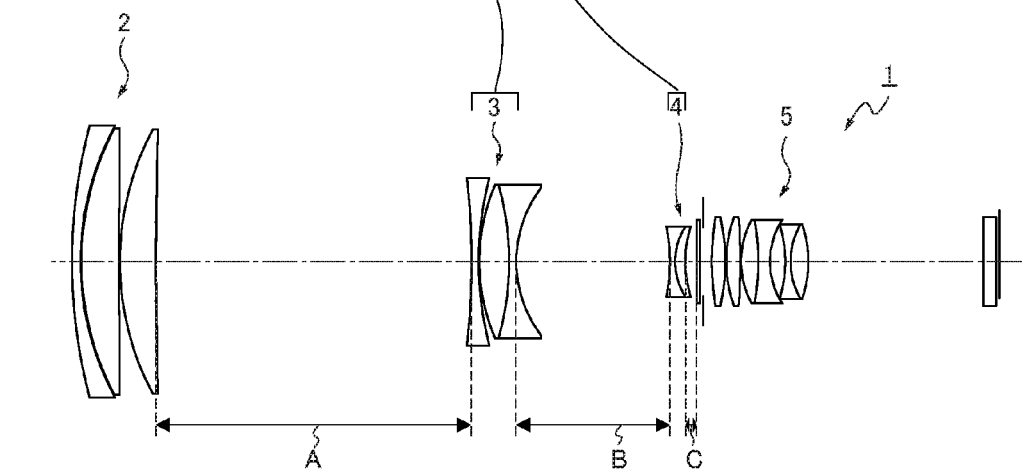

FIG.25
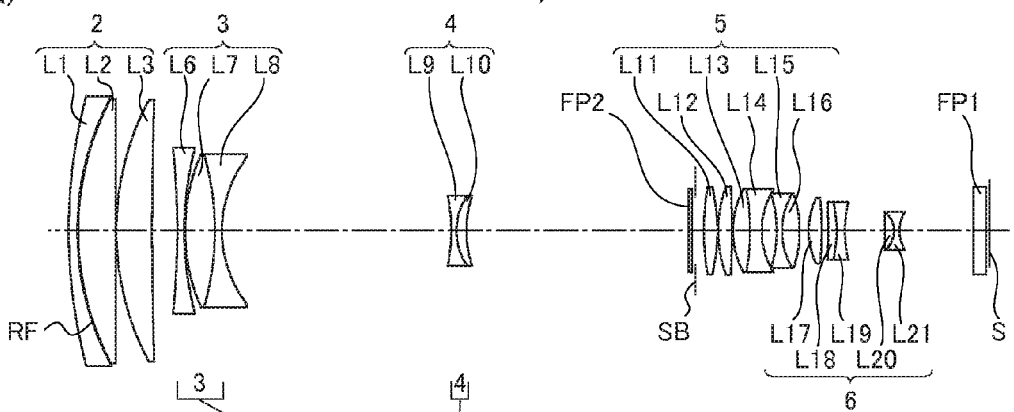
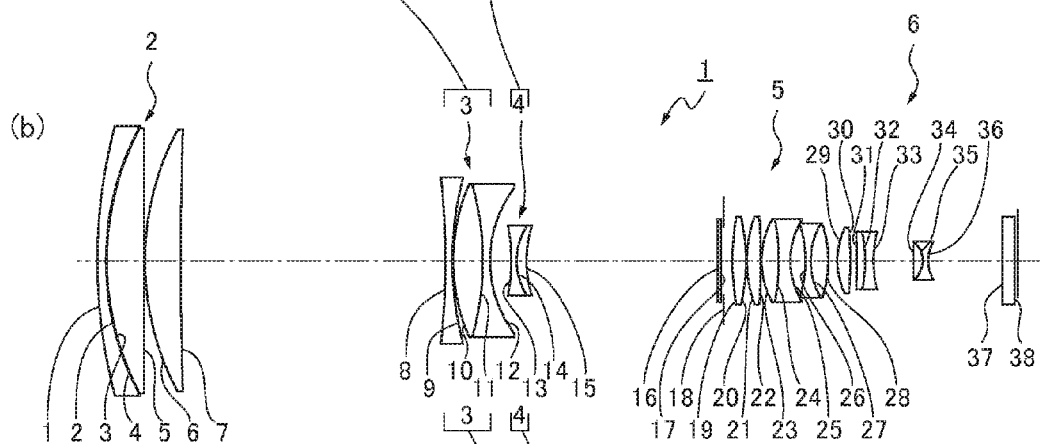
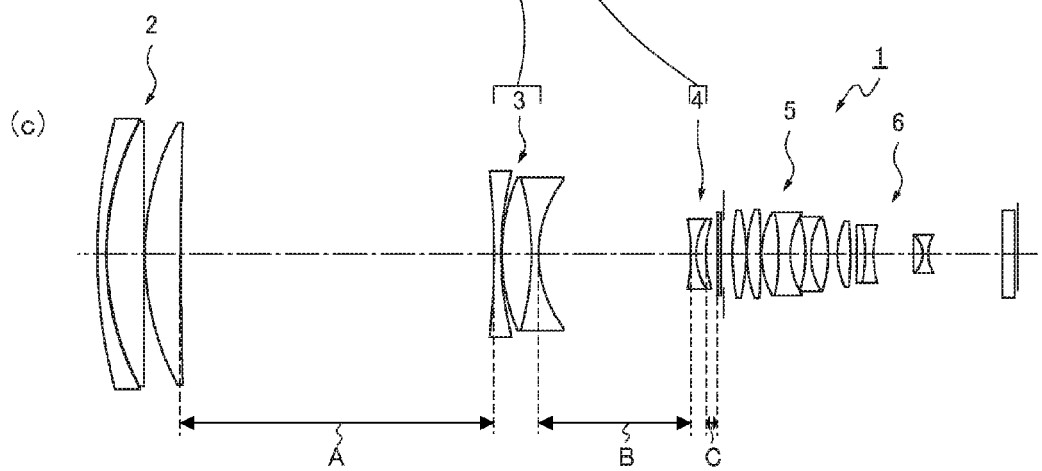

FIG.26
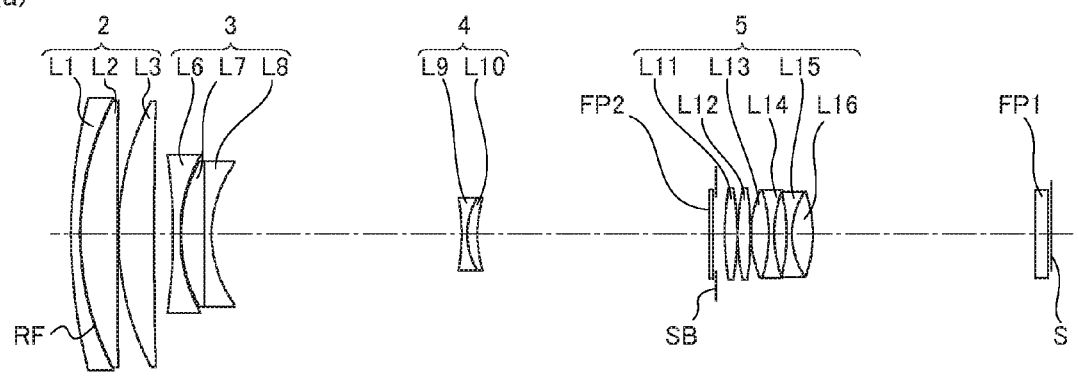
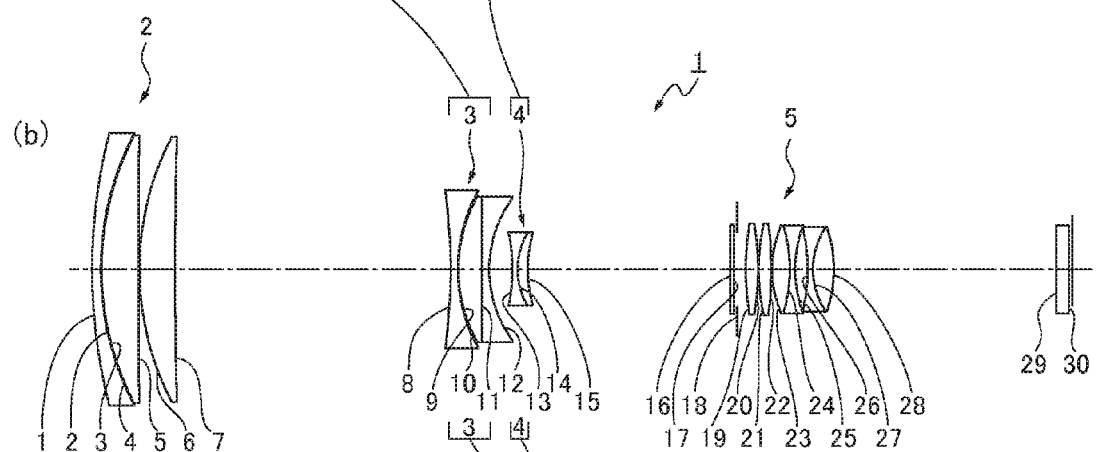
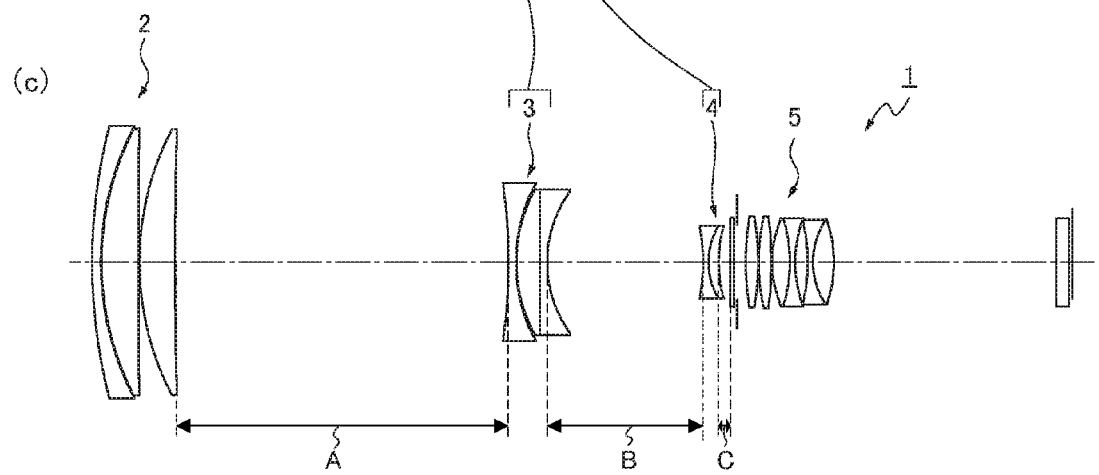

FIG.29
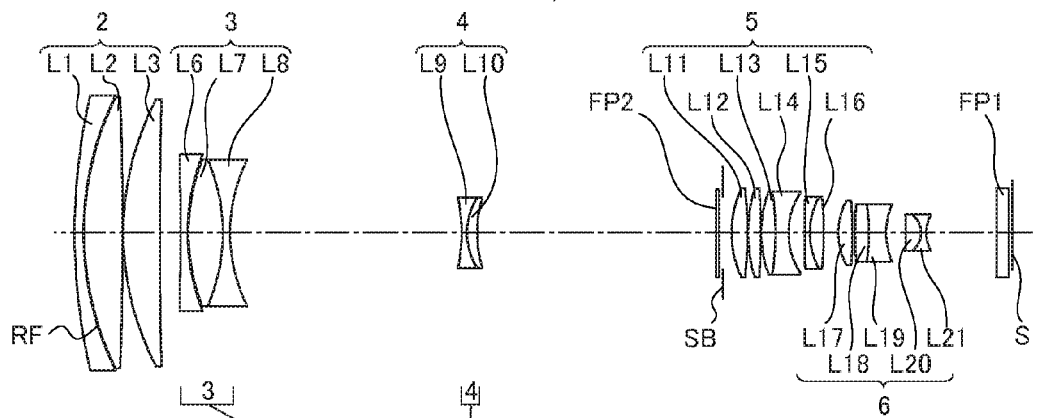
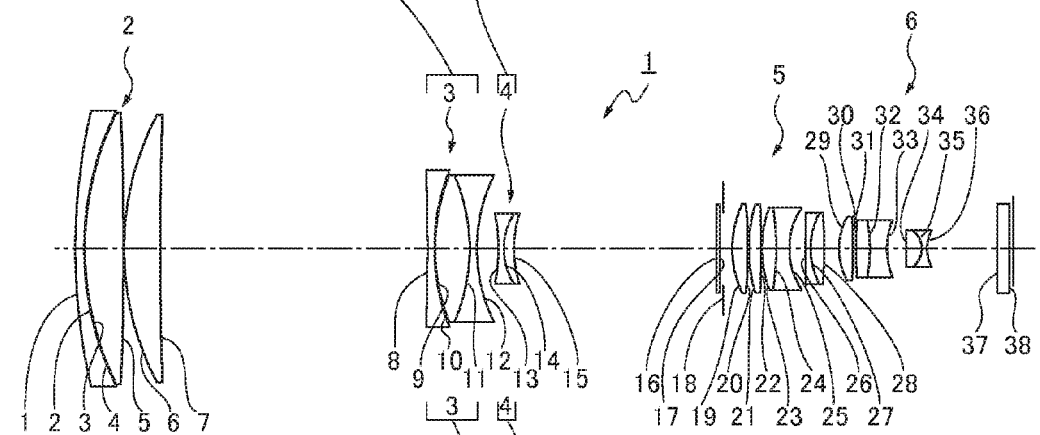
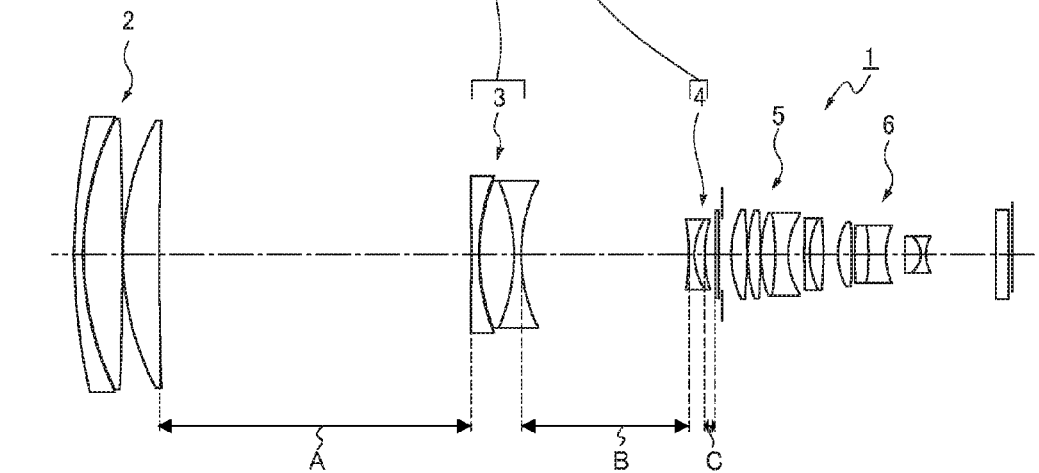

FIG.30
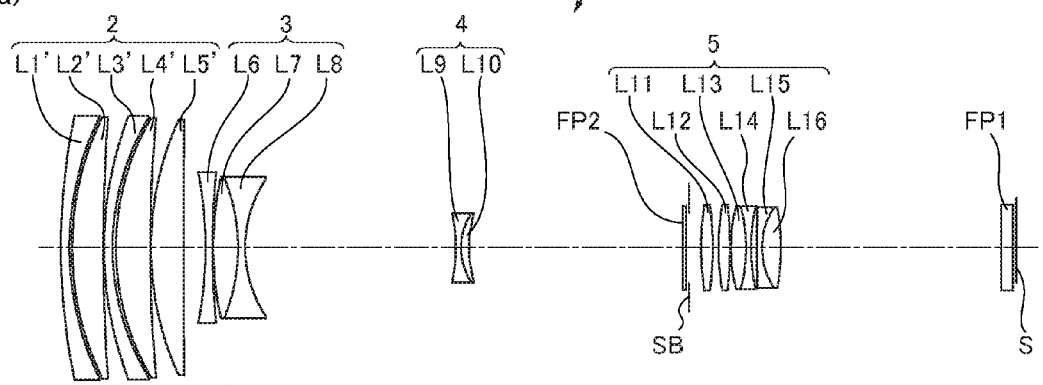
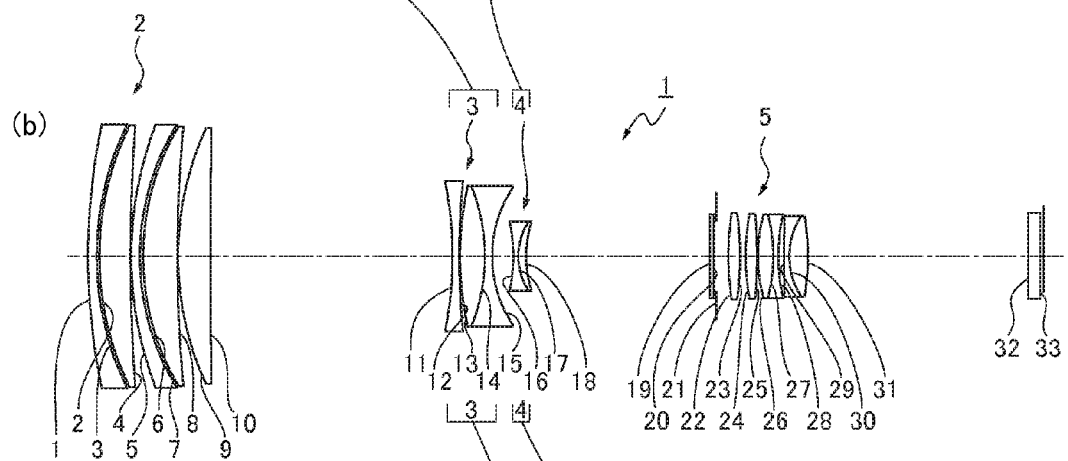
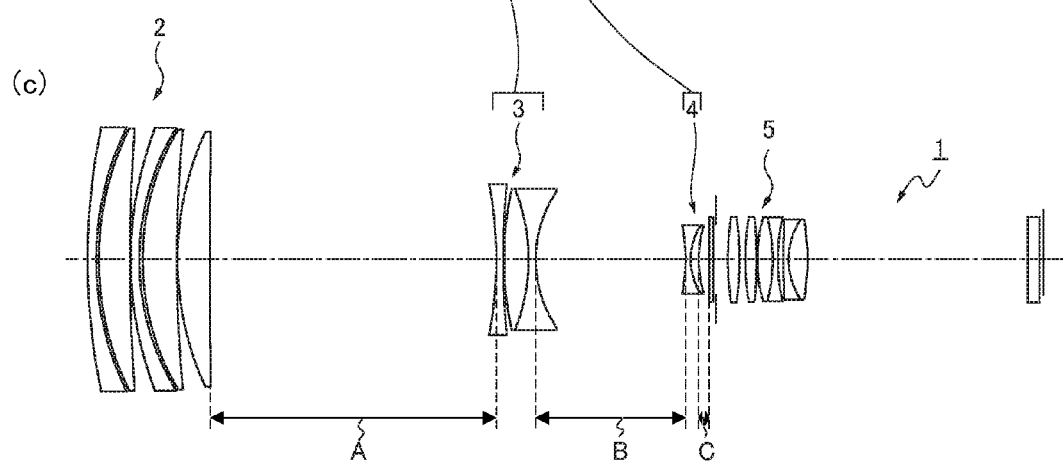

FIG.31
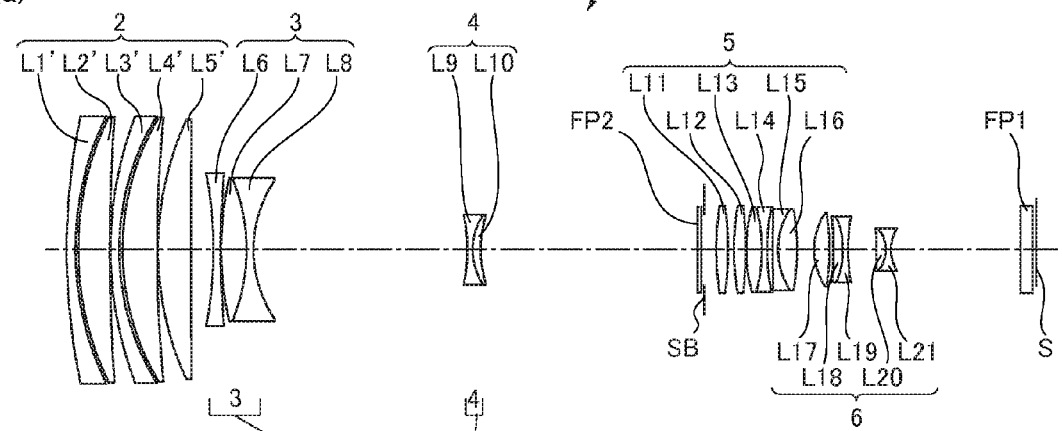
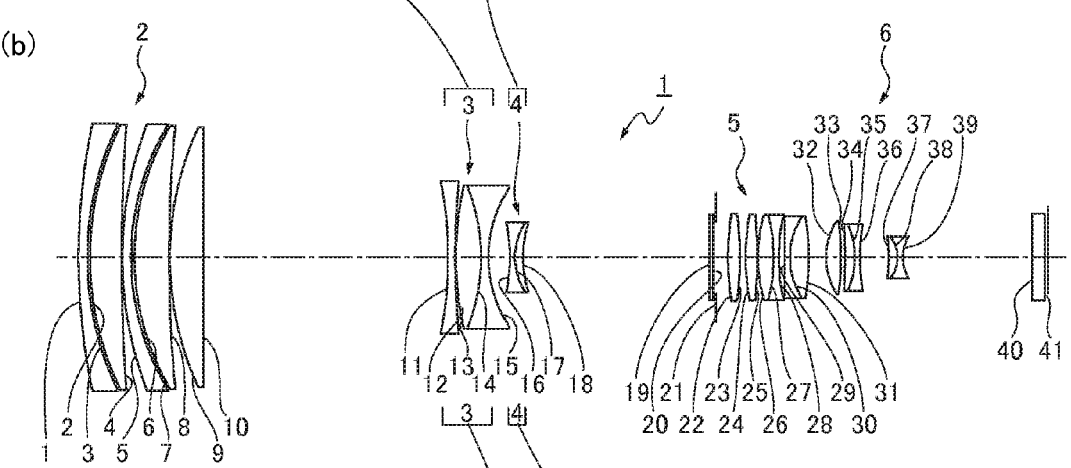
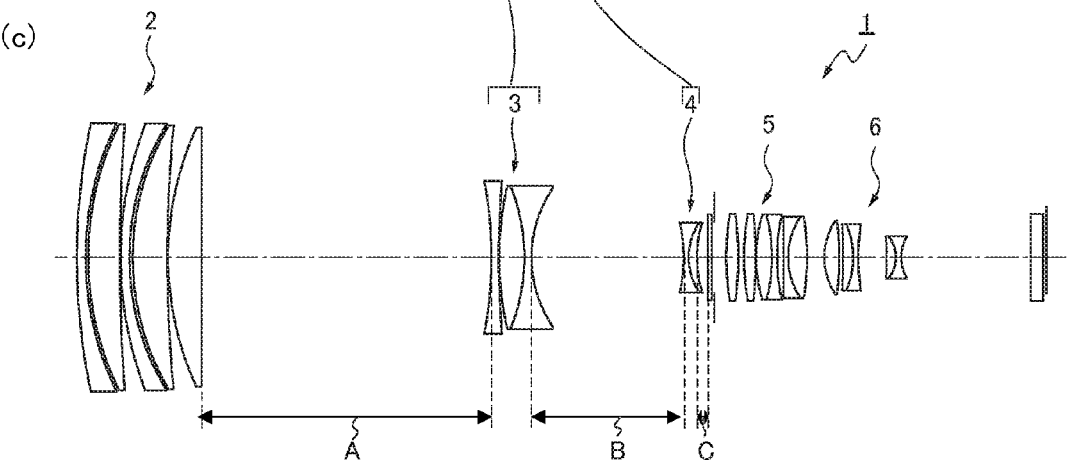

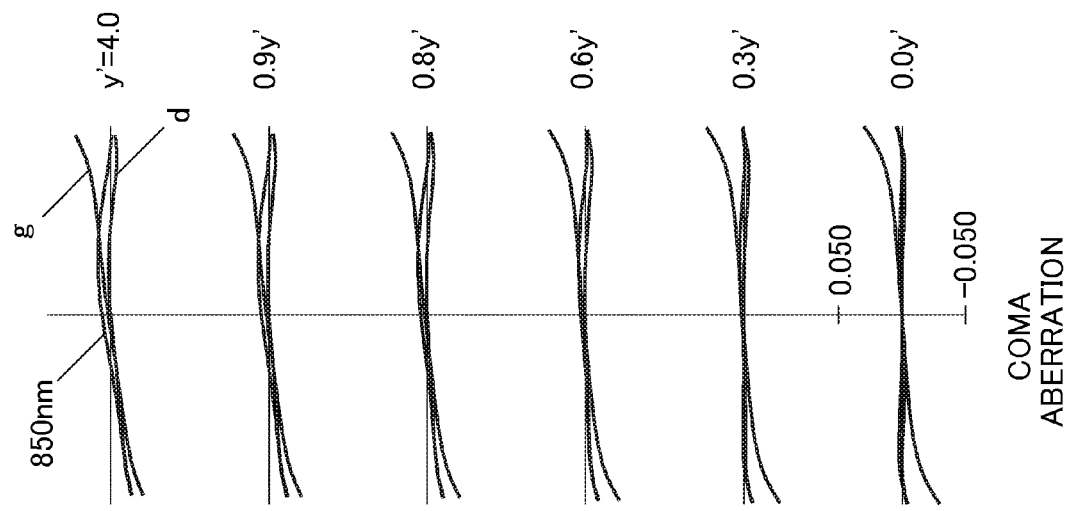
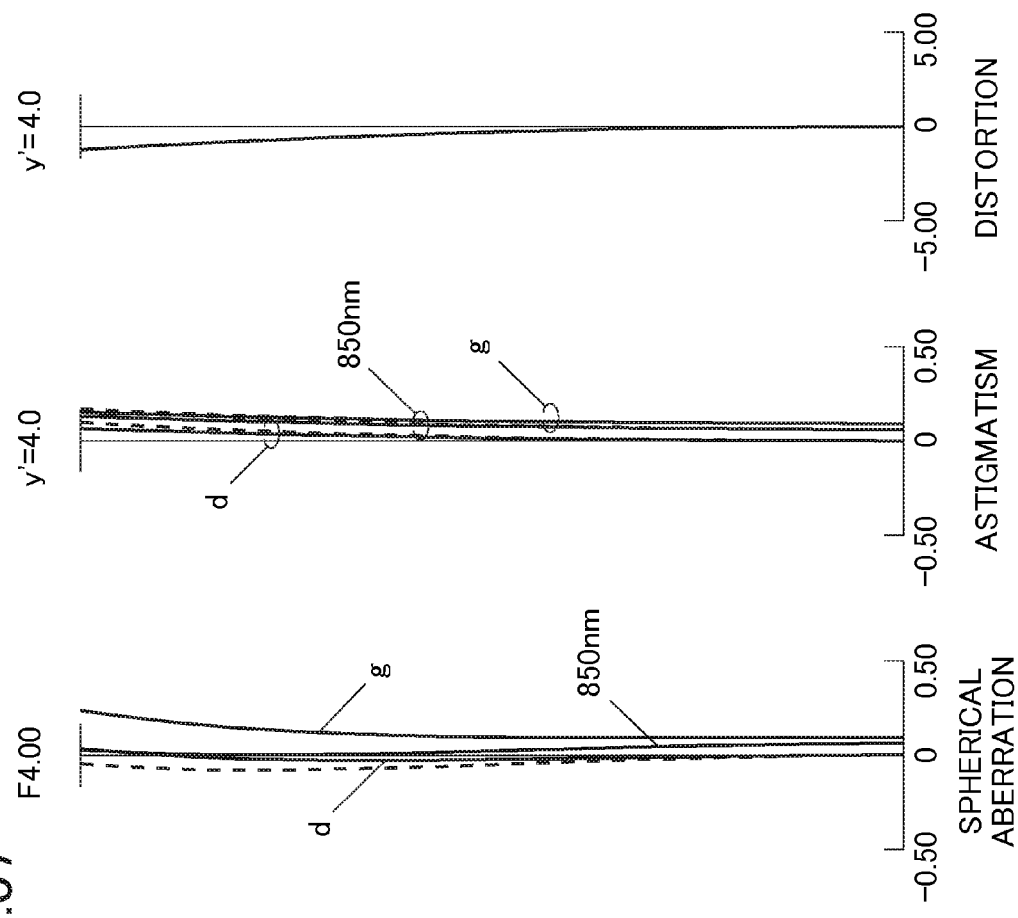
FIG.57

ZOOM LENS AND IMAGING DEVICE USING ZOOM LENS

PRIORITY CLAIM

The present application is based on and claims priority from Japanese Patent Application No. 2013-222249, filed on Oct. 25, 2013, and Japanese Patent Application No. 2013-222272, filed on Oct. 25, 2013, the disclosures of which are hereby incorporated by reference in their entirety.

BACKGROUND

1. Field of the Invention

The present invention relates to a zoom lens for use in a TV camera, a video camera, a digital camera, and a monitoring camera, for example, and an imaging device using the zoom lens.

2. Description of the Related Art

A zoom lens including, in order from an object side to an image surface side, a first lens group having a positive refractive power, a second lens group having a negative refractive power, a third lens group having a positive refractive power, and a fourth lens group having a positive refractive power is known (refer to Patent Document 1: JP H10-054937A). In such a zoom lens, the second and third lens groups are moved such that the second lens group is positioned on the most object side at the wide-angle end and the third lens group is positioned on the most image surface side at the telephoto end during zooming.

As such a zoom lens, a zoom lens including a diffraction optical element in the first lens group is known (refer to Patent Document 2: JP 2008-197534A).

As such a zoom lens, a zoom lens, which compensates a chromatic aberration to a near-infrared region, without including a diffraction optical element is also known (refer to Patent Document 3: JP 2008-241884A).

Various types of zoom lenses have been developed for TV cameras. For example, as a zoom lens suitable for a high zoom ratio, a zoom lens is known including, in order from an object side to an image surface side, a first lens group having a positive focal distance, a second lens group having a negative focal distance, a third lens group having a negative focal distance, and a fourth lens group having a positive focal distance. In such a zoom lens, the second and third lens groups are moved during zooming.

In such a zoom lens, the second lens group operates as a variator for zooming, and the third lens group operates as a compensator for compensating fluctuation in image surface position associated with zooming. However, in order to downsize a zoom lens and obtain a high zoom ratio, the third lens group sometimes performs a part of a zooming operation.

In Patent Document 1, the third lens group performs a part of the zooming operation, but the zoom ratio is less than 20:1.

A monitoring TV camera may perform imaging having sensitivity to a near-infrared region of a wavelength of about 900 nm or below. Such a monitoring camera obtains an accurate color image only with visible light by cutting near-infrared light during daytime with sufficient light volume. On the other hand, such a monitoring camera transmits all of light from a visible region to a near-infrared region to obtain a light volume in a poor weather, twilight, or dawn, and projects and illuminates infrared light of a wavelength of about 850 nm by cutting visible light during night time.

A zoom lens for use as a photographing lens is therefore required so that a chromatic aberration is compensated not only to a visible region but also to a near-infrared region. When the chromatic aberration is not compensated to the near-infrared region, it is necessary to refocus upon switching between visible light and near-infrared light, or a sufficient resolution cannot be obtained in the case of transmitting all of light from the visible region to the near-infrared region.

In this type of zoom lens, in order to preferably compensate a chromatic aberration, extra-low dispersion glass as represented by FPL 51 (manufactured by OHARA CO., LTD.) or FPL 53 (manufactured by OHARA CO., LTD.) is used for the first lens group in which an axial marginal light beam height is increased on a telephoto side and the fourth lens group in which an axial marginal light beam height is increased on a wide-angle side. A diffraction optical element in the first lens group so as to compensate the chromatic aberration by using negative dispersion of the diffraction optical element has also been considered.

In Patent Document 2, a chromatic aberration is compensated by using the diffraction optical element in the first lens group. However, a zoom lens having a zoom ratio of more than 25:1 has a large telephoto ratio (ratio of total length of lens relative to focal distance) of about 1.0 at the telephoto end, so that the zoom lens is not significantly downsized.

In Patent Document 3, an extra-low dispersion glass is used for the first lens group and the fourth lens group, and aberrations are compensated to the near-infrared region. However, the zoom ratio is about 22:1, which is smaller than 25:1.

Users have many demands for TV cameras or video cameras. Users always request high quality images and downsized cameras. For this reason, both of a high performance and downsizing are desired for the zoom lenses. A relatively high zoom ratio is also desired.

SUMMARY

It is, therefore, an object of the present invention to provide a compact zoom lens in which aberrations are preferably compensated.

To attain the above object, one embodiment of the present invention provides a zoom lens including, in order from an object side to an image surface side, a first lens group having a positive refractive power, a second lens group having a negative refractive power, a third lens group having a negative refractive power, and a fourth lens group having a positive refractive power, the second lens group and the third lens group being moved such that the second lens group is located on a most object side at a wide-angle end and the third lens group is located on a most image surface side at a telephoto end during zooming, wherein the following conditional expressions are satisfied where $m_{2W}$ denotes a magnification of the second lens group at the wide-angle end, $m_{2T}$ denotes a magnification of the second lens group at the telephoto end, $m_{3W}$ denotes a magnification of the third lens group at the wide-angle end, and $m_{3T}$ denotes a magnification of the third lens group at the telephoto end.

$$m_{2T}/m_{2W} < 0.0$$

$$m_{3T}/m_{3W} < 0.0$$

$$0.80 < (m_{3T}/m_{3W})/(m_{2T}/m_{2W}) < 3.00.$$

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 1 is a sectional view illustrating the configuration of a zoom lens of Numerical Example 1, (a) illustrates the zoom lens in which a second lens group is adjacent to the most object side at the wide-angle end, (c) illustrates the zoom lens in which a third lens group is adjacent to the most image surface side at the telephoto end, and (b) illustrates the zoom lens in an intermediate focal distance.

FIG. 2 is a sectional view illustrating the configuration of a zoom lens of Numerical Example 2, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 3 is a sectional view illustrating the configuration of a zoom lens of Numerical Example 3, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 4 is a sectional view illustrating the configuration of a zoom lens of Numerical Example 4, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 5 is a sectional view illustrating the configuration of a zoom lens of Numerical Example 5, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 22 is a sectional view illustrating the configuration of a zoom lens (extender lens group is not inserted) of Numerical Example 6, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 24 is a sectional view illustrating the configuration of a zoom lens (extender lens group is not inserted) of Numerical Example 7, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 25 is a sectional view illustrating the configuration of the zoom lens (extender lens group is inserted) of Numerical Example 7, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 26 is a sectional view illustrating the configuration of a zoom lens (extender lens group is not inserted) of Numerical Example 8, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 29 is a sectional view illustrating the configuration of the zoom lens (extender lens group is inserted) of Numerical Example 9, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 30 is a sectional view illustrating the configuration of a zoom lens (extender lens group is not inserted) of Numerical Example 10, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 31 is a sectional view illustrating the configuration of the zoom lens (extender lens group is inserted) of Numerical Example 10, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.

FIG. 57 illustrates aberration curves of the zoom lens (extender lens group is not inserted) of Numerical Example 10 in the intermediate focal distance.

DESCRIPTION OF THE PREFERRED EMBODIMENTS

Embodiment 1

Figure 6:
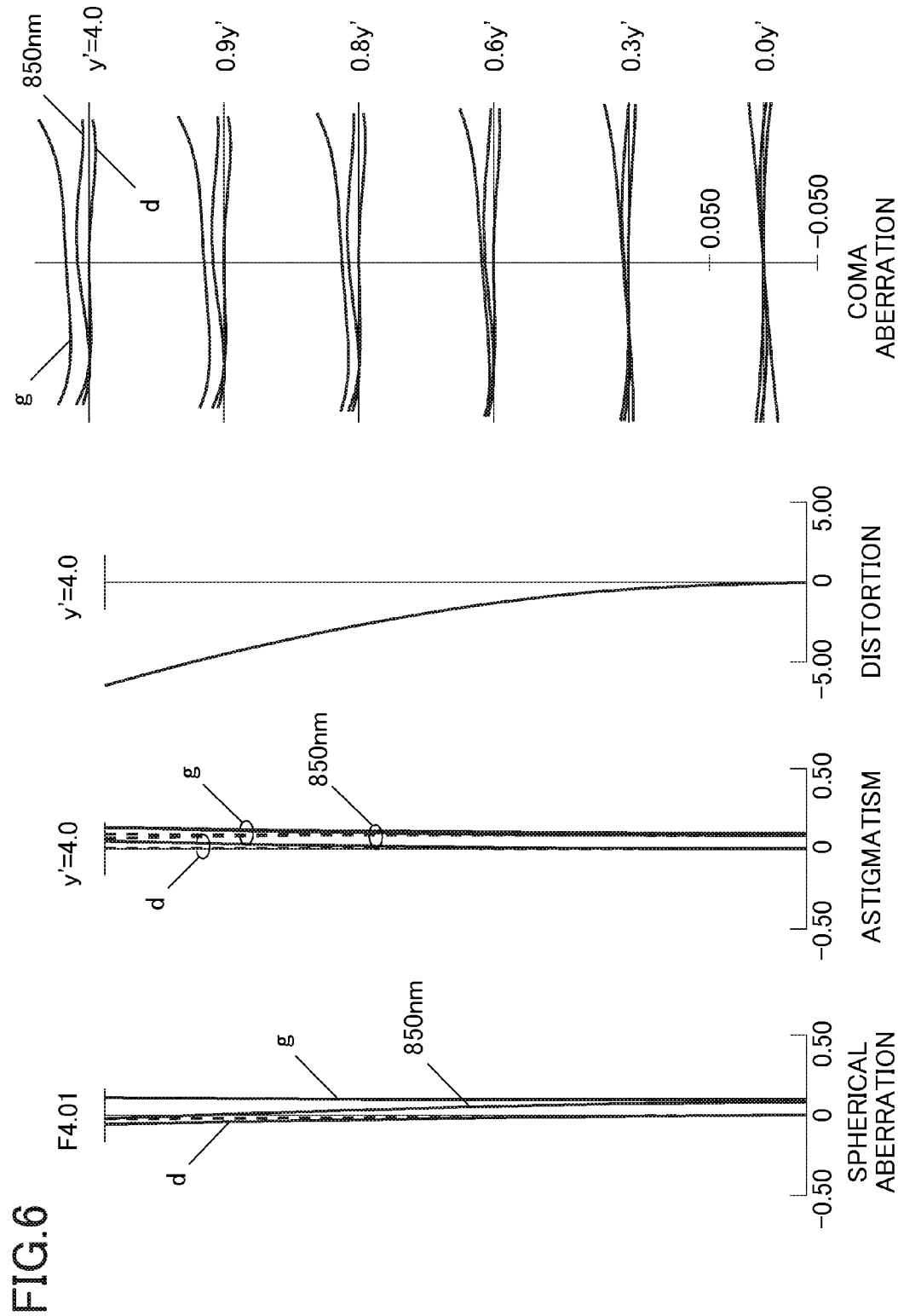
FIG. 6 illustrates aberration curves of the zoom lens of Numerical Example 1 at the wide-angle end.
Figure 7:
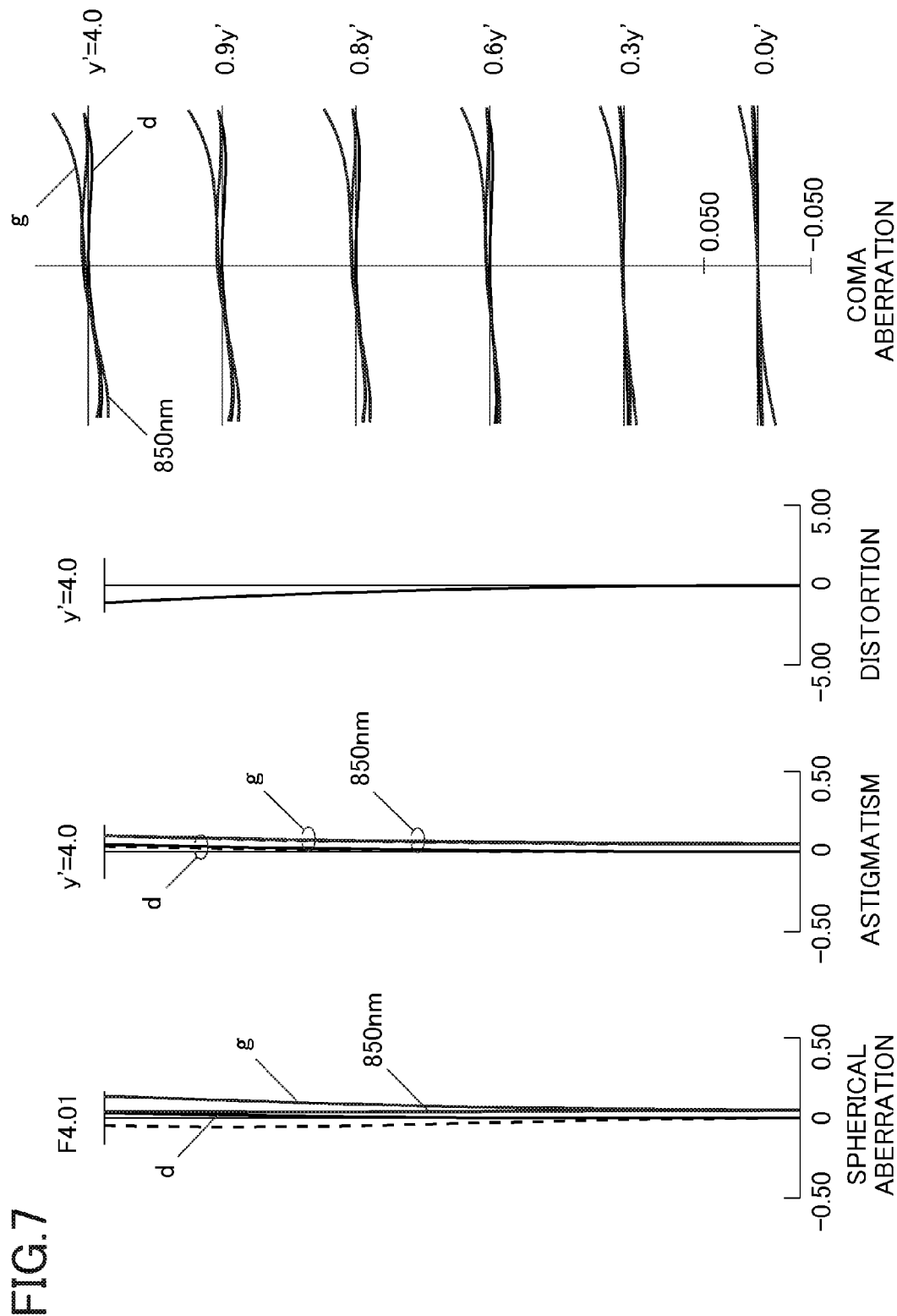
FIG. 7 illustrates aberration curves of the zoom lens of Numerical Example 1 in the intermediate focal distance.
Figure 8:
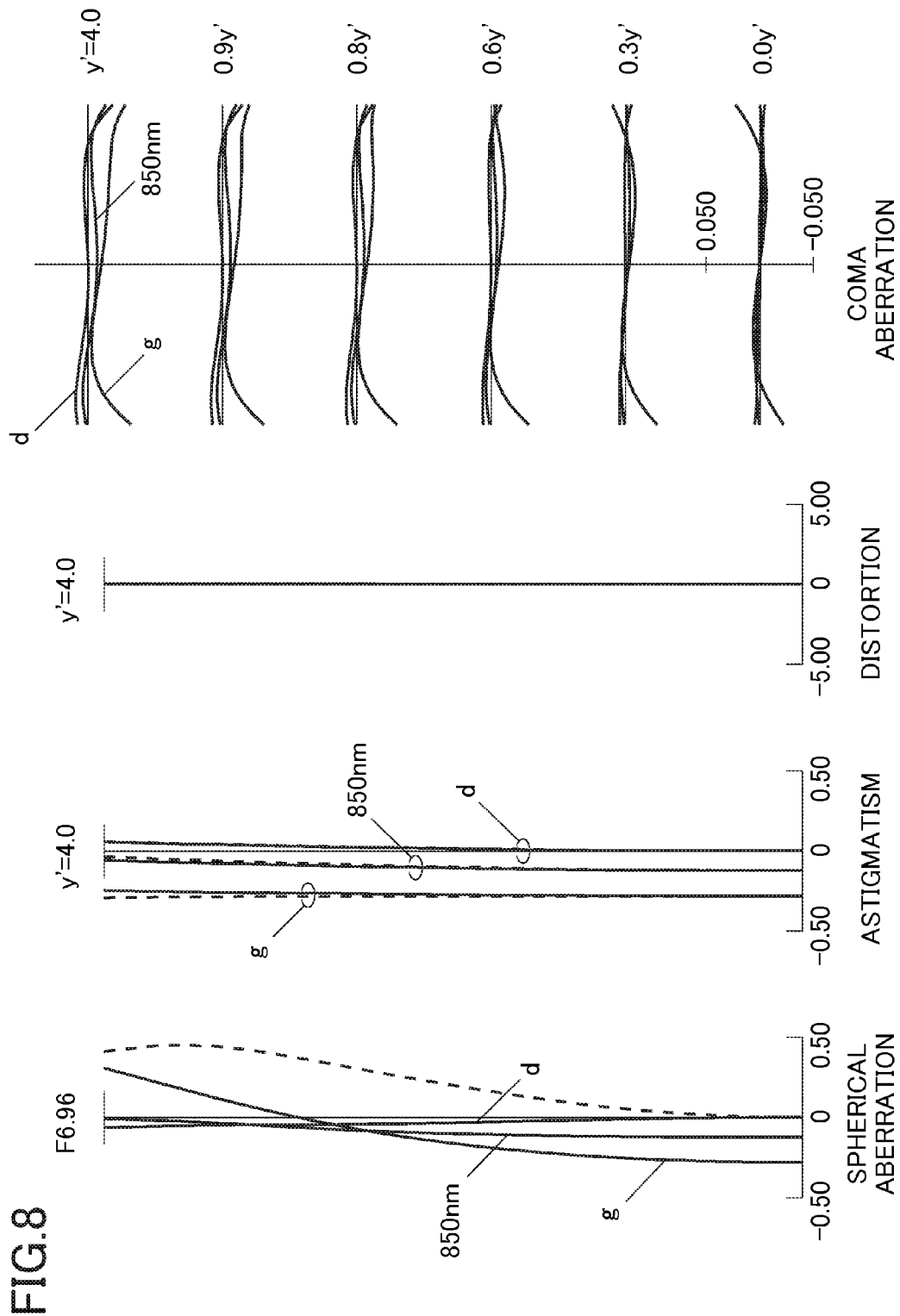
FIG. 8 illustrates aberration curves of the zoom lens of Numerical Example 1 at the telephoto end.
Figure 9:
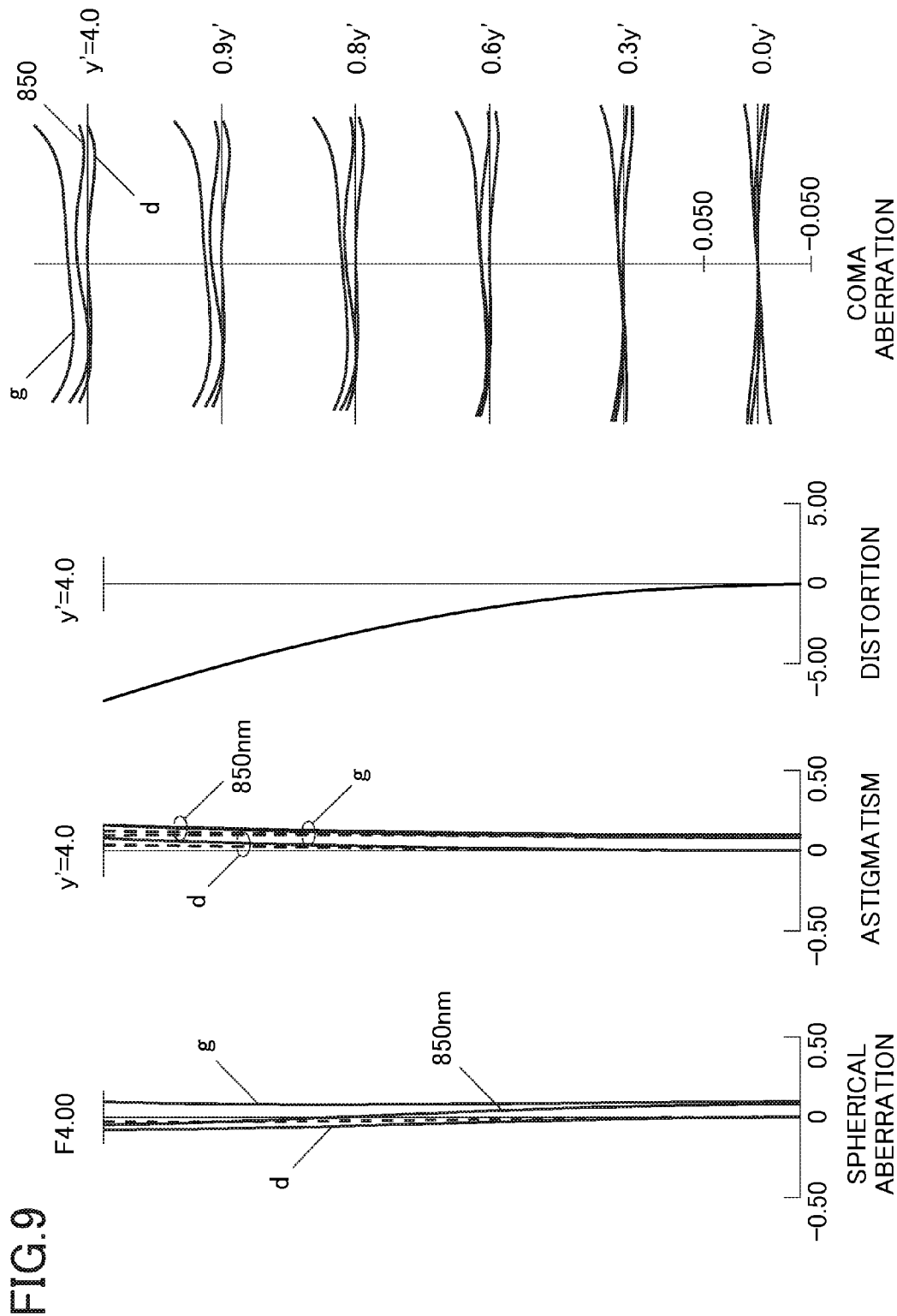
FIG. 9 illustrates aberration curves of the zoom lens of Numerical Example 2 at the wide-angle end.
Figure 10:
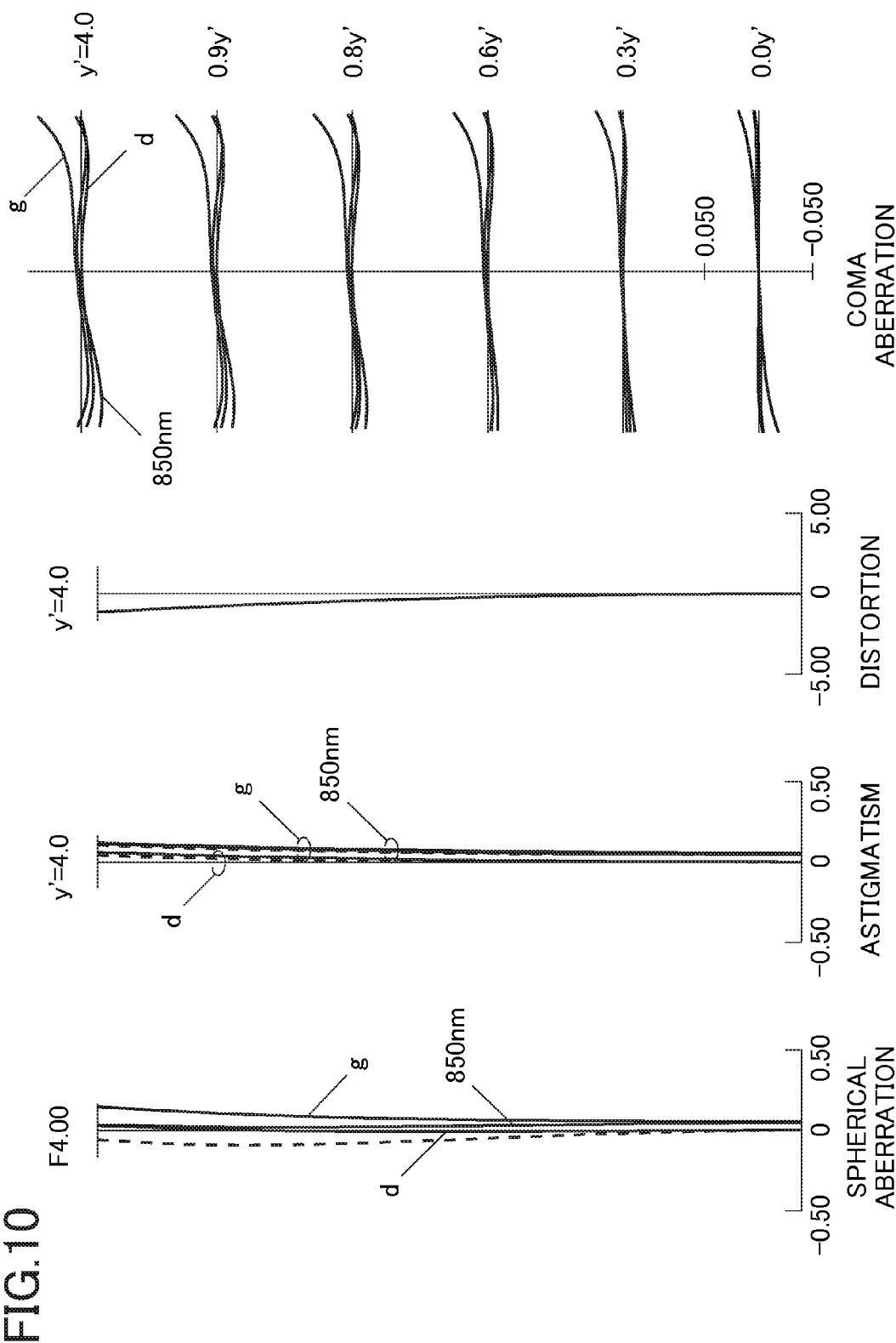
FIG. 10 illustrates aberration curves of the zoom lens of Numerical Example 2 in the intermediate focal distance.
Figure 11:
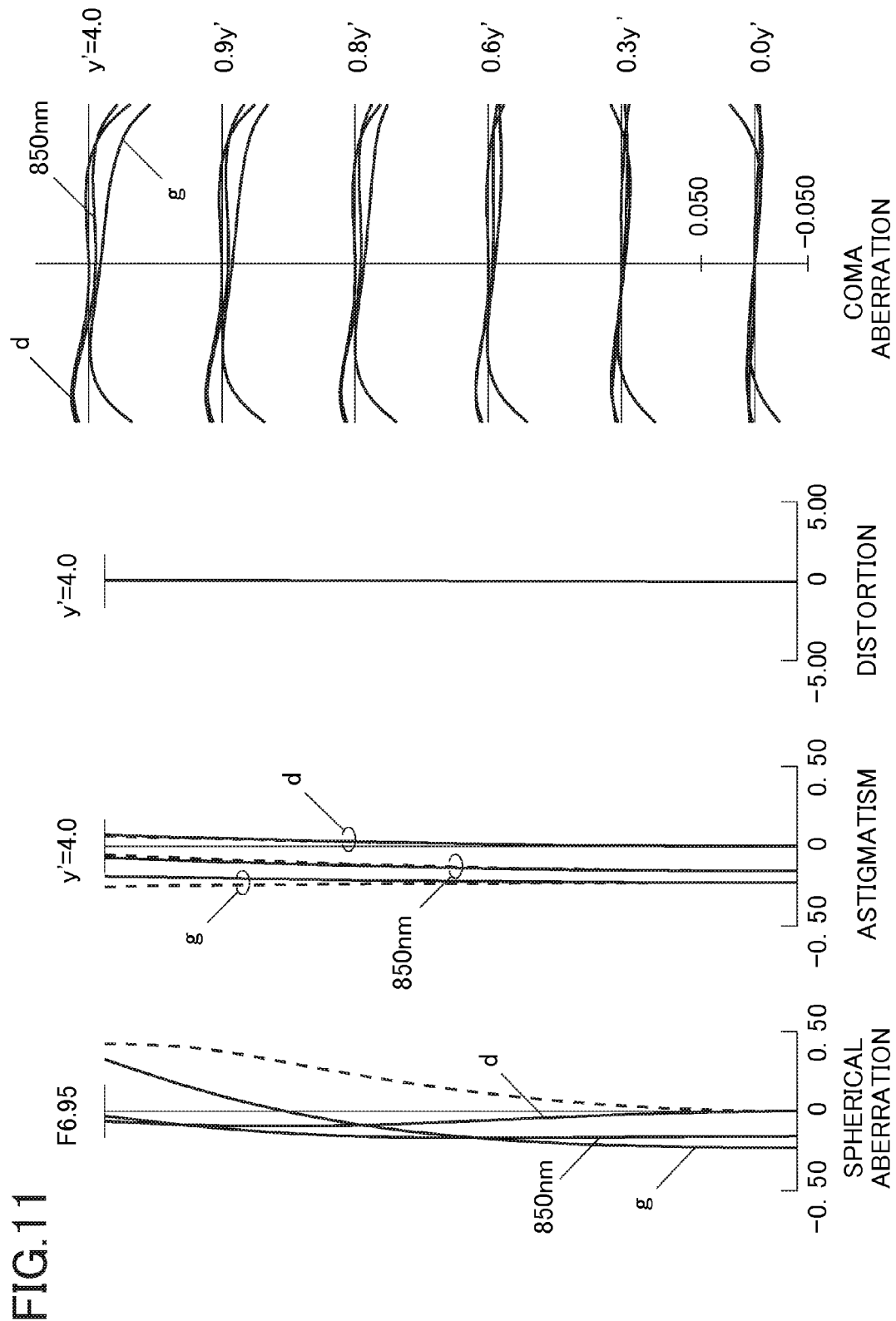
FIG. 11 illustrates aberration curves of the zoom lens of Numerical Example 2 at the telephoto end.
Figure 12:
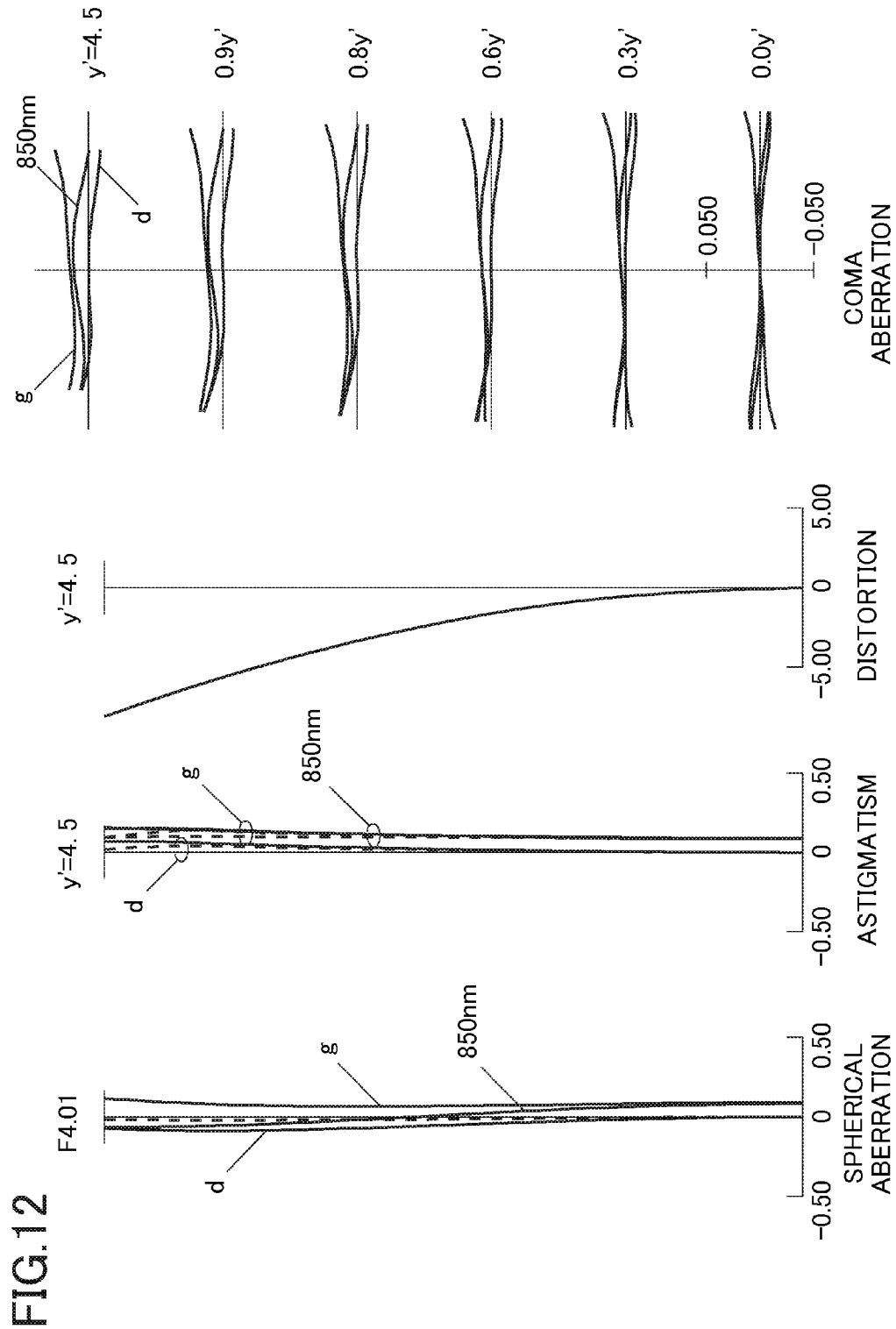
FIG. 12 illustrates aberration curves of the zoom lens of Numerical Example 3 at the wide-angle end.
Figure 13:
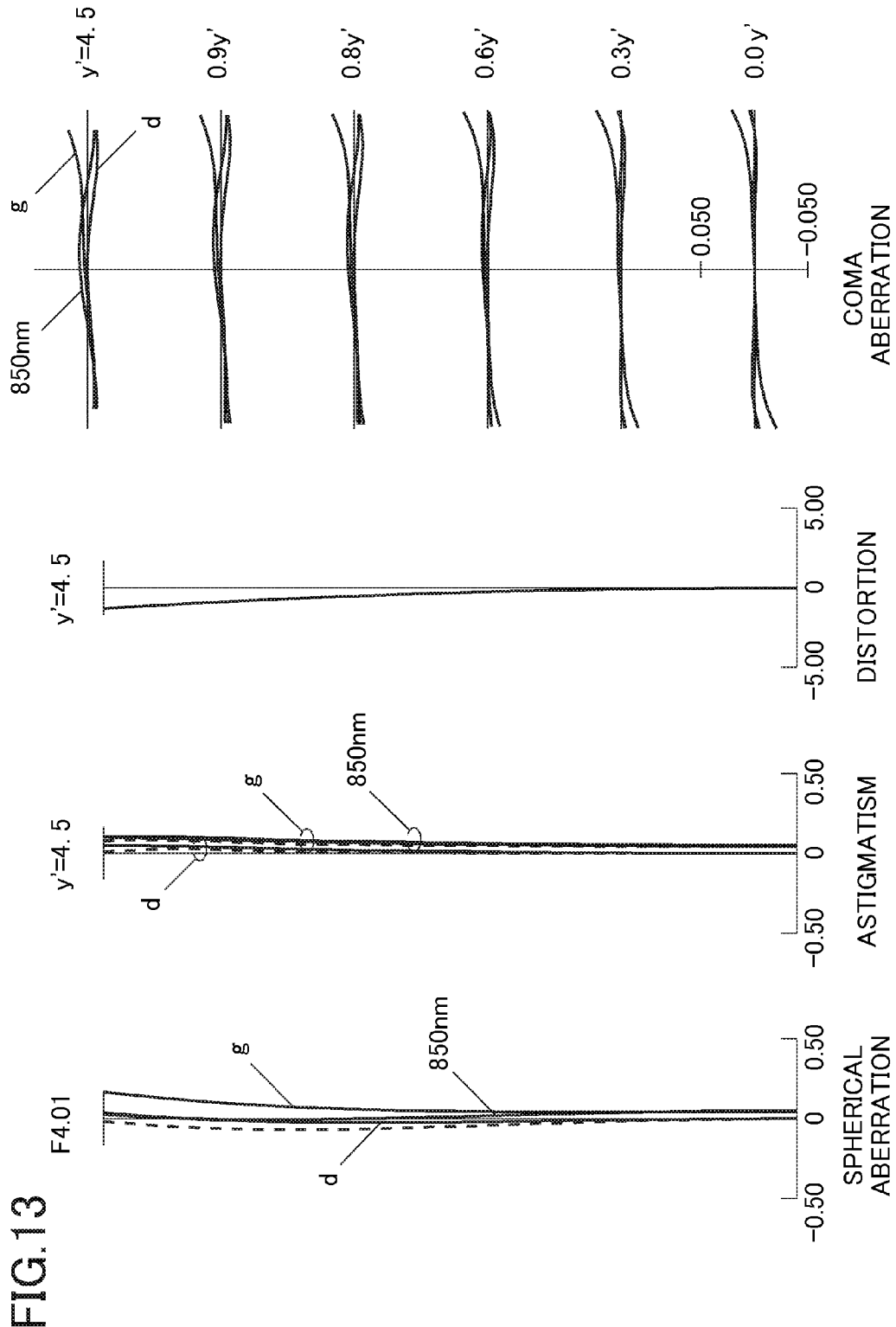
FIG. 13 illustrates aberration curves of the zoom lens of Numerical Example 3 in the intermediate focal distance.
Figure 14:
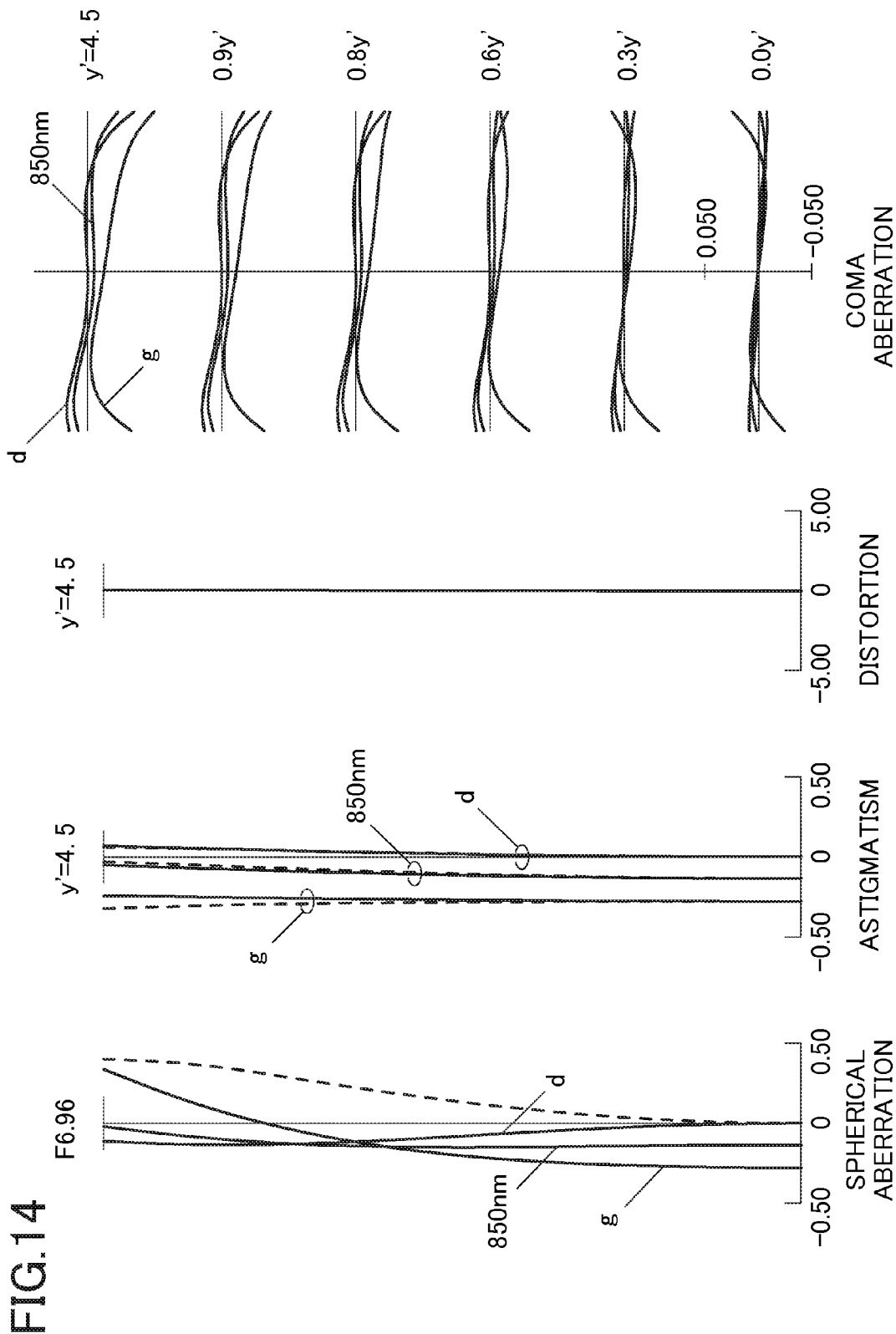
FIG. 14 illustrates aberration curves of the zoom lens of Numerical Example 3 at the telephoto end.
Figure 15:
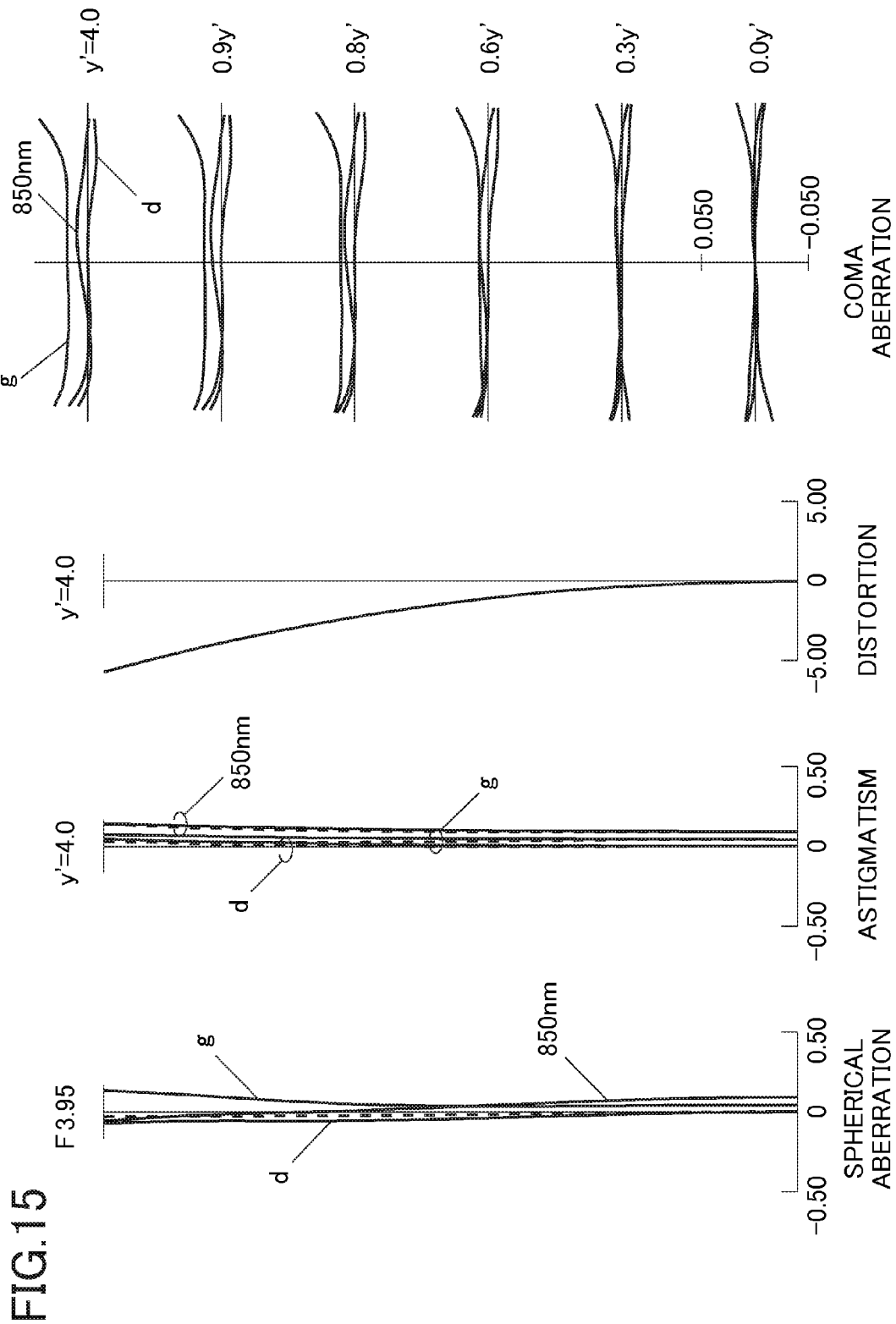
FIG. 15 illustrates aberration curves of the zoom lens of Numerical Example 4 at the wide-angle end.
Figure 16:
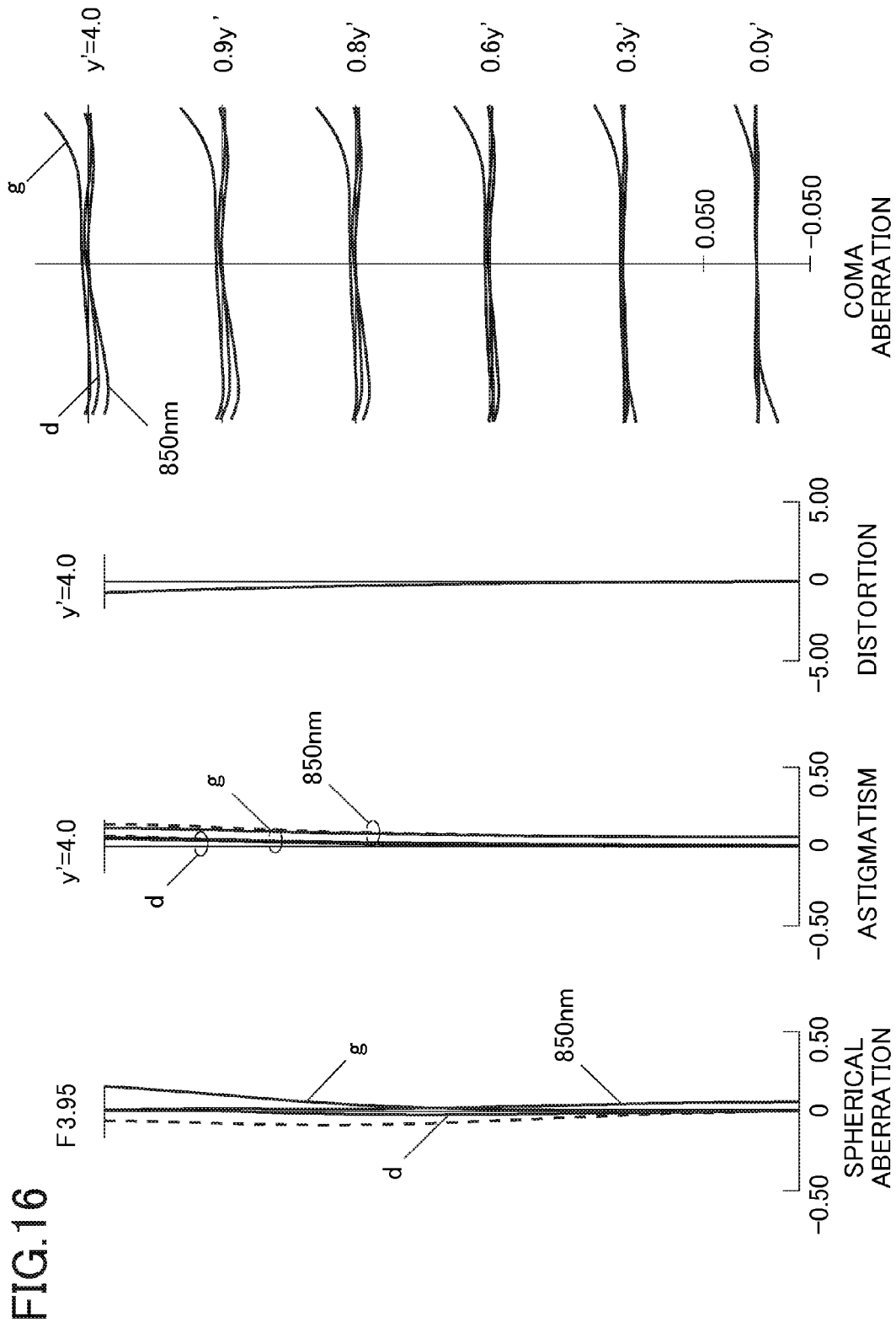
FIG. 16 illustrates aberration curves of the zoom lens of Numerical Example 4 in the intermediate focal distance.
Figure 17:
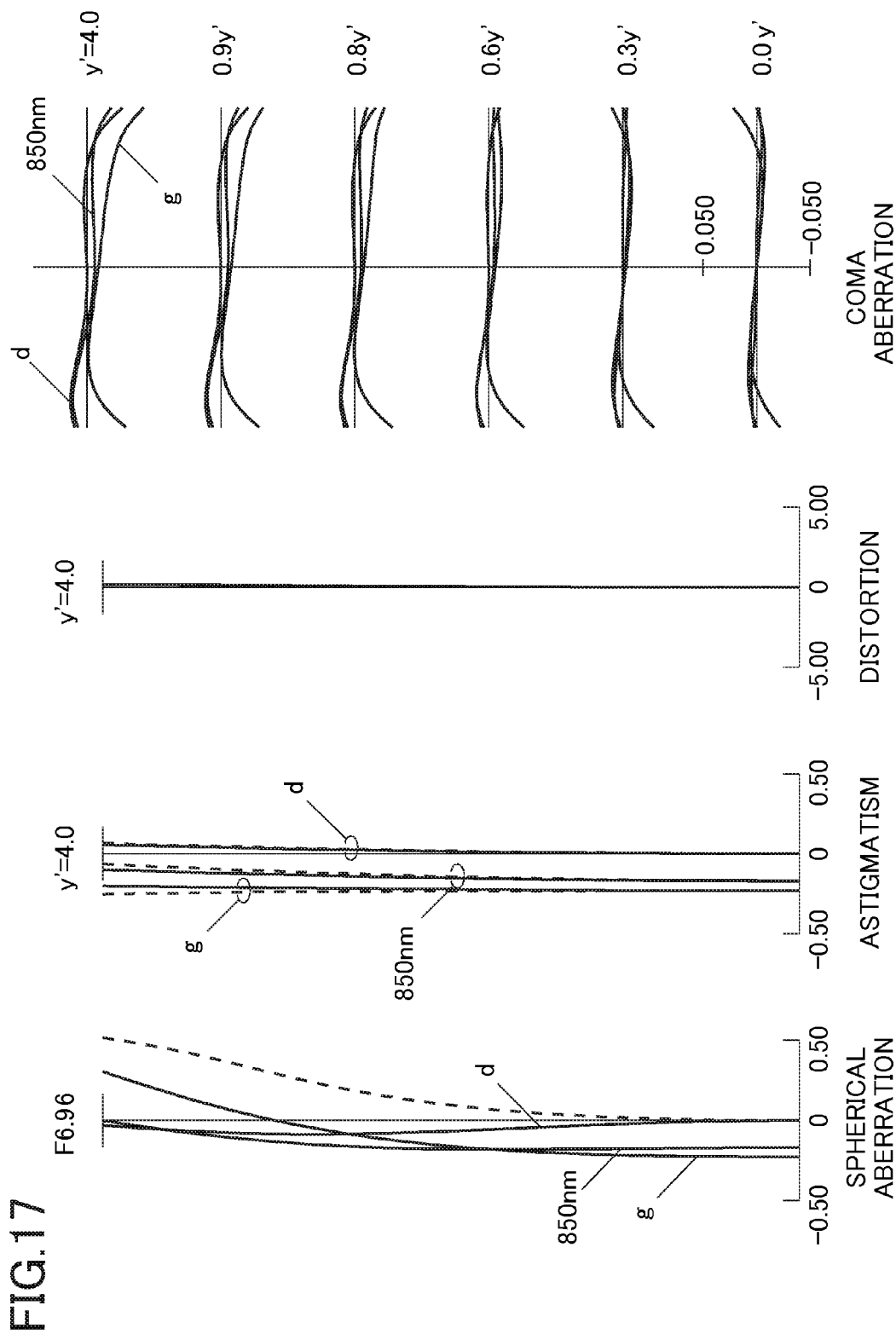
FIG. 17 illustrates aberration curves of the zoom lens of Numerical Example 4 at the telephoto end.
Figure 18:
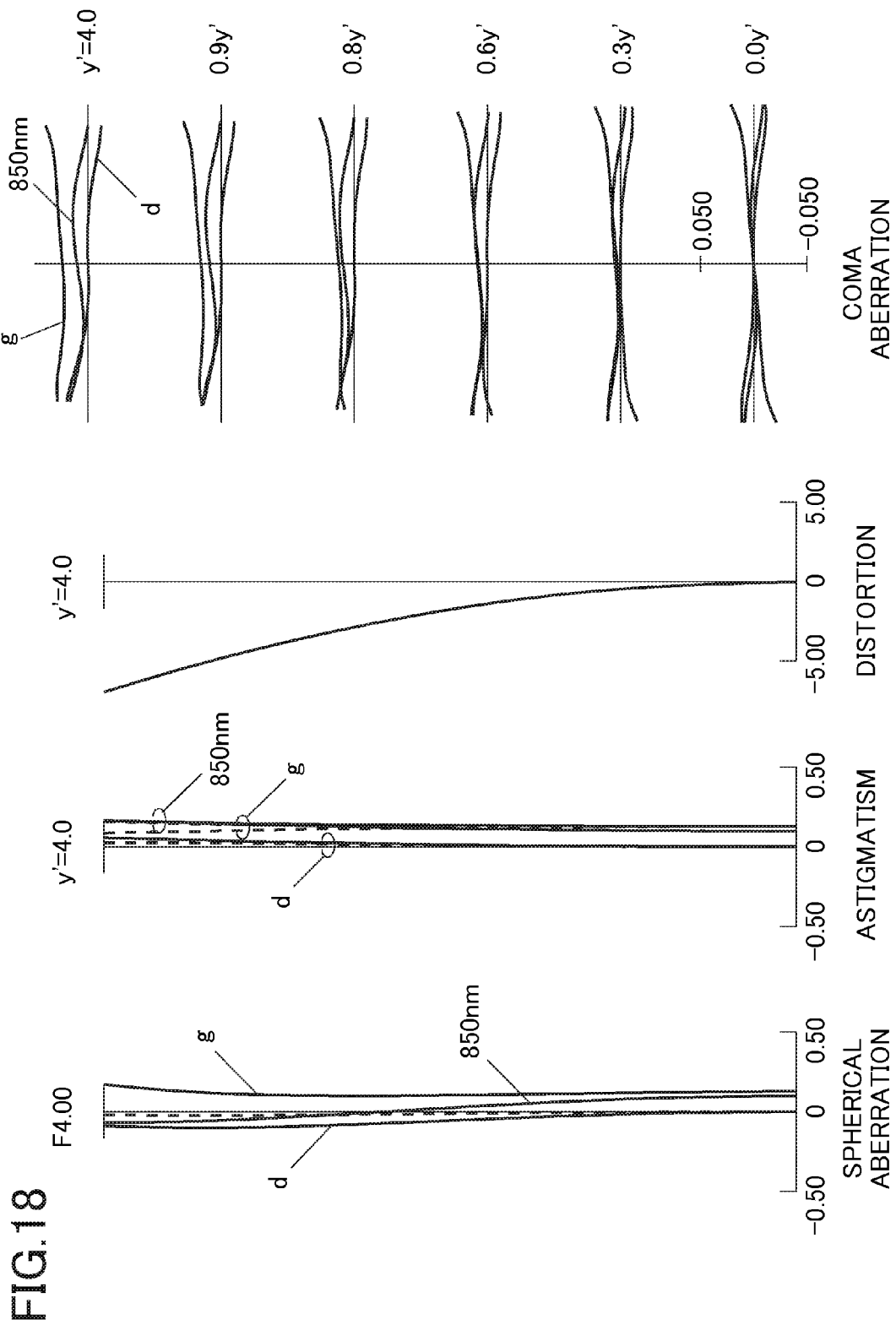
FIG. 18 illustrates aberration curves of the zoom lens of Numerical Example 5 at the wide-angle end.
Figure 19:
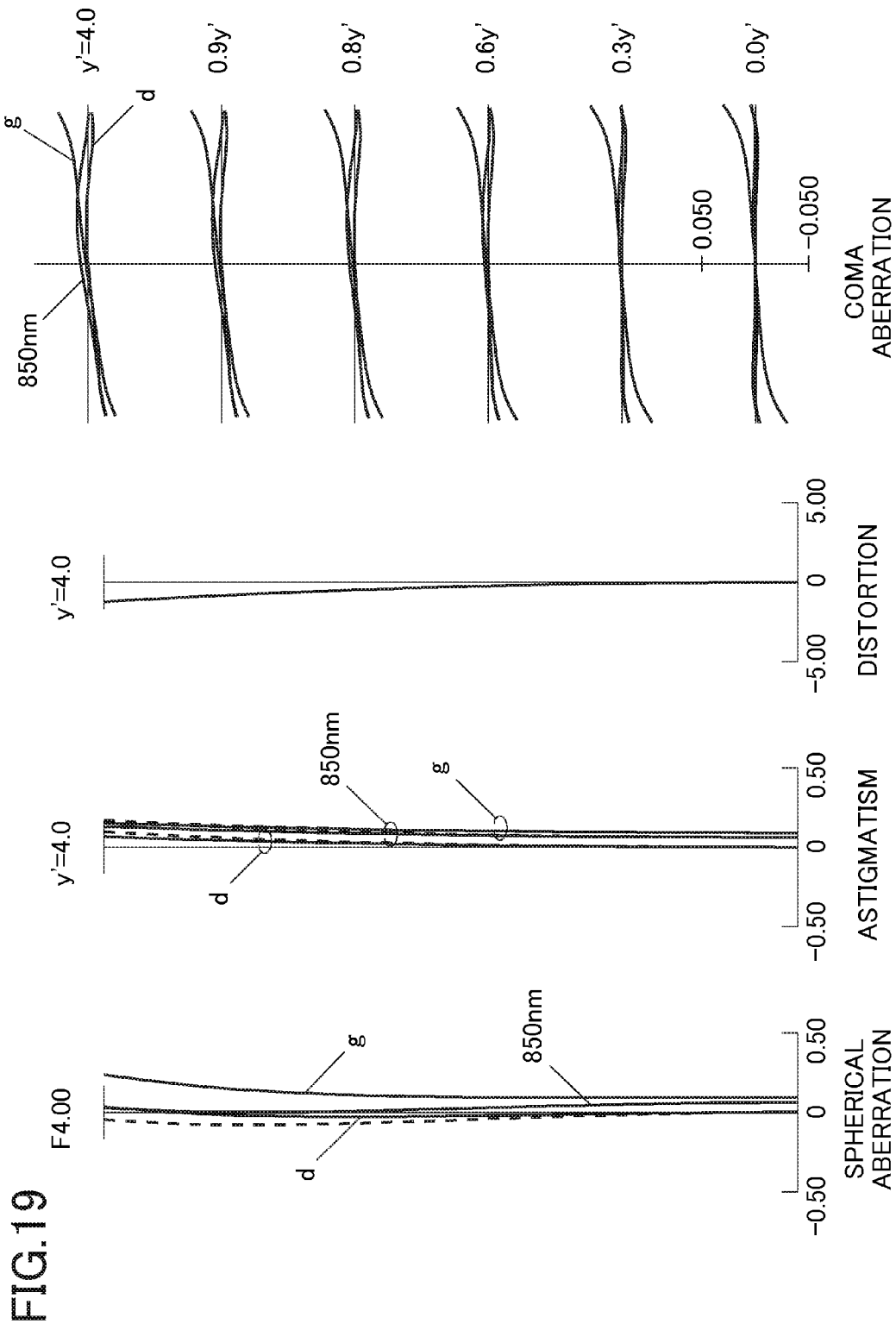
FIG. 19 illustrates aberration curves of the zoom lens of Numerical Example 5 in the intermediate focal distance.
Figure 20:
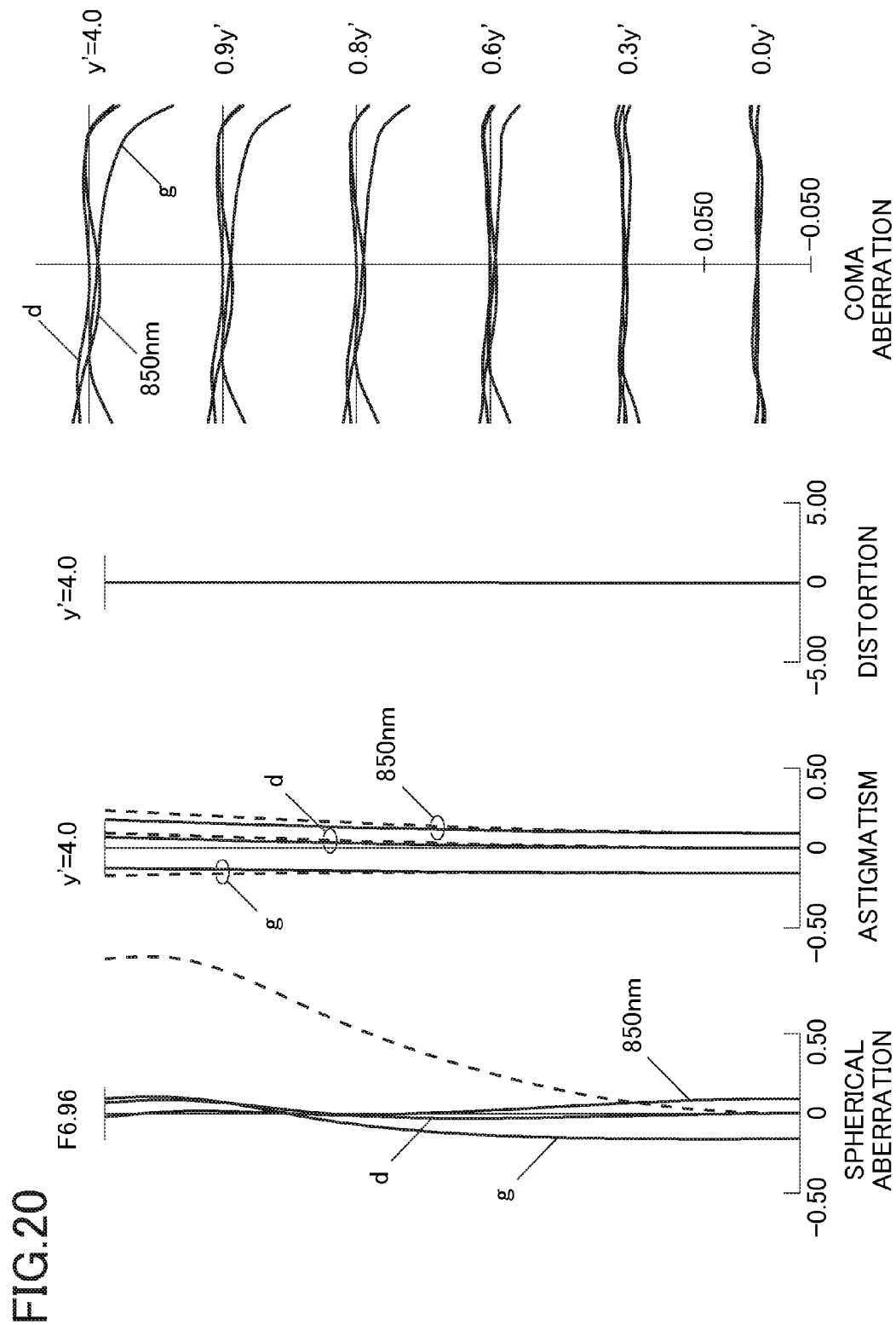
FIG. 20 illustrates aberration curves of the zoom lens of Numerical Example 5 at the telephoto end.

Hereinafter, a zoom lens according to Embodiment 1 of the present invention will be described with reference to the drawings.

A zoom lens 1 according to Embodiment 1 of the present invention includes, in order from an object side to an image surface S side, a first lens group 2 having a positive refractive power, a second lens group 3 having a negative refractive power, a third lens group 4 having a negative refractive power, and a fourth lens group 5 having a positive refractive power, as illustrated in FIGS. 1 to 5.

The first lens group 2 is made of, for example, three lenses including a lens L1, a lens L2, and a lens L3 as illustrated in FIGS. 1 to 4 corresponding to Numerical Examples 1 to 4. The second lens group 3 is made of, for example, three lenses including a lens L6, a lens L7, and a lens L8.

The third lens group 4 is made of, for example, two lenses including a lens L9 and a lens L10. The fourth lens group 5 is made of, for example, six lenses including a lens L11, a lens L12, a lens L13, a lens L14, a lens L15, and a lens L16.

A parallel plate FP2 is disposed just in front of the fourth lens group 5 between the third lens group 4 and the fourth lens group 5. The parallel plate FP2 includes an ND filter for adjusting a light volume.

An aperture SB is provided between the parallel plate FP2 and the lens L11. A parallel plate FP1 is disposed on the image surface S side of the fourth lens group 5. The parallel plate FP1 includes various filters such as an optical low pass filter or an infrared cut filter, or a cover glass (seal glass) of an imaging element such as a CCD sensor.

The zoom lens 1 made of four lens groups of positive, negative, negative, and positive constitutes a variator in which the second lens group 3 performs the major zooming operation. The third lens group 4 shares the zooming operation. The zoom lens 1 is therefore suitable for a high zoom ratio.

In this embodiment, the third lens group 4 has a sufficient zooming operation by moving the second and third lens groups 3, 4 such that the second lens group 3 is positioned on the most object side at the wide-angle end, as illustrated in (a) of FIGS. 1 to 5 and the third lens group 4 is positioned on the most image surface side at the telephoto end, as illustrated in (c) of FIGS. 1 to 5.

During zooming from the wide-angle end to the telephoto end, as illustrated in (a) to (b) of FIGS. 1 to 5, the interval between the second lens group 3 and the third lens group 4 is once reduced, and the extreme value is obtained in an intermediate region of the zooming. After that, as illustrated in (c) of FIGS. 1 to 5, the interval between the second lens group 3 and the third lens group 4 is increased again.

The second lens group 3 and the third lens group 4 are integrated as a variator which shares the zooming operation. By changing the interval between the second and third lens groups 3, 4, the second and third lens groups 3, 4 operate as a compensator which compensates an image surface position.

The zoom lens 1 according to Embodiment 1 satisfies the following conditional expressions.

$$m_{2T}/m_{2W}<0.0$$

$$m_{3T}/m_{3W}<0.0$$

$$0.80<(m_{3T}/m_{3W})/(m_{2T}/m_{2W})<3.00$$

Where $m_{2W}$ denotes a magnification of the second lens group 3 at the wide-angle end, $m_{2T}$ denotes a magnification of the second lens group 3 at the telephoto end, $m_{3W}$ denotes a magnification of the third lens group 4 at the wide-angle end, and $m_{3T}$ denotes a magnification of the third lens group 4 at the telephoto end.

When both of $m_{2T}/m_{2W}$ and $m_{3T}/m_{3W}$ are negative, the magnification of the third lens group 4 becomes 0 in the middle of the zooming from the wide-angle end to the telephoto end.

When the magnification of the third lens group 4 becomes 0, a synthesized refractive power of the first lens group 2 and the second lens group 3 becomes 0. From this condition, the signs of the magnification of the second and third lens groups 3, 4 become opposite (when the magnification of the third lens group 4 becomes 0, the magnification of the second lens group 3 becomes infinity).

By constituting the zoom lens 1 to include this condition, the contribution of the second and third lens groups 3, 4 to the zooming is balanced, so that aberrations can be preferably compensated.

By controlling the contribution of the second and third lens groups 3, 4 to the zooming such that $(m_{3T}/m_{3W})/(m_{2T}/m_{2W})$ falls in a predetermined range, the zoom lens can be significantly downsized while achieving a sufficiently high zoom ratio.

When $(m_{3T}/m_{3W})/(m_{2T}/m_{2W})$ is equal to 0.8 or less, the contribution of the third lens group 4 to the zooming is excessively reduced, and when $(m_{3T}/m_{3W})/(m_{2T}/m_{2W})$ is equal to 3.0 or more, the contribution of the second lens group 3 to the zooming is excessively reduced. For this reason, it becomes difficult to compensate various monochromatic aberrations in each case, and it also becomes difficult to achieve both of a high zoom ratio and downsizing.

It is more preferable for the zoom lens 1 to satisfy the following conditional expression.

$$1.00<(m_{3T}/m_{3W})/(m_{2T}/m_{2W})<2.50$$

It is further preferable for the zoom lens 1 to satisfy the following conditional expression in order to obtain a higher zoom ratio.

$$2.5<(D_{34W}-D_{34T})/f_w<6.0$$

Where $D_{34W}$ denotes a distance between the third and fourth lens groups 4, 5 at the wide-angle end, $D_{34T}$ denotes a distance between the third and fourth lens groups 4, 5 at the telephoto end, and $f_w$ denotes a focal distance of the entire system at the wide-angle end.

When $(D_{34W}-D_{34T})/f_W$ is equal to 2.5 or less, the contribution of the third lens group 4 to the zooming is likely to be decreased and when $(D_{34W}-D_{34T})/f_W$ is equal to 6.0 or more, the contribution of the second lens group 3 to the zooming is likely to be decreased. In any case, it may become difficult to compensate aberrations.

In the zoom lens 1 according to Embodiment 1, the opening F-number in a telephoto region is controlled by an effective diameter of the first lens group 2, not the aperture SB provided near the object side of the fourth lens group 5. In this case, when $(D_{34W}-D_{34T}) f_W$ is larger than 2.5, it is effective to reduce the effective diameter of the third lens group 4. This is advantageous for compensating aberrations.

It is preferable for the zoom lens 1 according to Embodiment 1 to satisfy the following conditional expression regarding the arrangement of the fourth lens group 5 which performs the major zooming operation.

$$0.2<L_4/T_{4F-I}<0.5$$

Where $L_4$ denotes a distance along the optical axis from the most object side surface (surface number 19) to the most image side surface (surface number 28) of the fourth lens group 5, and $T_{4F-I}$ denotes a distance along the optical axis from the most object side surface (surface number 28) of the fourth lens group 5 to the image surface S. $T_{4F-I}$ denotes an air conversion length when it is assumed that there is no optical element without having a refractive power on the image surface side of the fourth lens group 5.

When $L_4/T_{4F-I}$ is equal to 0.2 or less, the degree of freedom for the configuration of the fourth lens group 5 is disturbed. It may thus become difficult to compensate various aberrations (spherical aberration, astigmatism, distortion, and coma aberration). On the other hand, when $L_4/T_{4F-I}$ is equal to 0.5 or more, a sufficient space cannot be ensured between the fourth lens group 5 and the image surface S. It may thus become difficult to dispose a switching mechanism such as an infrared light cut filter or a visible light cut filter in the zoom lens 1, and ghost images due to the reflection of the filter or each surface in the fourth lens group 5 are easily generated. This is not a preferable condition.

In addition, it is further preferable for the zoom lens 1 to satisfy the following conditional expression.

$$0.2<L_4/T_{4F-I}<0.4$$

In the zoom lens 1 according to Embodiment 1, it is preferable for the positive lens in the first lens group 2 to satisfy the following conditional expression.

$$75<\nu_{1GP}<96$$

Where $\nu_{1GP}$ denotes an average value of Abbe's number of the material of the positive lens in the first lens group 2.

It becomes difficult to compensate a secondary spectrum of an axial chromatic aberration on the telephoto side when a zoom ratio, in particular, a focal distance is increased. It becomes more difficult to compensate the secondary spectrum when the secondary spectrum is compensated not only to a visible region but also to a near-infrared region.

It is therefore desirable to use a small dispersion positive lens for the first lens group 2 in which the axial marginal light beam height is increased on the telephoto side.

When $\nu_{1GP}$ is equal to 75 or less, a chromatic aberration in a telephoto region is likely to be insufficiently compensated. On the other hand, even if a material in which $\nu_{1GP}$ is equal to 96 or more is found, it is likely to be very special and expensive, and it cannot be practically used.

Moreover, even when another chromatic aberration compensation unit such as a diffraction optical element provided in the first lens group 2 is used, it is preferable to satisfy the above conditional expression when it is necessary to compensate the chromatic aberration to the near-infrared region.

Furthermore, it is further preferable to satisfy the following conditional expression.

$$80<\nu_{1GP}<96$$

In the examples illustrated in FIGS. 1 to 4 corresponding to Numerical Examples 1 to 4 according to Embodiment 1, the lenses L1 to L3 of the first lens group 2 include, in order from the object side, a negative meniscus lens L1 having a concave surface on the image surface side, a positive lens L2 having a convex surface on the object side, the convex surface having an absolute value of the curvature radius smaller than that on the image side, and a positive lens L3 having a convex surface on the object side, the convex surface having an absolute value of the curvature radius smaller than that on the image side. The first lens group 2 includes a diffraction optical element RF.

With this configuration in which the first lens group 2 includes the diffraction optical element RF, the number of the lenses of the first lens group 2 having a large lens diameter can be controlled to three even when the chromatic aberration in the telephoto region including the near-infrared region is significantly compensated. The weight of the zoom lens can be thus reduced.

When the diffraction optical element RF is provided in the first lens group 2, it is preferable to satisfy the following conditional expression.

$$0.01<f_T/f_{DOE}<0.05$$

Where $f_T$ denotes a focal distance of the entire system at the telephoto end, and $f_{DOE}$ denotes a focal distance of a diffraction section of the diffraction optical element RF.

When the refractive power of the diffraction optical element RF is weak such that $f_T/f_{DOE}$ is equal to 0.01 or less, it becomes difficult to sufficiently compensate the chromatic aberration in the telephoto region. On the other hand, when the refractive power of the diffraction optical element RF is strong such that $f_T/f_{DOE}$ is equal to 0.05 or more, the chromatic aberration on the telephoto side is excessively compensated. This is not a preferable condition.

The first lens group 2 may be made of five lenses including, in order from the object side, a negative meniscus lens L1' having a concave surface on the image surface side, a positive lens L2' having a convex surface on the object side, the convex surface having an absolute value of the curvature radius smaller than that on the image side, a negative meniscus lens L3' having a concave surface on the image surface side, a positive lens L4' having a convex surface on the object side, the convex surface having an absolute value of the curvature radius smaller than that on the image side, and a positive lens L5' having a convex surface on the object side, the convex surface having an absolute value of the curvature radius smaller than that on the image side, as illustrated in FIG. 5 corresponding Numerical Example 5.

In this case, it is unnecessary to provide the diffraction optical element RF in the first lens group 2. It is also unnecessary to consider unnecessary high order diffracted light resulting from the wavelength dependency of the diffraction optical element RF, flare resulting from the structure of the diffraction optical element RF, and the like.

In the zoom lens 1, the fourth lens group 5 includes the six lenses L11 to L16 arranged in order from the object side. It is preferable for the fourth lens group 5 to include at least three positive lenses, and it is desirable for the fourth lens group 5 to satisfy the following conditional expression.

$$75<\nu_{4GP}<96$$

Where $\nu_{4GP}$ denotes an average value of Abbe's number of at least three positive lenses.

With this configuration of the fourth lens group 5, the chromatic aberration from the visible region to the near-infrared region can be preferably compensated particularly in the wide-angle region of the zooming range.

In this embodiment, the second lens group 3 includes three lenses, but it is preferable for the second lens group 3 to be made of three lenses or less.

In the zoom lens 1 according to Embodiment 1, the second and third lens groups 3, 4 are not distinguished as a variator and a compensator, and comprehensively perform zooming and compensate aberrations. For this reason, with a configuration in which the second lens group 3 includes three lenses or less, and the aberration compensation performance by the single second lens group 3 is relatively low, a sufficient image-forming performance can be ensured.

The lenses L6, L7, L8 of the second lens group 3 illustrated in FIGS. 1 to 5 corresponding to Numerical Examples are three lenses including, in order from the object side, a negative lens, a positive lens, and a negative lens.

During zooming, it is preferable for the first lens group 2 and the fourth lens group 5 to be fixed relative to the image surface S.

It is desirable for the zoom lens 1 for a TV camera or a video camera to have a constant whole length, and a constant weight balance during zooming. Such a configuration can be realized with a configuration in which the first lens group 2 and the fourth lens group 5 are not moved.

The small number of movable lens groups is effective from a functional aspect. Such a configuration leads to a decrease in the number of components, lightweight design, and an improvement in reliability.

It is preferable for the refractive power of each lens group to satisfy the following conditional expressions.

$6.0 < f_1/f_W < 12.0$ $-5.0 < f_2/f_W < -2.0$ $-4.5 < f_3/f_W < -1.5$ $1.5 < f_4/f_W < 4.5$

Where $f_1$ denotes a focal distance of the first lens group 2, $f_2$ denotes a focal distance of the second lens group 3, $f_3$ denotes a focal distance of the third lens group 4, $f_4$ denotes a focal distance of the fourth lens group 5, and $f_w$ denotes a focal distance of the entire system at the wide-angle end.

When the refractive power of the respective lens groups falls in the ranges of the conditional expressions, such lens groups are more suitable for the zoom lens 1 having a zoom ratio exceeding 25:1 and a half-filed angle of about 0.5° at the telephoto end.

It is desirable for at least one lens of the positive lenses in the first lens group 2 and at least one lens of the positive lenses in the fourth lens group 5 to satisfy the following conditional expressions.

$80 < v_d < 96$ $\theta_{C,A'} < 0.000667 \cdot v_d + 0.300$

Where $v_d$ denotes Abbe's number of the material constituting the positive lens and $\theta_{C,A'}$ denotes a partial dispersion ratio of the material constituting the positive lens.

In this case, $\theta_{C,A'} = (n_c - n_{A'})/(n_F - n_C)$, and $n_F$, $n_C$, and $n_{A'}$ are refractive indexes relative to F line, C line, and A' line of the material constituting the negative lens.

The chromatic aberration including the near-infrared region can be preferably compensated over the entire region of the zooming from the wide-angle end to the telephoto end by providing the positive lens which satisfies the above conditional expressions in each of the first lens group 2 and the fourth lens group 5.

In the zoom lens 1 according to Embodiment 1, various methods are considered for focusing to a finite distance. The simplest method is to move the first lens group 2.

Hereinafter, the specific numerical examples of the zoom lens 1 will be described. In addition, the maximum image height y' is 4.0 mm in Numerical Examples 1, 2, 4, and 5, and 4.5 mm in Numerical Example 3.

The material of each lens is an optical glass except that resin is used for the diffraction section of the first lens group 2 in Numerical Examples 1 to 4. A product manufactured by OHARA CO., LTD. is used for the optical glass, and the name of the glass material is listed in Numerical Examples.

The aberrations of Numerical Examples 1 to 5 are significantly compensated, so that the zoom lens according to each of Numerical Examples 1 to 5 is applicable for an imaging element having 2 million pixels or more. By constituting the zoom lens 1 as in the present embodiment, a preferable image forming performance can be obtained while obtaining a high zoom ratio exceeding 25:1 and sufficiently downsizing the zoom lens.

The signs in Numerical Examples 1 to 5 denote as follows.
f: focal distance of entire system
F: F-number
ω: half-field angle
r: curvature radius
d: surface interval
$n_d$: refractive index
$v_d$: Abbe's number
$\theta_{C'A'}$: partial dispersion ratio: $(n_c - n_{A'})/(n_F - n_C)$,
$C_2$: second-order coefficient of phase function
$C_4$: fourth-order coefficient of phase function
K: conical constant of aspheric surface
$A_4$: fourth-order coefficient of aspheric surface formula
$A_6$: sixth-order coefficient of aspheric surface formula
$A_8$: eighth-order coefficient of aspheric surface formula The diffractive surface for use herein is expressed by the following phase function where λ denotes a standard wavelength and h denotes a height from an optical axis. In addition, the first-order diffracted light is used for imaging light, and the refractive power of the diffraction section is $-2 \cdot C_2$.

$$\phi(h) = \frac{2\pi}{\lambda}(C_2 \cdot h^2 + C_4 \cdot h^4)$$

Moreover, the aspheric surface for use herein is expressed by the following aspheric surface formula where R denotes a paraxial curvature radius and H denotes a height from an optical axis.

$$X = \frac{(1/R) \cdot H^2}{1 + \sqrt{(1 \cdot (1+K) \cdot (H/R)^2)}} + A_4 \cdot H^4 + A_6 \cdot H^6 + A_8 \cdot H^8$$

The dashed line in the aberration curve illustrating the spherical aberration illustrates a sine condition.

The solid line and the dashed line in the aberration curve illustrating the astigmatism illustrate a sagittal aberration and a meridional aberration, respectively.

| (NUMERICAL EXAMPLE 1) f = 17.1 to 487, F = 4.01 to 6.96, ω = 14.1 to 0.470 | | | | | | |
|---|---|---|---|---|---|---|
| SURFACE NUMBER | r | d | $n_d$ | $v_d$ | $\theta_{C,A'}$ | GLASS TYPE NAME |
| 01 | 144.855 | 2.50 | 1.83400 | 37.16 | 0.3245 | OHARA S-LAH60 |
| 02 | 76.469 | 0.10 | 1.64310 | 38.82 | 0.3124 | RESIN MATERIAL |
| 03* | 76.469 | 0.10 | 1.61505 | 26.54 | 0.2831 | RESIN MATERIAL |
| 04 | 76.469 | 10.59 | 1.48749 | 70.24 | 0.3633 | OHARA S-FSL5 |
| 05 | 19773.507 | 0.20 | | | | |
| 06 | 74.791 | 10.29 | 1.43875 | 94.94 | 0.3529 | OHARA S-FPL53 |
| 07 | 1414.256 | VARIABLE(A) | | | | |
| 08 | −168.994 | 2.00 | 1.61800 | 63.33 | 0.3454 | OHARA S-PHM52 |
| 09 | 73.668 | 0.20 | | | | |
| 10 | 50.000 | 7.46 | 1.80000 | 29.84 | 0.3117 | OHARA S-NBH55 |
| 11 | −161.070 | 2.00 | 1.74320 | 49.34 | 0.3414 | OHARA S-LAM60 |
| 12 | 33.127 | VARIABLE(B) | | | | |
| 13 | −55.514 | 1.50 | 1.60300 | 65.44 | 0.3498 | OHARA S-PHM53 |

-continued (NUMERICAL EXAMPLE 1)
f = 17.1 to 487, F = 4.01 to 6.96, ω = 14.1 to 0.470

| SURFACE NUMBER | r | d | $n_d$ | $v_d$ | $\theta_{C,A'}$ | GLASS TYPE NAME |
|---|---|---|---|---|---|---|
| 14 | 19.259 | 2.83 | 1.85026 | 32.27 | 0.3145 | OHARA S-LAH71 |
| 15 | 34.731 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 68.120 | 3.62 | 1.49700 | 81.54 | 0.3501 | OHARA S-FPL51 |
| 20 | −64.999 | 0.20 | | | | |
| 21 | 36.048 | 3.73 | 1.49700 | 81.54 | 0.3501 | OHARA S-FPL51 |
| 22 | −253.146 | 0.20 | | | | |
| 23 | 25.441 | 4.97 | 1.49700 | 81.54 | 0.3501 | OHARA S-FPL51 |
| 24 | −53.850 | 1.55 | 1.83400 | 37.16 | 0.3245 | OHARA S-LAH60 |
| 25 | 23.762 | 2.83 | | | | |
| 26 | −34.001 | 1.50 | 1.48749 | 70.24 | 0.3633 | OHARA S-FSL5 |
| 27 | 20.000 | 5.40 | 1.54072 | 47.23 | 0.3353 | OHARA S-TIL2 |
| 28 | −30.706 | 57.344 | | | | |
| 29 | ∞ | 3.50 | 1.51633 | 64.14 | | VARIOUS FILTER |
| 30 | ∞ | 1.000 | | | | |

Diffractive Surface; Third Surface $\lambda = 587.56$ (nm), $C_4 = -1.80594 \times 10^{-5}$, $C_6 = 1.02994 \times 10^{-9}$ Surface number 3 denotes the third surface.

VARIABLE INTERVAL

| | WIDE ANGLE END f = 17.07 | INTERMEDIATE FOCAL DISTANCE f = 91.34 | TELEPHOTO END f = 487.3 |
|---|---|---|---|
| A | 5.400 | 77.984 | 91.096 |
| B | 66.759 | 6.083 | 54.757 |
| C | 76.794 | 64.886 | 3.100 |

MAGNIFICATION OF EACH LENS GROUP

| | WIDE ANGLE END f = 17.07 | INTERMEDIATE FOCAL DISTANCE f = 91.34 | TELEPHOTO END f = 487.3 |
|---|---|---|---|
| SECOND LENS GROUP | −0.821 | 14.545 | 3.320 |
| THIRD LENS GROUP | 0.206 | −0.0623 | −1.455 |
| FOURTH LENS GROUP | −0.680 | −0.680 | −0.680 |

Conditional Expression Numerical Value $m_{2T}/m_{2W} = -4.04$ $m_{3T}/m_{3W} = -7.06$ $(m_{3T}/m_{3W})/(m_{2T}/m_{2W}) = 1.75$ $(D_{34W} - D_{34T})/f_w = 4.32$ $L_4/T_{4F\text{-}I} = 0.284$ $v_{1GP} = 82.6$ $f_T/f_{DOE} = 0.0176$ $v_{4GP} = 81.5$ $f_1/f_W = 8.68$ $f_2/f_W = -3.30$ $f_3/f_W = -2.60$ $f_4/f_W = 2.75$ Telephoto Ratio at Telephoto End: 0.572

(NUMERICAL EXAMPLE 2)
f = 17.1 to 486, F = 4.00 to 6.95, ω = 14.2 to 0.471

| SURFACE NUMBER | r | d | $n_d$ | $v_d$ | $\theta_{C,A'}$ | GLASS TYPE NAME |
|---|---|---|---|---|---|---|
| 01 | 138.534 | 2.50 | 1.83400 | 37.16 | 0.3245 | OHARA S-LAH60 |
| 02 | 75.010 | 0.10 | 1.64310 | 38.82 | 0.3124 | RESIN MATERIAL |
| 03* | 75.010 | 0.10 | 1.61505 | 26.54 | 0.2831 | RESIN MATERIAL |
| 04 | 75.010 | 10.72 | 1.48749 | 70.24 | 0.3633 | OHARA S-FSL5 |
| 05 | 9346.827 | 0.20 | | | | |
| 06 | 73.420 | 10.32 | 1.43875 | 94.94 | 0.3529 | OHARA S-FPL53 |
| 07 | 1141.217 | VARIABLE(A) | | | | |
| 08 | −211.333 | 2.00 | 1.59522 | 67.73 | 0.3431 | OHARA S-FPM2 |

-continued (NUMERICAL EXAMPLE 2)
f = 17.1 to 486, F = 4.00 to 6.95, ω = 14.2 to 0.471

| SURFACE NUMBER | r | d | $n_d$ | $v_d$ | $\theta_{C,A'}$ | GLASS TYPE NAME |
|---|---|---|---|---|---|---|
| 09 | 85.820 | 0.20 | | | | |
| 10 | 50.000 | 8.57 | 1.68893 | 31.07 | 0.3142 | OHARA S-TIM28 |
| 11 | −72.415 | 2.00 | 1.74320 | 49.34 | 0.3414 | OHARA S-LAM60 |
| 12 | 32.269 | VARIABLE(B) | | | | |
| 13 | −46.892 | 1.50 | 1.59522 | 67.73 | 0.3431 | OHARA S-FPM2 |
| 14 | 16.804 | 2.86 | 1.85026 | 32.27 | 0.3145 | OHARA S-LAH71 |
| 15 | 29.833 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 71.102 | 3.88 | 1.43875 | 94.94 | 0.3529 | OHARA S-FPL53 |
| 20 | −49.574 | 0.20 | | | | |
| 21 | 33.482 | 3.99 | 1.49700 | 81.54 | 0.3501 | OHARA S-FPL51 |
| 22 | −174.686 | 0.21 | | | | |
| 23 | 23.063 | 4.97 | 1.49700 | 81.54 | 0.3501 | OHARA S-FPL51 |
| 24 | −59.924 | 3.33 | 1.83400 | 37.16 | 0.3245 | OHARA S-LAH60 |
| 25 | 20.958 | 2.86 | | | | |
| 26 | −31.574 | 1.50 | 1.48749 | 70.24 | 0.3633 | OHARA S-FSL5 |
| 27 | 20.000 | 5.03 | 1.54814 | 45.78 | 0.3331 | OHARA S-TIL1 |
| 28 | −31.180 | 51.371 | | | | |
| 29 | ∞ | 3.50 | 1.51633 | 64.14 | | VARIOUS FILTER |
| 30 | ∞ | 1.000 | | | | |

Diffractive Surface; Third Surface $\lambda$=587.56 (nm), $C_4$=−2.05523×10$^{-5}$, $C_6$=8.88676×10$^{-10}$

VARIABLE INTERVAL

| | WIDE ANGLE END f = 17.08 | INTERMEDIATE FOCAL DISTANCE f = 91.53 | TELEPHOTO END f = 486.2 |
|---|---|---|---|
| A | 7.192 | 75.842 | 89.762 |
| B | 65.781 | 6.155 | 43.715 |
| C | 63.691 | 54.667 | 3.187 |

MAGNIFICATION OF EACH LENS GROUP

| | WIDE ANGLE END f = 17.08 | INTERMEDIATE FOCAL DISTANCE f = 91.53 | TELEPHOTO END f = 486.2 |
|---|---|---|---|
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |

Conditional Expression Numerical Value $m_{2T}/m_{2W}$=−3.99

$m_{3T}/m_{3W}$=−7.12

$(m_{3T}/m_{3W})/(m_{2T}/m_{2W})$=−1.79

$(D_{34W}−D_{34T})/f_w$=3.54

$L_4/T_{4F-I}$=0.322

$v_{1GP}$=82.6

$f_T/f_{DOE}$=0.0200

$v_{4GP}$=86.0

$f_1/f_W$=8.45

$f_2/f_W$=−3.04

$f_3/f_W$=−2.25

$f_4/f_W$=2.48

Telephoto Ratio at Telephoto End: 0.543

(NUMERICAL EXAMPLE 3)
f = 17.1 to 487, F = 4.01 to 6.96, ω = 16.0 to 0.529

| SURFACE NUMBER | r | d | $n_d$ | $v_d$ | $\theta_{C,A'}$ | GLASS TYPE NAME |
|---|---|---|---|---|---|---|
| 01 | 143.610 | 2.50 | 1.83400 | 37.16 | 0.3245 | OHARA S-LAH60 |
| 02 | 76.816 | 0.10 | 1.64310 | 38.82 | 0.3124 | RESIN MATERIAL |

-continued (NUMERICAL EXAMPLE 3)
f = 17.1 to 487, F = 4.01 to 6.96, ω = 16.0 to 0.529

| SURFACE NUMBER | r | d | $n_d$ | $v_d$ | $\theta_{C,A'}$ | GLASS TYPE NAME |
|---|---|---|---|---|---|---|
| 03* | 76.816 | 0.10 | 1.61505 | 26.54 | 0.2831 | RESIN MATERIAL |
| 04 | 76.816 | 10.55 | 1.48749 | 70.24 | 0.3633 | OHARA S-FSL5 |
| 05 | 15446.495 | 0.20 | | | | |
| 06 | 75.559 | 10.17 | 1.43875 | 94.94 | 0.3529 | OHARA S-FPL53 |
| 07 | 1368.706 | VARIABLE(A) | | | | |
| 08 | −146.028 | 2.00 | 1.59522 | 67.73 | 0.3431 | OHARA S-FPM2 |
| 09 | 42.654 | 0.20 | | | | |
| 10 | 40.000 | 6.73 | 1.80000 | 29.84 | 0.3117 | OHARA S-NBH55 |
| 11 | −3191.505 | 2.00 | 1.67003 | 47.23 | 0.3338 | OHARA S-BAH10 |
| 12 | 31.671 | VARIABLE(B) | | | | |
| 13 | −50.487 | 1.50 | 1.60300 | 65.44 | 0.3498 | OHARA S-PHM53 |
| 14 | 18.890 | 2.94 | 1.85026 | 32.27 | 0.3145 | OHARA S-LAH71 |
| 15 | 34.671 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 80.235 | 3.47 | 1.49700 | 81.54 | 0.3501 | OHARA S-FPL51 |
| 20 | −73.028 | 0.20 | | | | |
| 21 | 57.165 | 3.63 | 1.49700 | 81.54 | 0.3501 | OHARA S-FPL51 |
| 22 | −89.319 | 0.20 | | | | |
| 23 | 30.165 | 5.04 | 1.49700 | 81.54 | 0.3501 | OHARA S-FPL51 |
| 24 | −38.510 | 1.50 | 1.83400 | 37.16 | 0.3245 | OHARA S-LAH60 |
| 25 | 33.545 | 2.44 | | | | |
| 26 | −47.119 | 1.50 | 1.48749 | 70.24 | 0.3633 | OHARA S-FSL5 |
| 27 | 20.000 | 5.95 | 1.54072 | 47.23 | 0.3353 | OHARA S-TIL2 |
| 28 | −33.828 | 64.462 | | | | |
| 29 | ∞ | 3.50 | 1.51633 | 64.14 | | VARIOUS FILTER |
| 30 | ∞ | 1.000 | | | | |

Diffractive Surface; Third Surface
$\lambda = 587.56$ (nm), $C_4 = -2.06961 \times 10^{-5}$, $C_6 = 1.17380 \times 10^{-9}$

VARIABLE INTERVAL

| | WIDE ANGLE END f = 17.07 | INTERMEDIATE FOCAL DISTANCE f = 91.26 | TELEPHOTO END f = 487.2 |
|---|---|---|---|
| A | 5.400 | 78.425 | 94.911 |
| B | 71.253 | 6.594 | 44.438 |
| C | 66.028 | 57.662 | 3.332 |

MAGNIFICATION OF EACH LENS GROUP

| | WIDE ANGLE END f = 17.07 | INTERMEDIATE FOCAL DISTANCE f = 91.26 | TELEPHOTO END f = 487.2 |
|---|---|---|---|
| SECOND LENS GROUP | −0.713 | −73.919 | 3.335 |
| THIRD LENS GROUP | 0.207 | 0.0107 | −1.264 |
| FOURTH LENS GROUP | −0.780 | −0.780 | −0.780 |

Conditional Expression Numerical Value $m_{2T}/m_{2W} = -4.68$ $m_{3T}/m_{3W} = -6.11$ $(m_{3T}/m_{3W})/(m_{2T}/m_{2W}) = 1.31$ $(D_{34W} - D_{34T})/f_w = 3.67$ $L_4/T_{4F\text{-}I} = 0.261$ $v_{1GP} = 82.6$ $f_T/f_{DOE} = 0.0202$ $v_{4GP} = 81.5$ $f_1/f_W = 8.68$ $f_2/f_W = -3.08$ $f_3/f_W = -2.50$ $f_4/f_W = 2.74$ Telephoto Ratio at Telephoto End: 0.573

(NUMERICAL EXAMPLE 4)
f = 17.1 to 487, F = 3.95 to 6.96, ω = 14.0 to 0.470

| SURFACE NUMBER | r | d | $n_d$ | $v_d$ | $\theta_{C,A'}$ | GLASS TYPE NAME |
|---|---|---|---|---|---|---|
| 01 | 157.716 | 2.50 | 1.83400 | 37.16 | 0.3245 | OHARA S-LAH60 |
| 02 | 80.188 | 0.10 | 1.64310 | 38.82 | 0.3124 | RESIN MATERIAL |
| 03* | 80.188 | 0.10 | 1.61505 | 26.54 | 0.2831 | RESIN MATERIAL |
| 04 | 80.188 | 10.84 | 1.48749 | 70.24 | 0.3633 | OHARA S-FSL5 |
| 05 | −965.701 | 0.20 | | | | |
| 06 | 74.859 | 10.21 | 1.43875 | 94.94 | 0.3529 | OHARA S-FPL53 |
| 07 | 1250.261 | VARIABLE(A) | | | | |
| 08 | −1102.688 | 2.00 | 1.59522 | 67.73 | 0.3431 | OHARA S-FPM2 |
| 09 | 54.624 | 0.20 | | | | |
| 10 | 51.978 | 9.76 | 1.68893 | 31.07 | 0.3142 | OHARA S-TIM28 |
| 11 | −48.077 | 2.00 | 1.85026 | 32.27 | 0.3331 | OHARA S-LAH51 |
| 12 | 42.896 | VARIABLE(B) | | | | |
| 13 | −47.465 | 1.50 | 1.59522 | 67.73 | 0.3431 | OHARA S-FPM2 |
| 14 | 16.926 | 2.87 | 1.85026 | 32.27 | 0.3145 | OHARA S-LAH71 |
| 15 | 30.040 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19* | 25.662 | 4.50 | 1.43875 | 94.94 | 0.3529 | OHARA S-FPL53 |
| 20 | −107.684 | 0.20 | | | | |
| 21 | 39.448 | 3.48 | 1.49700 | 81.54 | 0.3501 | OHARA S-FPL51 |
| 22 | −244.335 | 0.20 | | | | |
| 23 | 30.534 | 4.06 | 1.49700 | 81.54 | 0.3501 | OHARA S-FPL51 |
| 24 | −65.075 | 3.64 | 1.80610 | 40.93 | 0.3289 | OHARA S-LAH53 |
| 25 | 19.436 | 4.53 | | | | |
| 26 | 385.080 | 1.50 | 1.48749 | 70.24 | 0.3633 | OHARA S-FSL5 |
| 27 | 20.000 | 3.89 | 1.54814 | 45.78 | 0.3331 | OHARA S-TIL1 |
| 28 | −99.699 | 48.589 | | | | |
| 29 | ∞ | 3.50 | 1.51633 | 64.14 | | VARIOUS FILTER |
| 30 | ∞ | 1.000 | | | | |

Diffractive Surface; Third Surface $\lambda=587.56$ (nm), $C_4=-2.07977\times10^{-5}$, $C_6=9.76351\times10^{-10}$ Aspheric Surface; Nineteenth Surface $K=0.0$, $A_4=-7.21843\times10^{-6}$, $A_6=-6.52396\times10^{-9}$, $A_8=4.67279\times10^{-12}$ Surface number 19 denotes the nineteenth surface.

VARIABLE INTERVAL

| | WIDE ANGLE END f = 17.05 | INTERMEDIATE FOCAL DISTANCE f = 91.30 | TELEPHOTO END f = 487.3 |
|---|---|---|---|
| A | 5.846 | 75.128 | 87.903 |
| B | 65.173 | 6.100 | 47.276 |
| C | 67.232 | 57.023 | 3.072 |

MAGNIFICATION OF EACH LENS GROUP

| | WIDE ANGLE END f = 17.05 | INTERMEDIATE FOCAL DISTANCE f = 91.30 | TELEPHOTO END f = 487.3 |
|---|---|---|---|
| SECOND LENS GROUP | −0.847 | 11.221 | 3.093 |
| THIRD LENS GROUP | 0.188 | −0.0758 | −1.469 |
| FOURTH LENS GROUP | −0.749 | −0.749 | −0.749 |

Conditional Expression Numerical Value $m_{2T}/m_{2W}=-3.65$ $m_{3T}/m_{3W}=-7.81$ $(m_{3T}/m_{3W})/(m_{2T}/m_{2W})=2.14$ $(D_{34W}-D_{34T})/f_w=3.64$ $L_4/T_{4F-J}=0.334$ $v_{1GP}=82.6$ $f_T/f_{DOE}=0.0203$ $v_{4GP}=86.0$ $f_1/f_W=8.39$ $f_2/f_W=-3.19$ $f_3/f_W=-2.27$ $f_4/f_W=2.47$ Telephoto Ratio at Telephoto End: 0.542

(NUMERICAL EXAMPLE 5)
f = 17.1 to 487, F = 4.00 to 6.96, ω = 14.1 to 0.470

| SURFACE NUMBER | r | d | $n_d$ | $v_d$ | $\theta_{C,A'}$ | GLASS TYPE NAME |
|---|---|---|---|---|---|---|
| 01 | 172.744 | 2.50 | 1.78800 | 47.37 | 0.3383 | OHARA S-LAH64 |
| 02 | 81.144 | 0.78 | | | | |
| 03 | 80.286 | 9.17 | 1.43875 | 94.94 | 0.3529 | OHARA S-FPL53 |
| 04 | 505.373 | 0.20 | | | | |
| 05 | 98.978 | 2.50 | 1.51742 | 52.43 | 0.3410 | OHARA S-NSL36 |
| 06 | 68.083 | 0.96 | | | | |
| 07 | 69.238 | 10.05 | 1.43875 | 94.94 | 0.3529 | OHARA S-FPL53 |
| 08 | 368.951 | 0.20 | | | | |
| 09 | 82.756 | 9.61 | 1.43875 | 94.94 | 0.3529 | OHARA S-FPL53 |
| 10 | 5833.436 | VARIABLE(A) | | | | |
| 11 | −104.036 | 2.00 | 1.59522 | 67.73 | 0.3431 | OHARA S-FPM2 |
| 12 | 211.482 | 0.20 | | | | |
| 13 | 86.251 | 7.34 | 1.80000 | 29.84 | 0.3117 | OHARA S-NBH55 |
| 14 | −50.501 | 2.00 | 1.74320 | 49.34 | 0.3414 | OHARA S-LAM60 |
| 15 | 33.103 | VARIABLE(B) | | | | |
| 16 | −46.420 | 1.50 | 1.60300 | 65.44 | 0.3498 | OHARA S-PHM53 |
| 17 | 16.928 | 2.36 | 1.85026 | 32.27 | 0.3145 | OHARA S-LAH71 |
| 18 | 30.729 | VARIABLE(C) | | | | |
| 19 | ∞ | 1.00 | 1.51633 | 64.14 | | FILTER |
| 20 | ∞ | 0.90 | | | | |
| 21 | APERTURE | 3.50 | | | | |
| 22 | 75.345 | 3.41 | 1.49700 | 81.54 | 0.3501 | OHARA S-FPL51 |
| 23 | −86.106 | 1.70 | | | | |
| 24 | 70.964 | 3.31 | 1.49700 | 81.54 | 0.3501 | OHARA S-FPL51 |
| 25 | −117.159 | 0.20 | | | | |
| 26 | 41.750 | 4.51 | 1.49700 | 81.54 | 0.3501 | OHARA S-FPL51 |
| 27 | −45.320 | 1.50 | 1.83400 | 37.16 | 0.3245 | OHARA S-LAH60 |
| 28 | 50.233 | 1.71 | | | | |
| 29 | 629.774 | 1.50 | 1.48749 | 70.24 | 0.3633 | OHARA S-FSL5 |
| 30 | 20.000 | 5.48 | 1.51742 | 52.43 | 0.3410 | OHARA S-NSL36 |
| 31 | −63.386 | 64.546 | | | | |
| 32 | ∞ | 3.50 | 1.51633 | 64.14 | | VARIOUS FILTER |
| 33 | ∞ | 1.000 | | | | |

VARIABLE INTERVAL

| | WIDE ANGLE END f = 17.08 | INTERMEDIATE FOCAL DISTANCE f = 91.51 | TELEPHOTO END f = 487.2 |
|---|---|---|---|
| A | 6.436 | 70.816 | 83.849 |
| B | 61.795 | 6.263 | 43.915 |
| C | 62.699 | 53.851 | 3.166 |

MAGNIFICATION OF EACH LENS GROUP

| | WIDE ANGLE END f = 17.08 | INTERMEDIATE FOCAL DISTANCE f = 91.51 | TELEPHOTO END f = 487.2 |
|---|---|---|---|
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |

Conditional Expression Numerical Value $m_{2T}/m_{2W} = -4.28$ $m_{3T}/m_{3W} = -6.67$ $(m_{3T}/m_{3W})/(m_{2T}/m_{2W}) = 1.56$ $(D_{34W} - D_{34T})/f_w = 3.49$ $L_4/T_{4F-I} = 0.256$ $v_{1GP} = 94.9$ $f_T/f_{DOE} = NA$ $v_{4GP} = 81.5$ $f_1/f_W = 7.94$ $f_2/f_W = -2.84$ $f_3/f_W = -2.24$ $f_4/f_W = 2.66$ Telephoto Ratio at Telephoto End: 0.575

Figure 21:
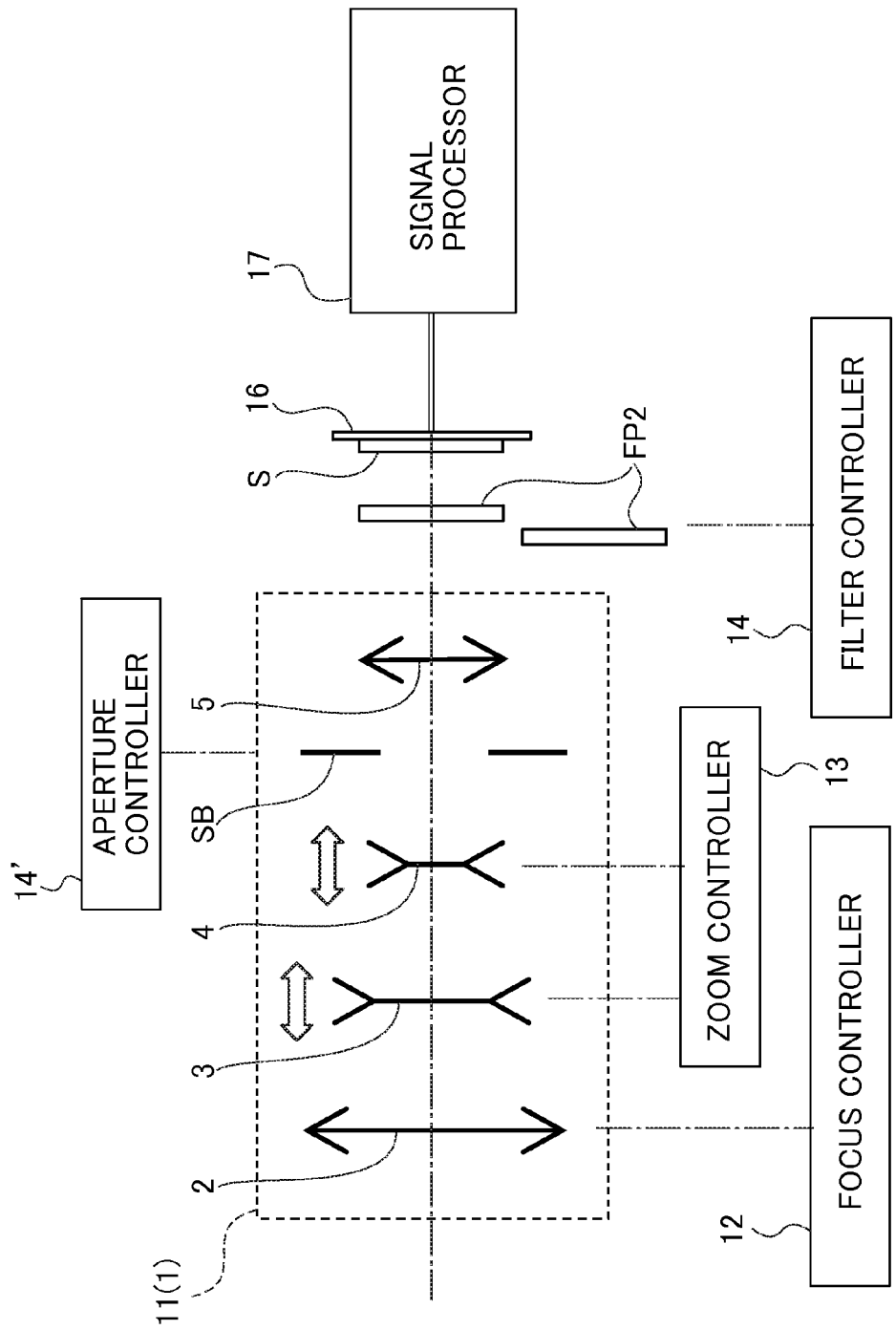
FIG. 21 is a view illustrating one example of an imaging device.
Figure 23:
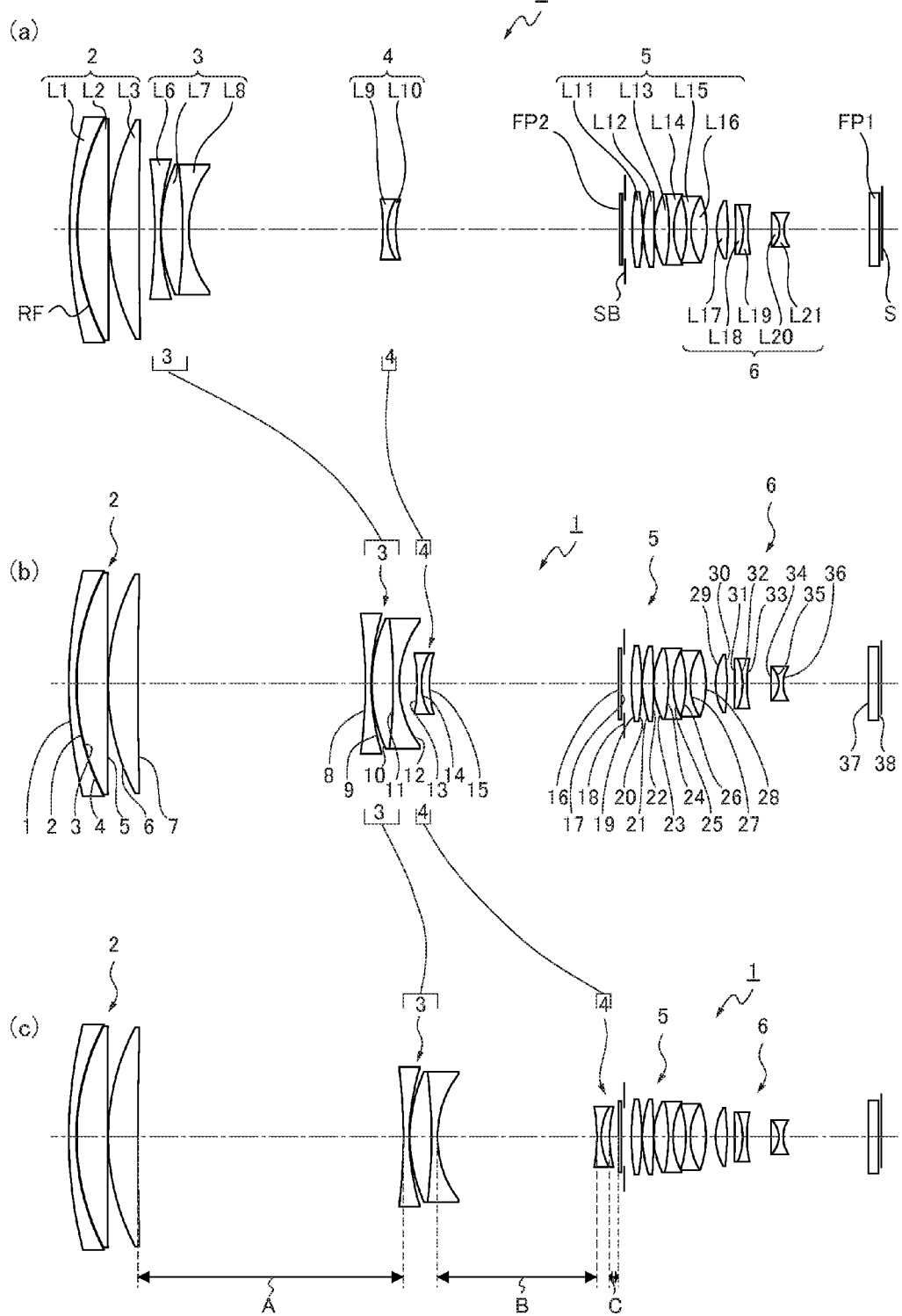
FIG. 23 is a sectional view illustrating the configuration of the zoom lens (extender lens group is inserted) of Numerical Example 6, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.
Figure 27:
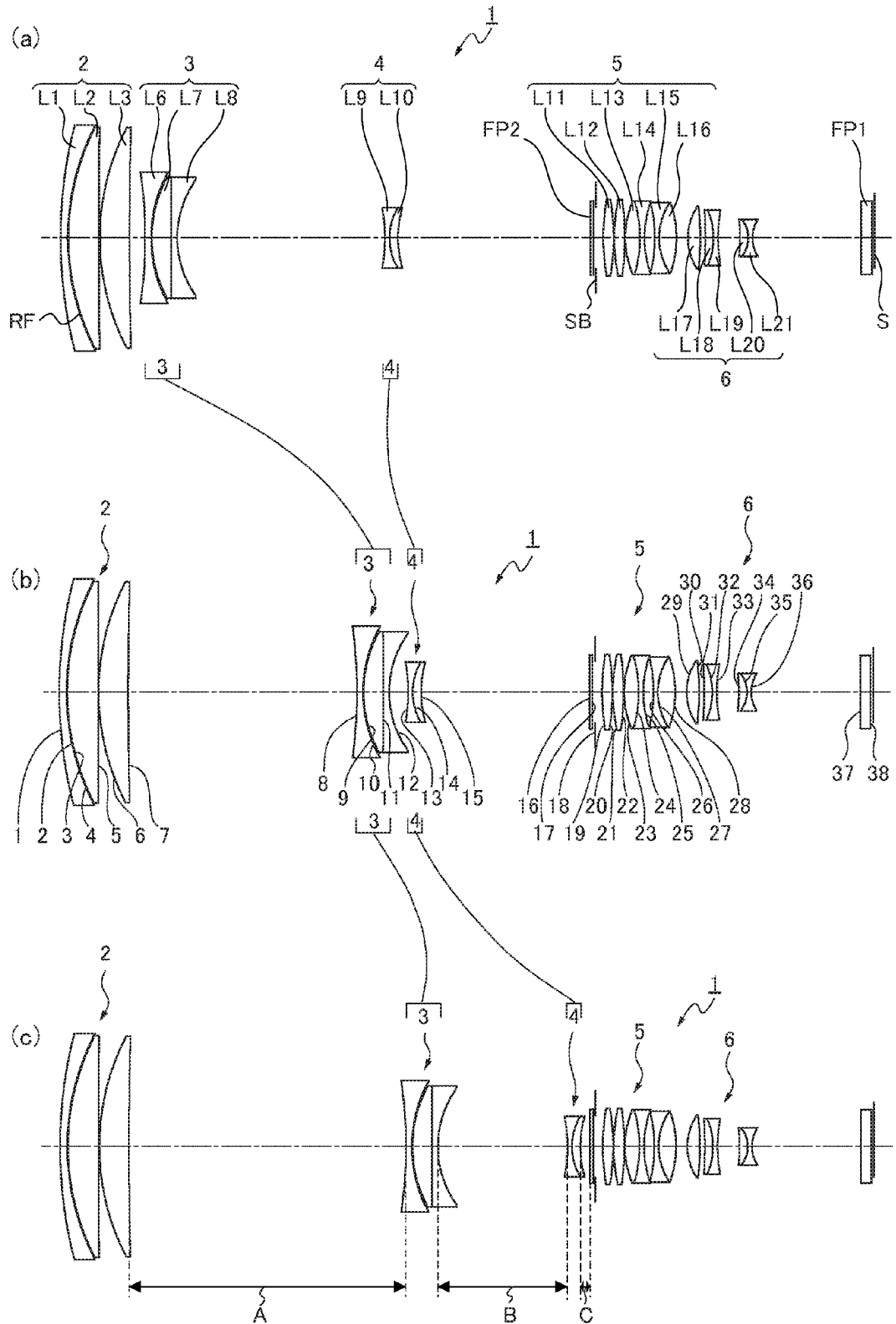
FIG. 27 is a sectional view illustrating the configuration of the zoom lens of Numerical Example 8 (extender lens group is inserted), (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.
Figure 28:
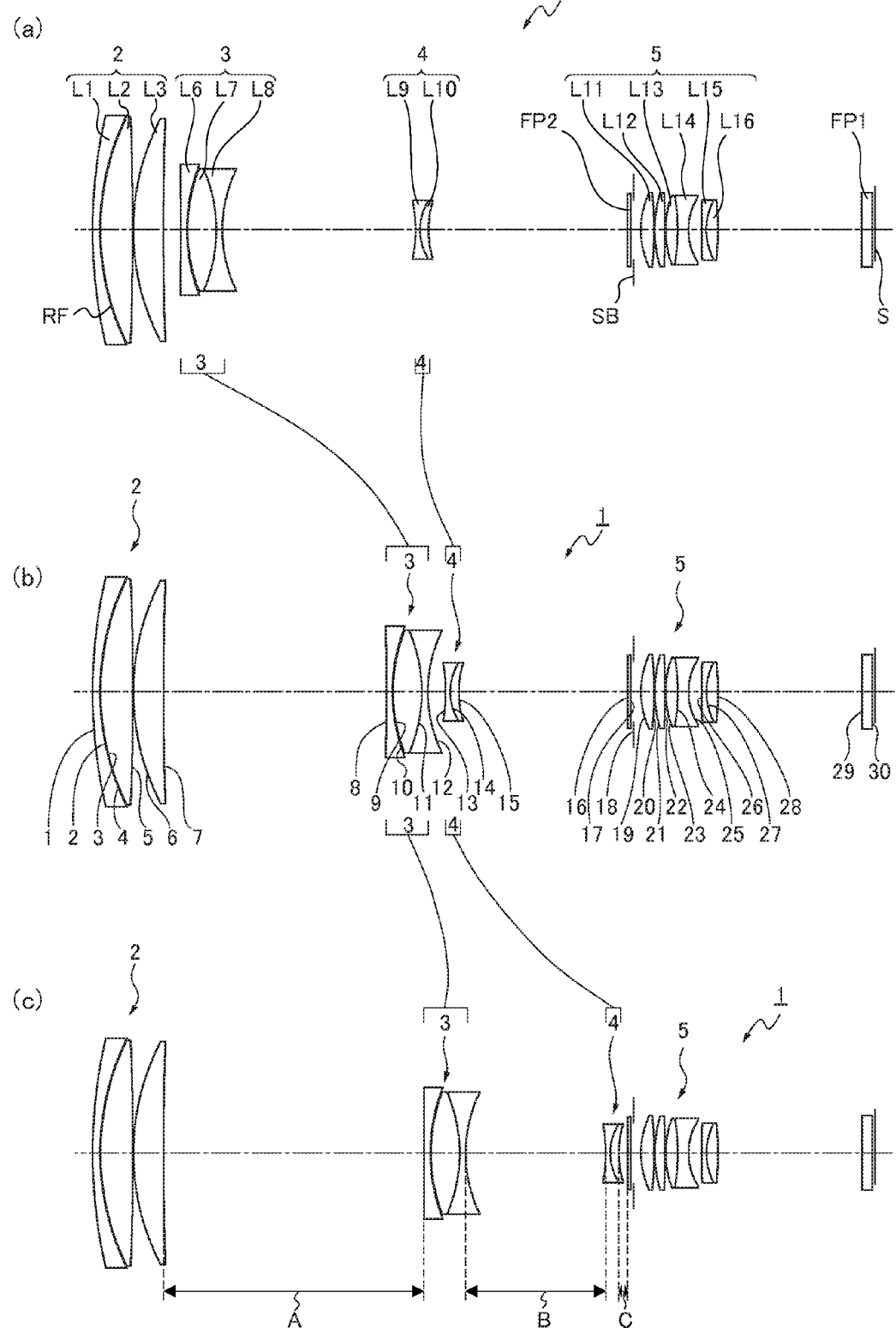
FIG. 28 is a sectional view illustrating the configuration of a zoom lens (extender lens group is not inserted) of Numerical Example 9, (a) illustrates the zoom lens in which the second lens group is adjacent to the most object side at the wide-angle end, (c) illustrates the zoom lens in which the third lens group is adjacent to the most image surface side at the telephoto end, and (b) illustrates the zoom lens in an intermediate focal distance.
Figure 32:
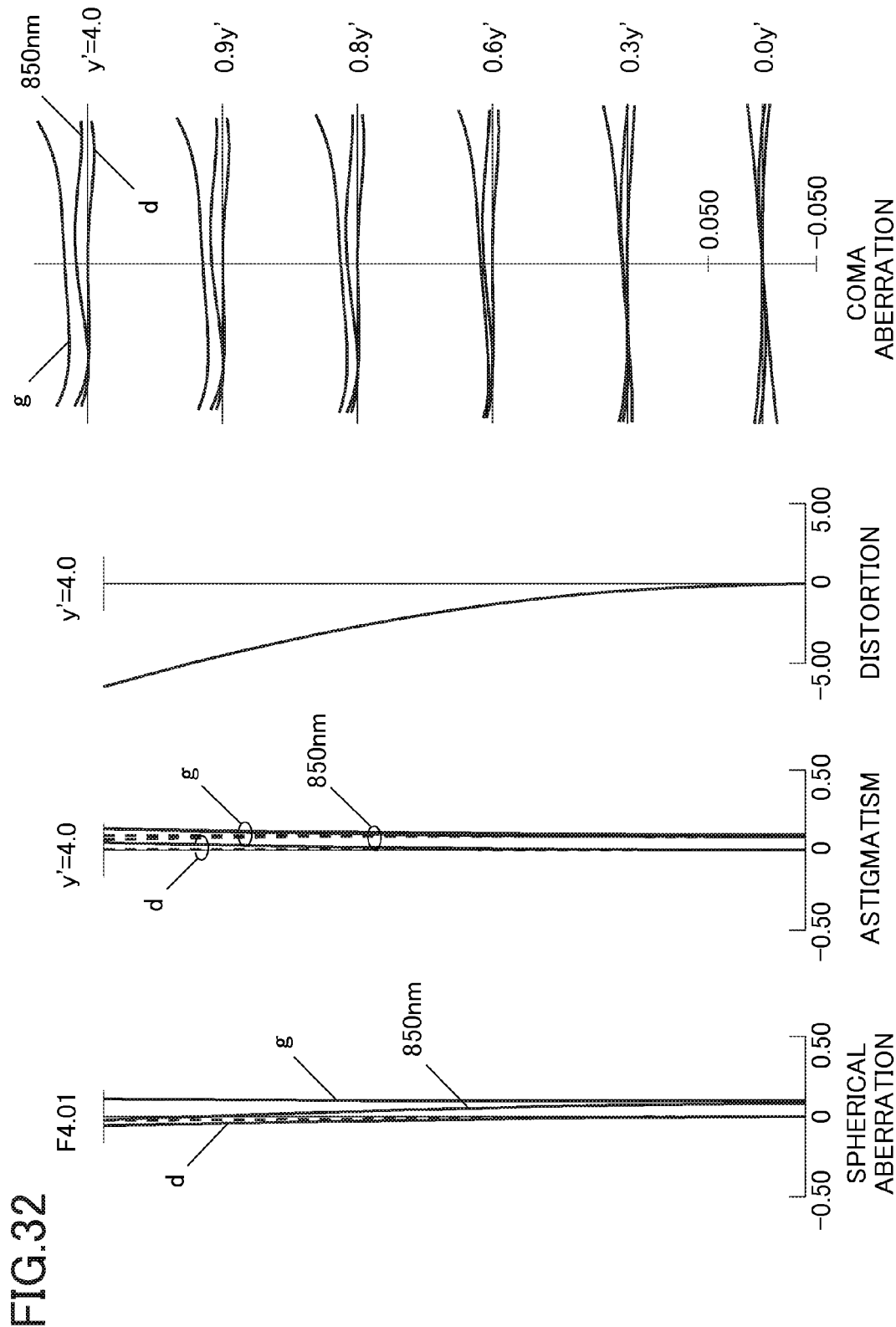
FIG. 32 illustrates aberration curves of the zoom lens (extender lens group is not inserted) of Numerical Example 6 at the wide-angle end.
Figure 33:
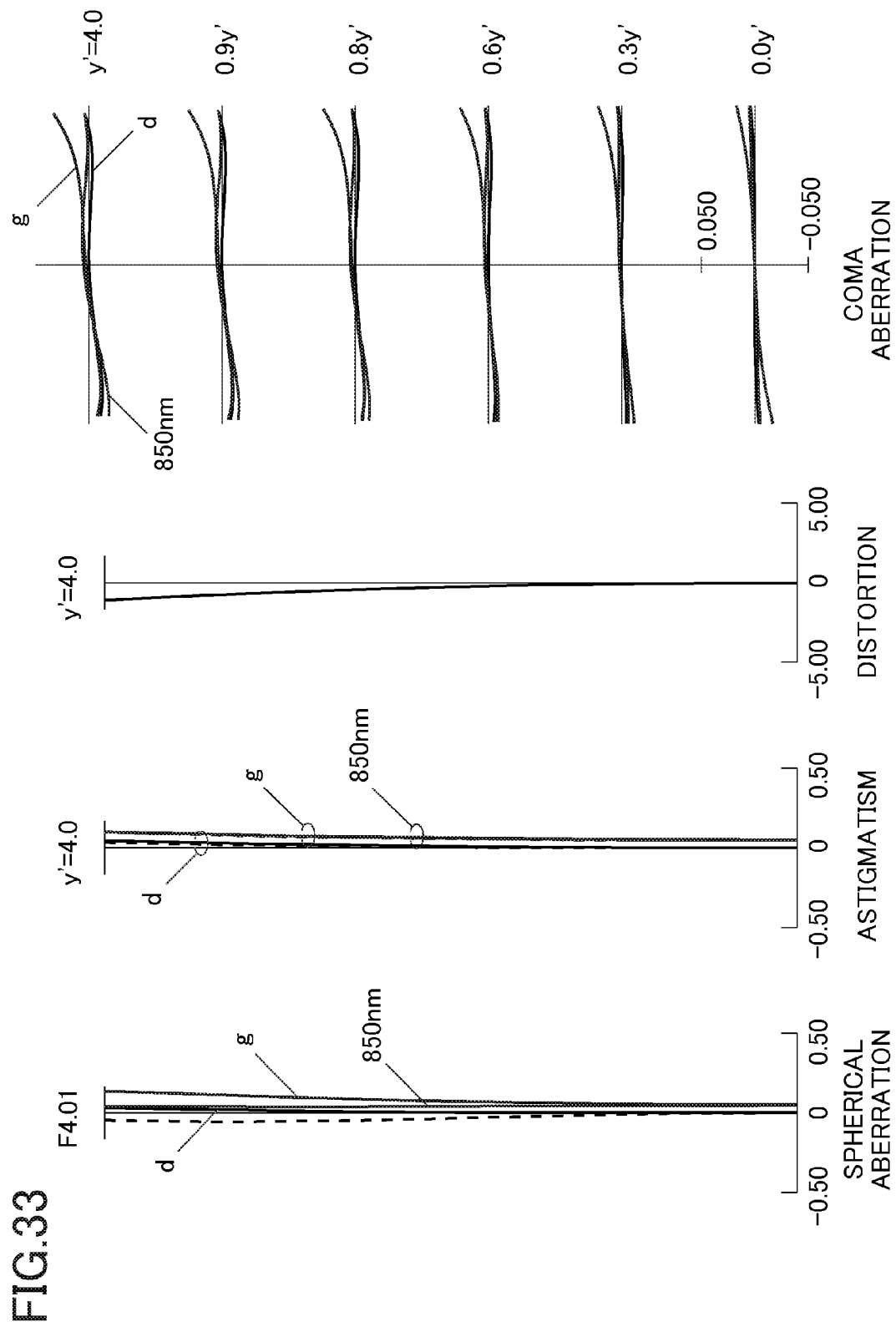
FIG. 33 illustrates aberration curves of the zoom lens (extender lens group is not inserted) of Numerical Example 6 in the intermediate focal distance.
Figure 34:
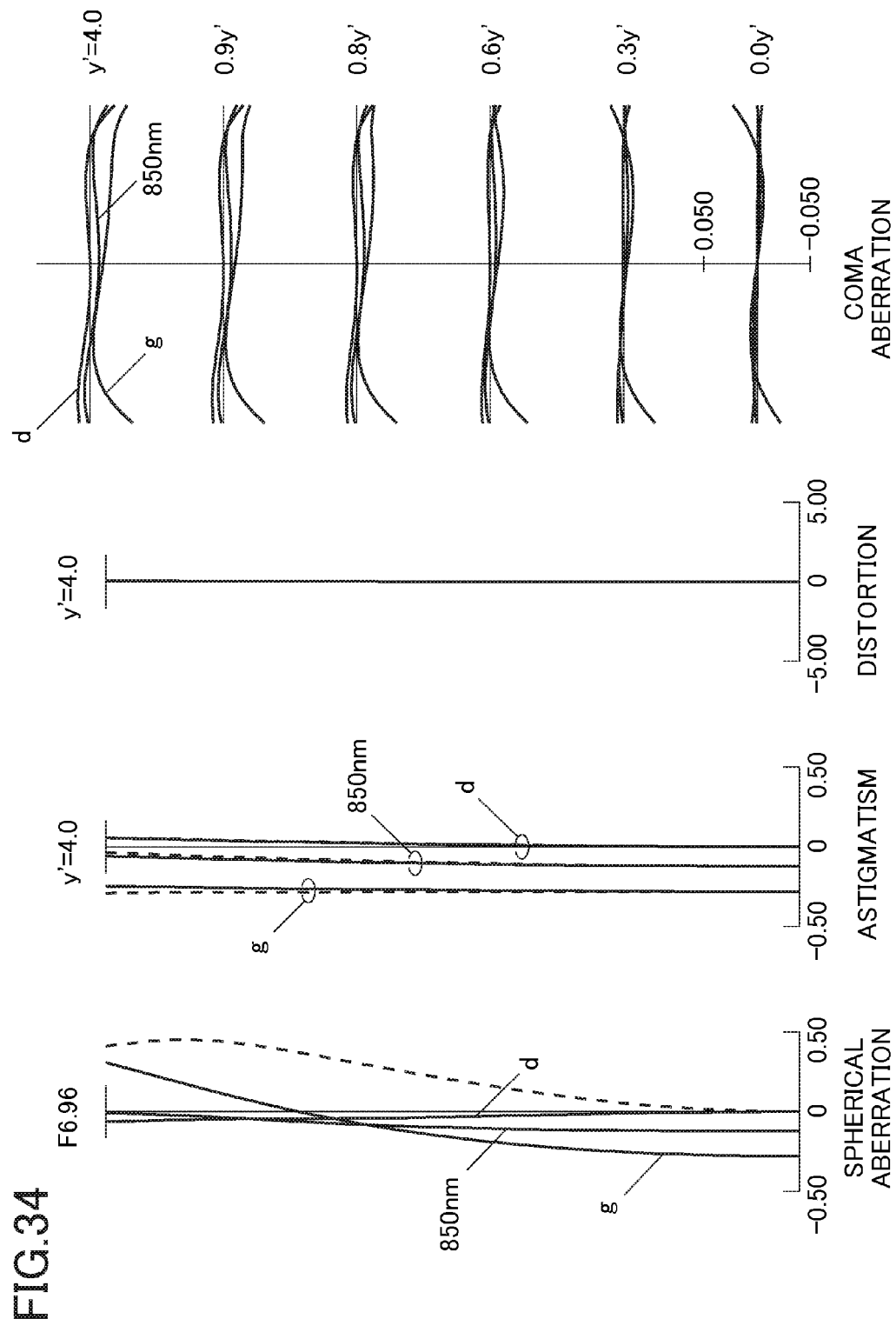
FIG. 34 illustrates aberration curves of the zoom lens (extender lens group is not inserted) of Numerical Example 6 at the telephoto end.
Figure 35:
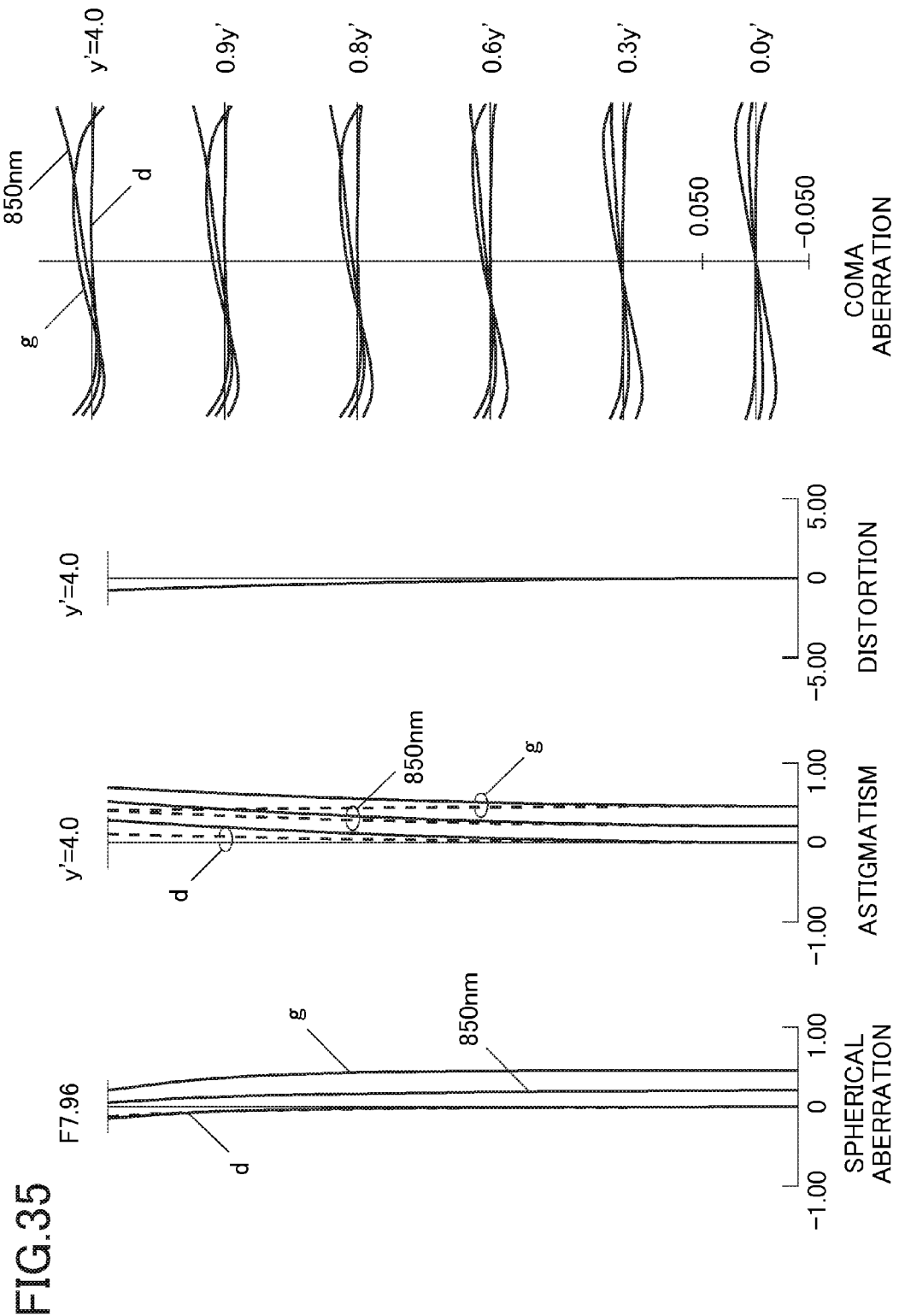
FIG. 35 illustrates aberration curves of the zoom lens (extender lens group is inserted) of Numerical Example 6 at the wide-angle end.
Figure 36:
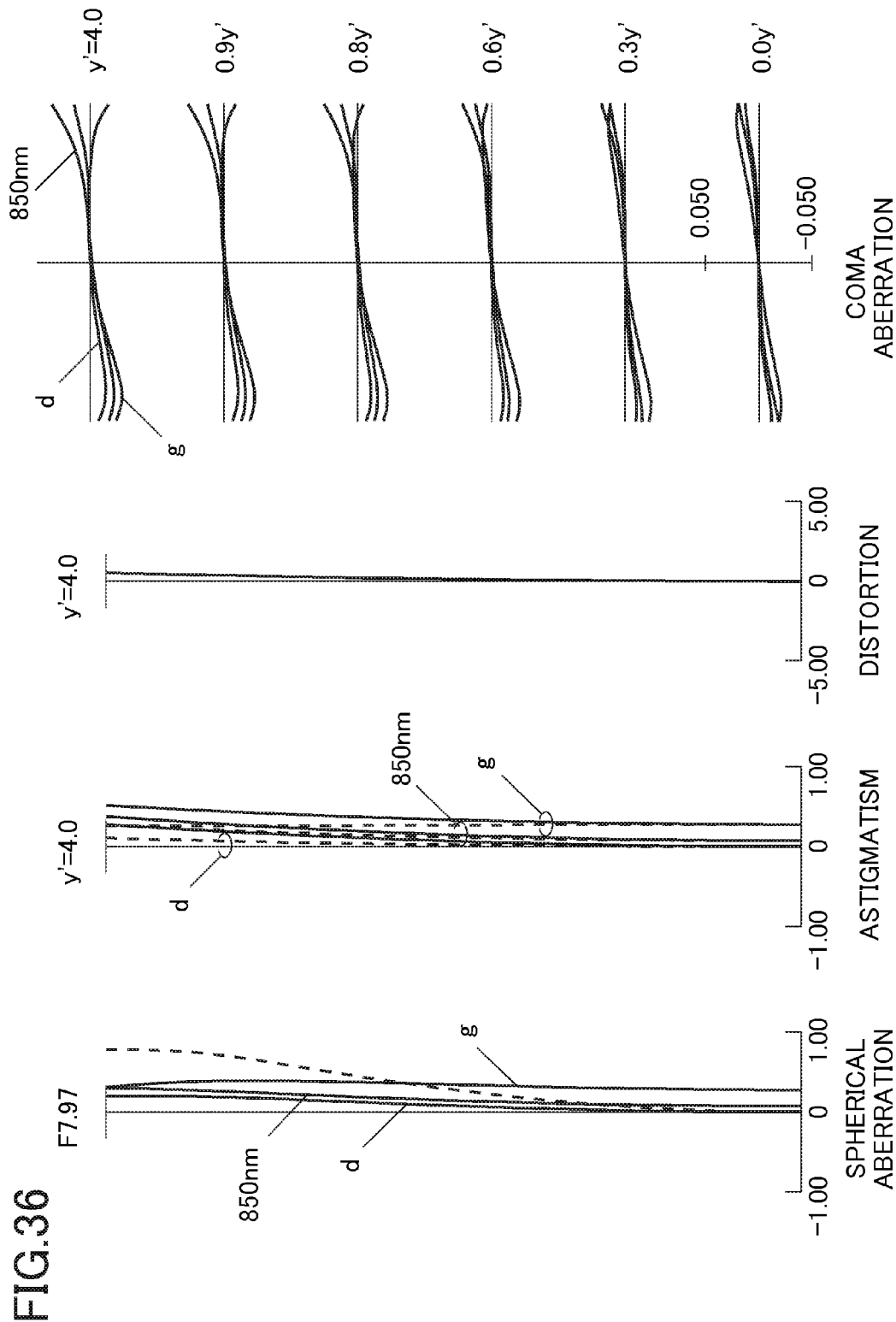
FIG. 36 illustrates aberration curves of the zoom lens (extender lens group is inserted) of Numerical Example 6 in the intermediate focal distance.
Figure 37:
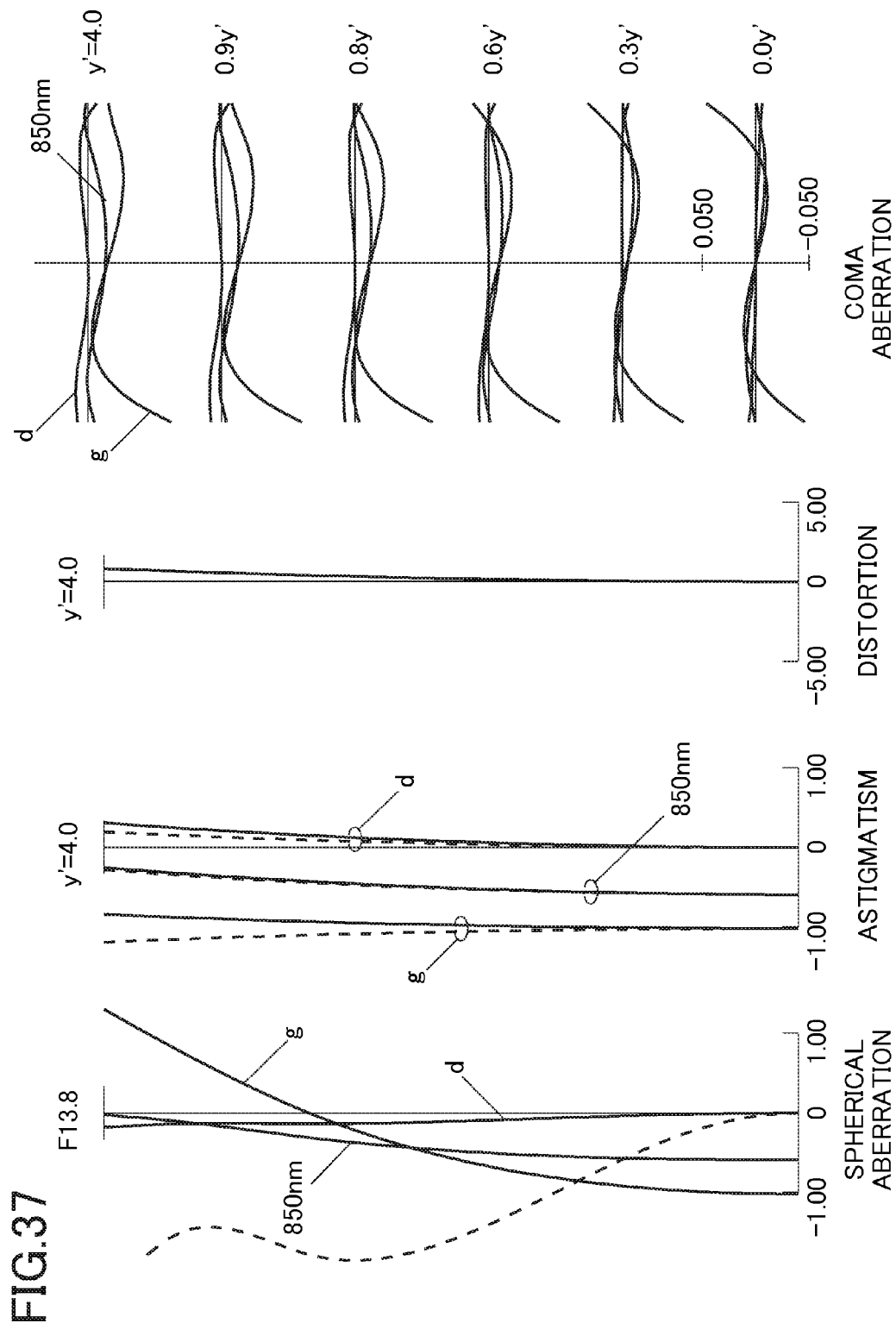
FIG. 37 illustrates aberration curves of the zoom lens (extender lens group is inserted) of Numerical Example 6 at the telephoto end.
Figure 38:
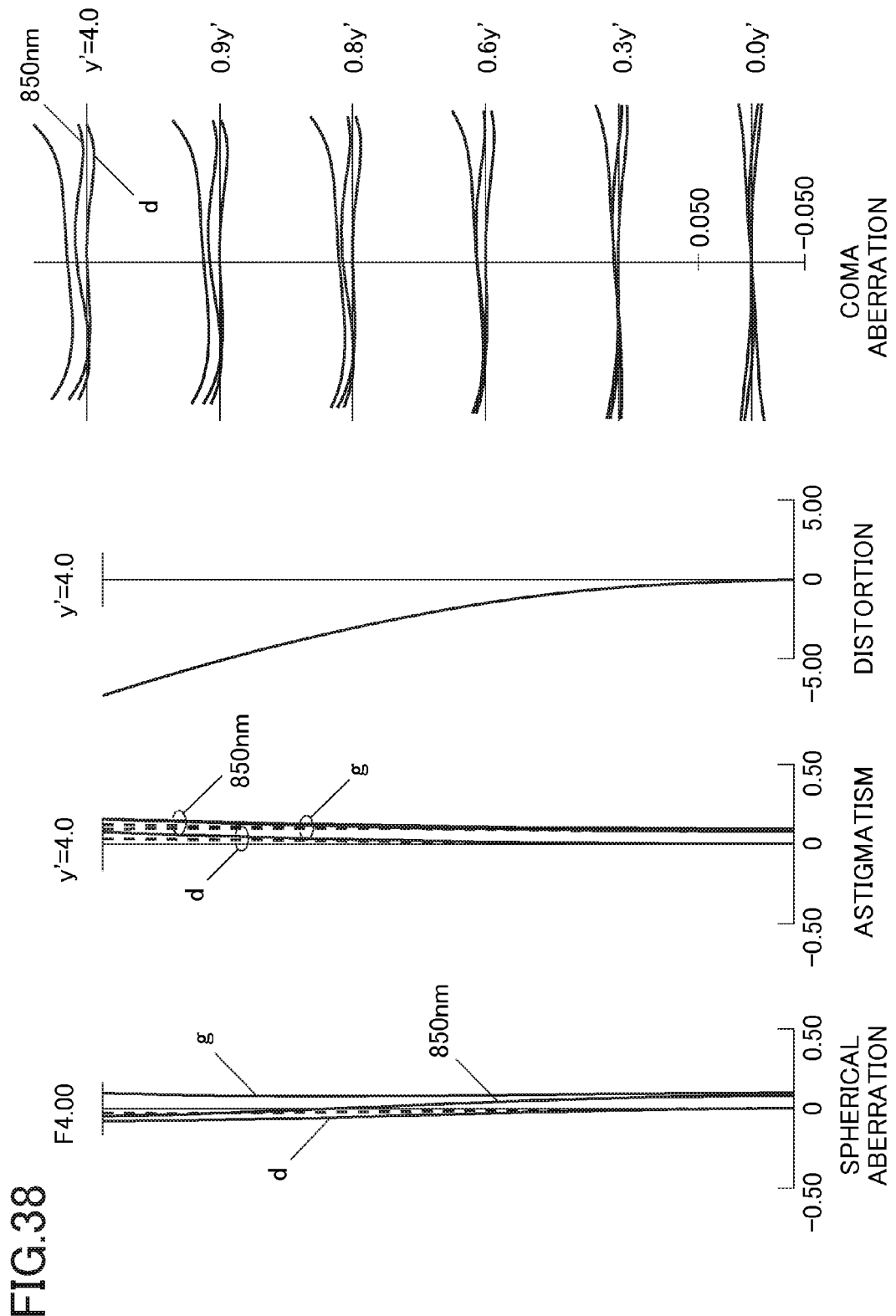
FIG. 38 illustrates aberration curves of the zoom lens (extender lens group is not inserted) of Numerical Example 7 at the wide-angle end.
Figure 39:
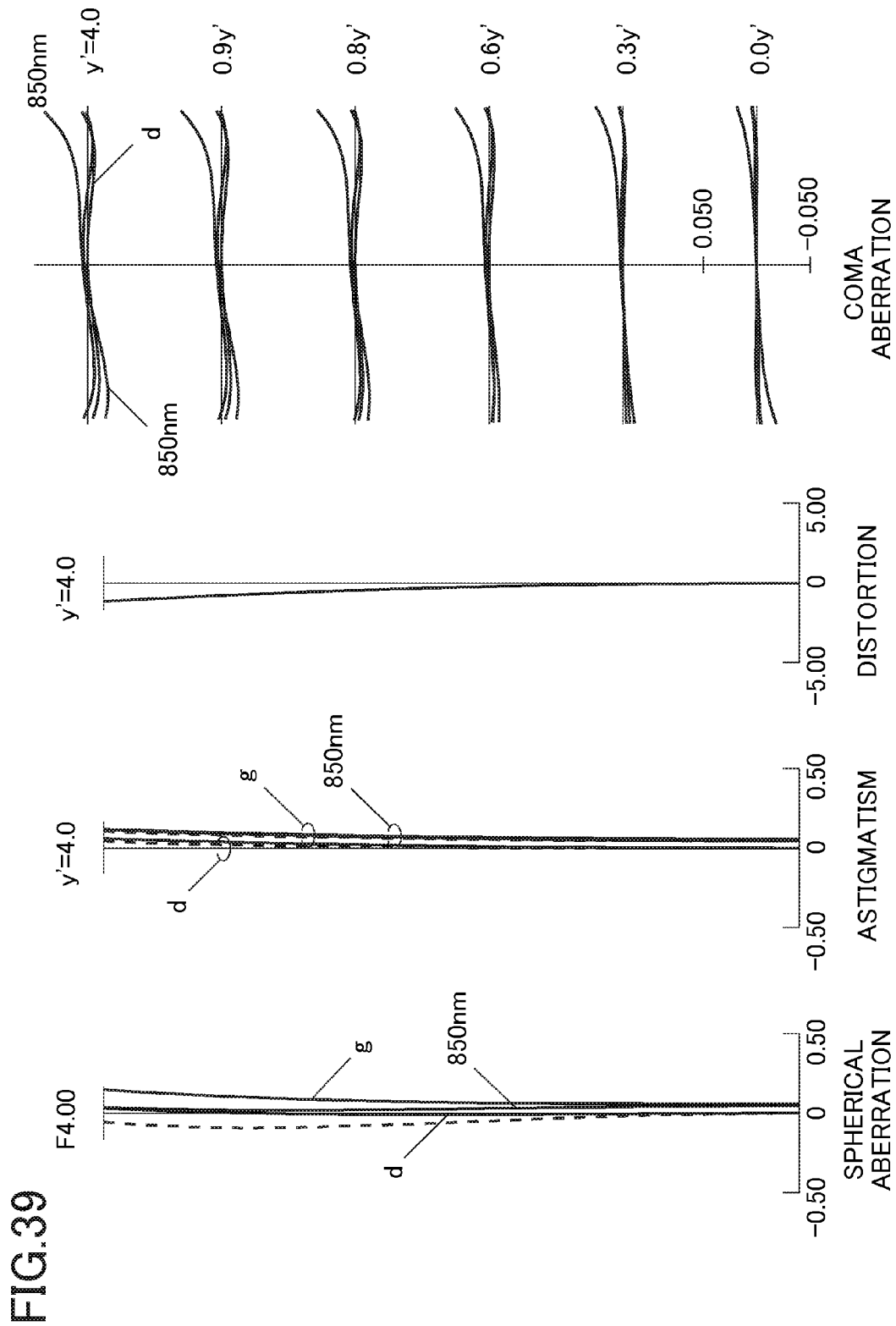
FIG. 39 illustrates aberration curves of the zoom lens (extender lens group is not inserted) of Numerical Example 7 in the intermediate focal distance.
Figure 40:
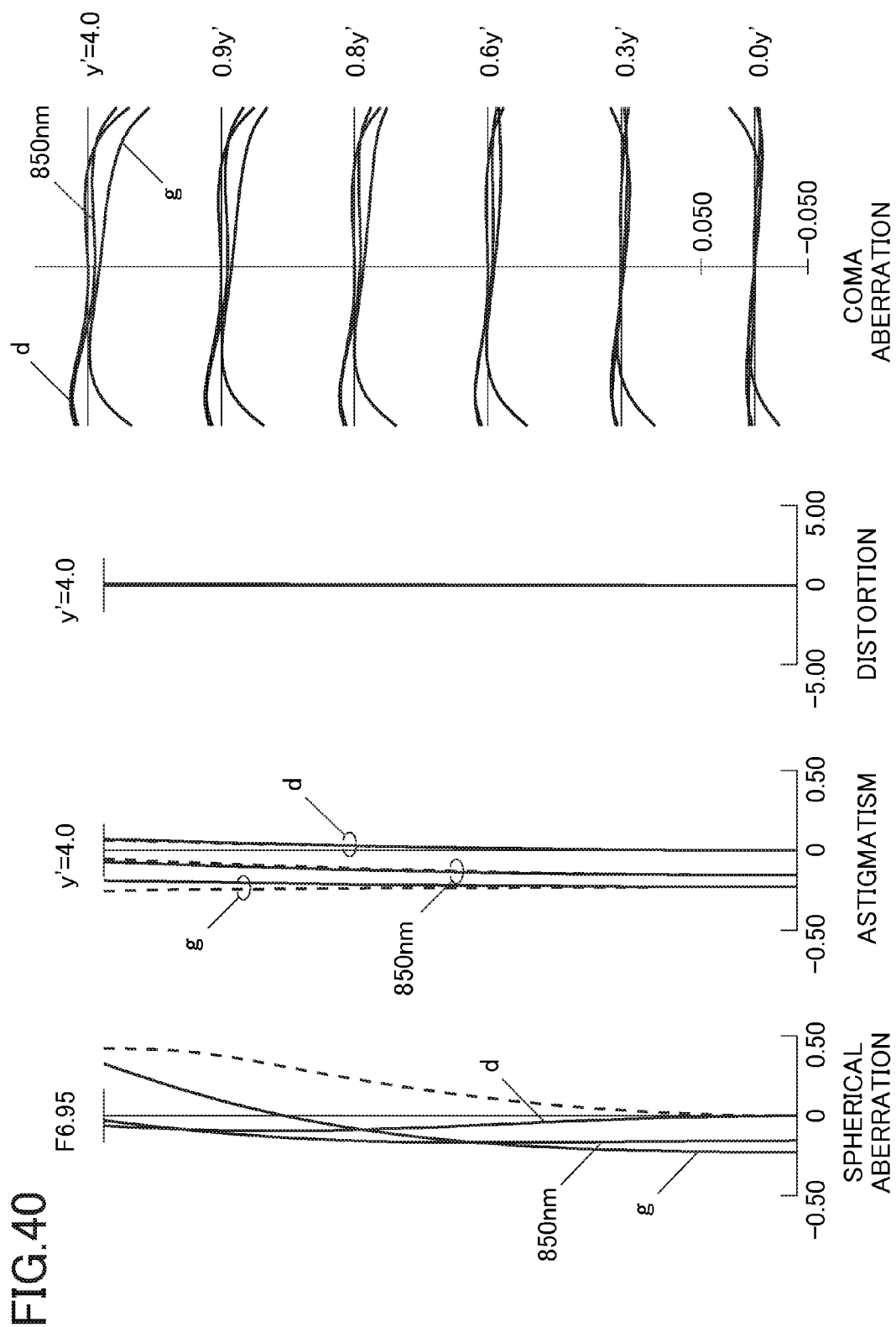
FIG. 40 illustrates aberration curves of the zoom lens (extender lens group is not inserted) of Numerical Example 7 at the telephoto end.
Figure 41:
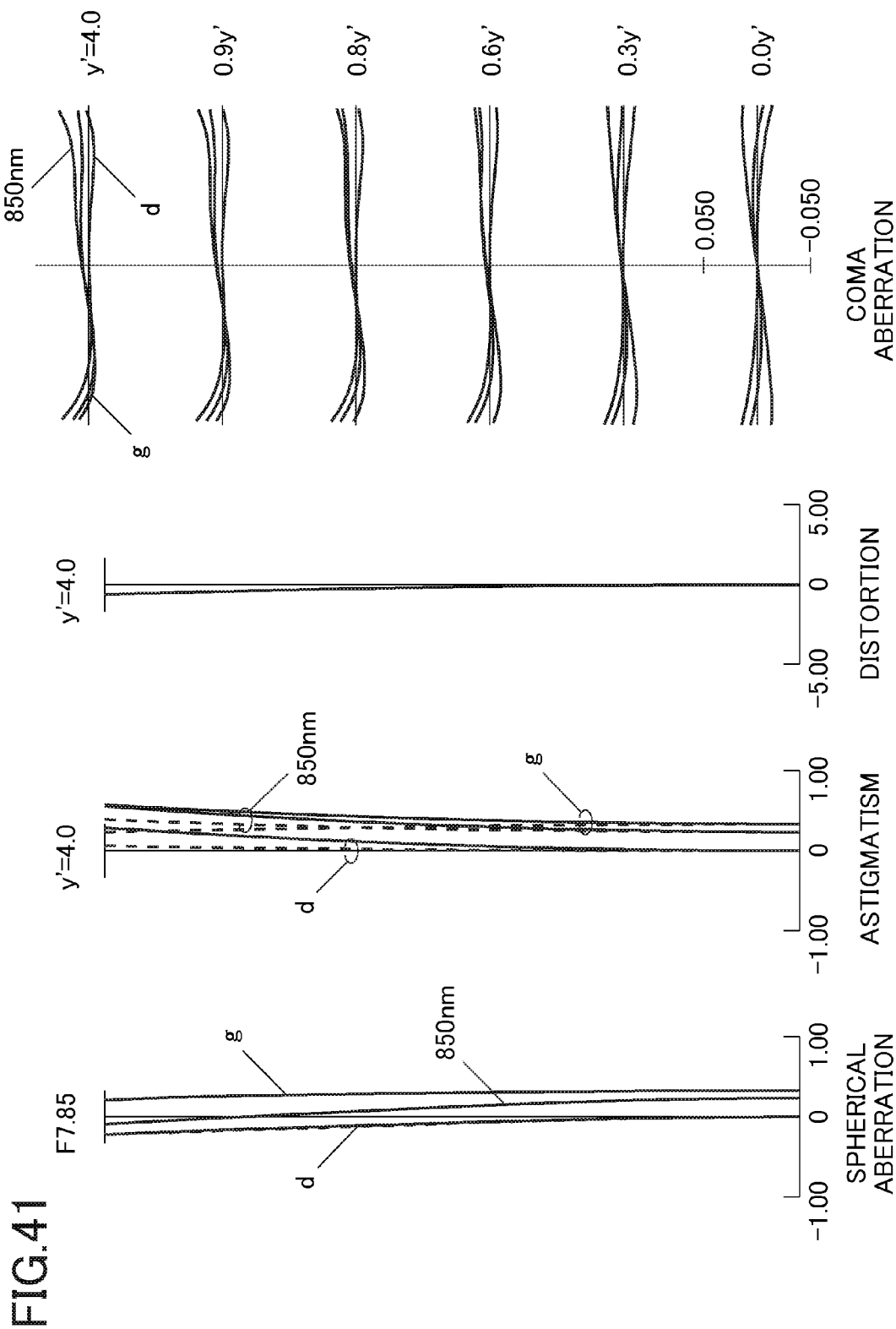
FIG. 41 illustrates aberration curves of the zoom lens (extender lens group is inserted) of Numerical Example 7 at the wide-angle end.
Figure 42:
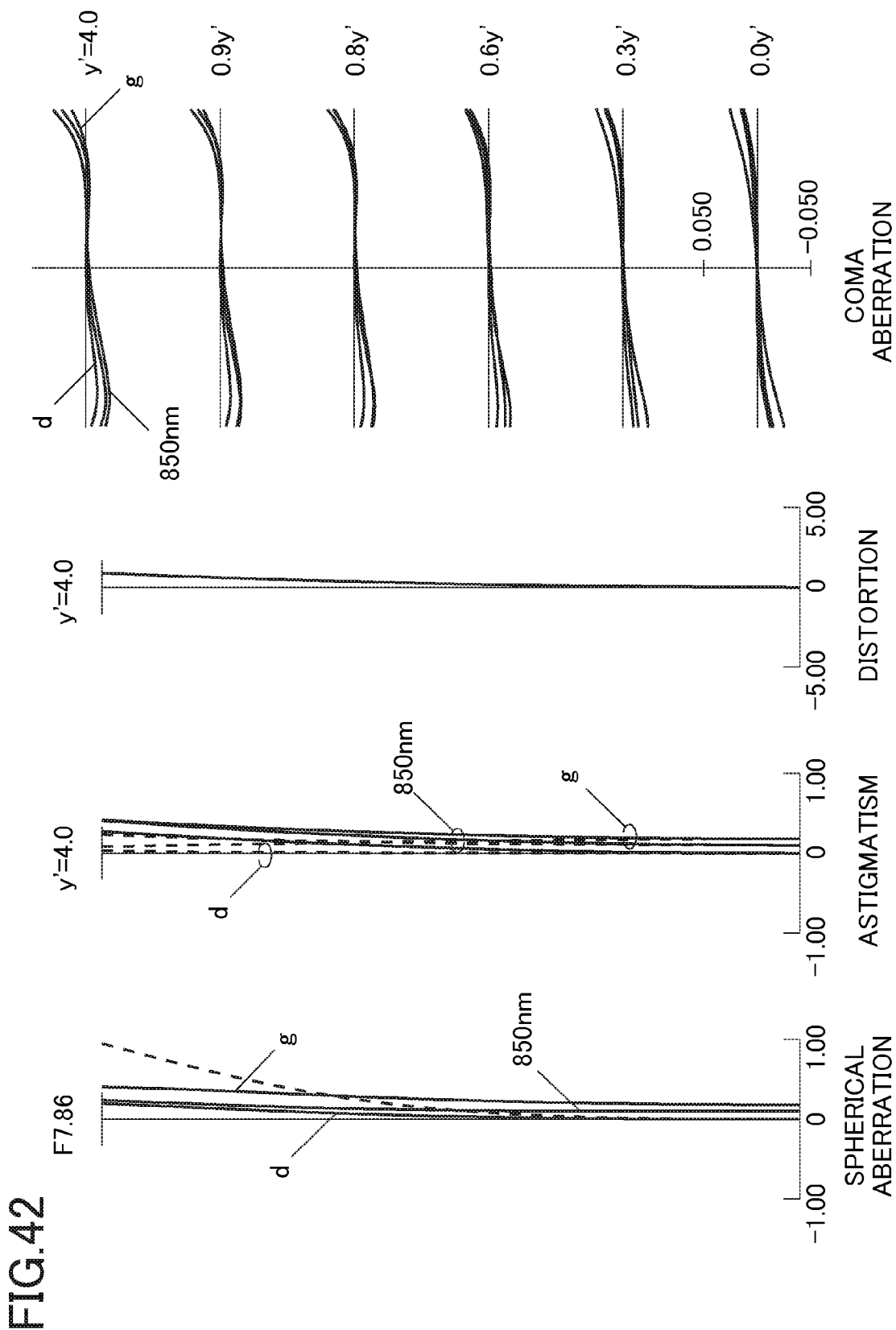
FIG. 42 illustrates aberration curves of the zoom lens (extender lens group is inserted) of Numerical Example 7 in the intermediate focal distance.
Figure 43:
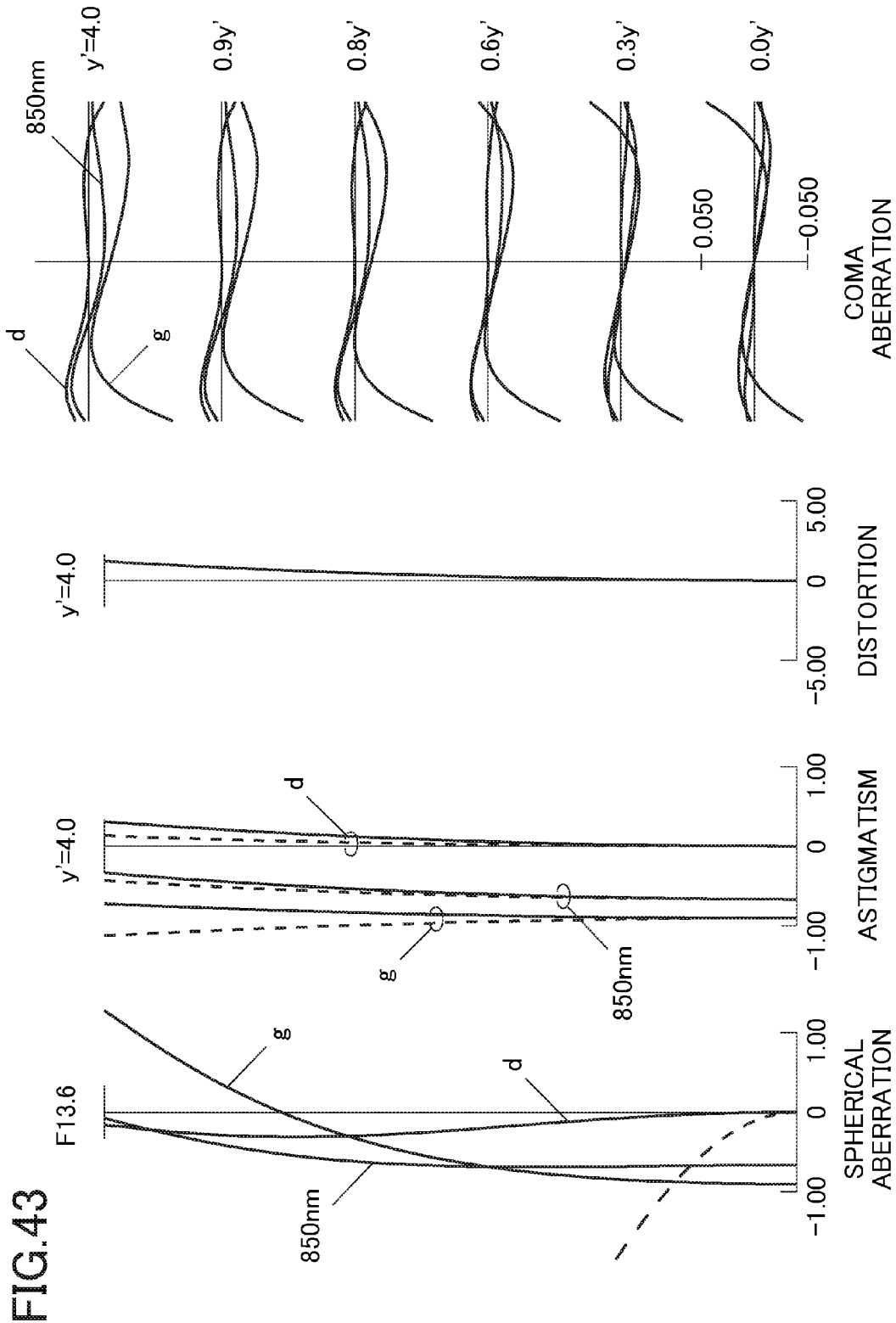
FIG. 43 provides aberration curves of the zoom lens (extender lens group is inserted) of Numerical Example 7 at the telephoto end.
Figure 44:
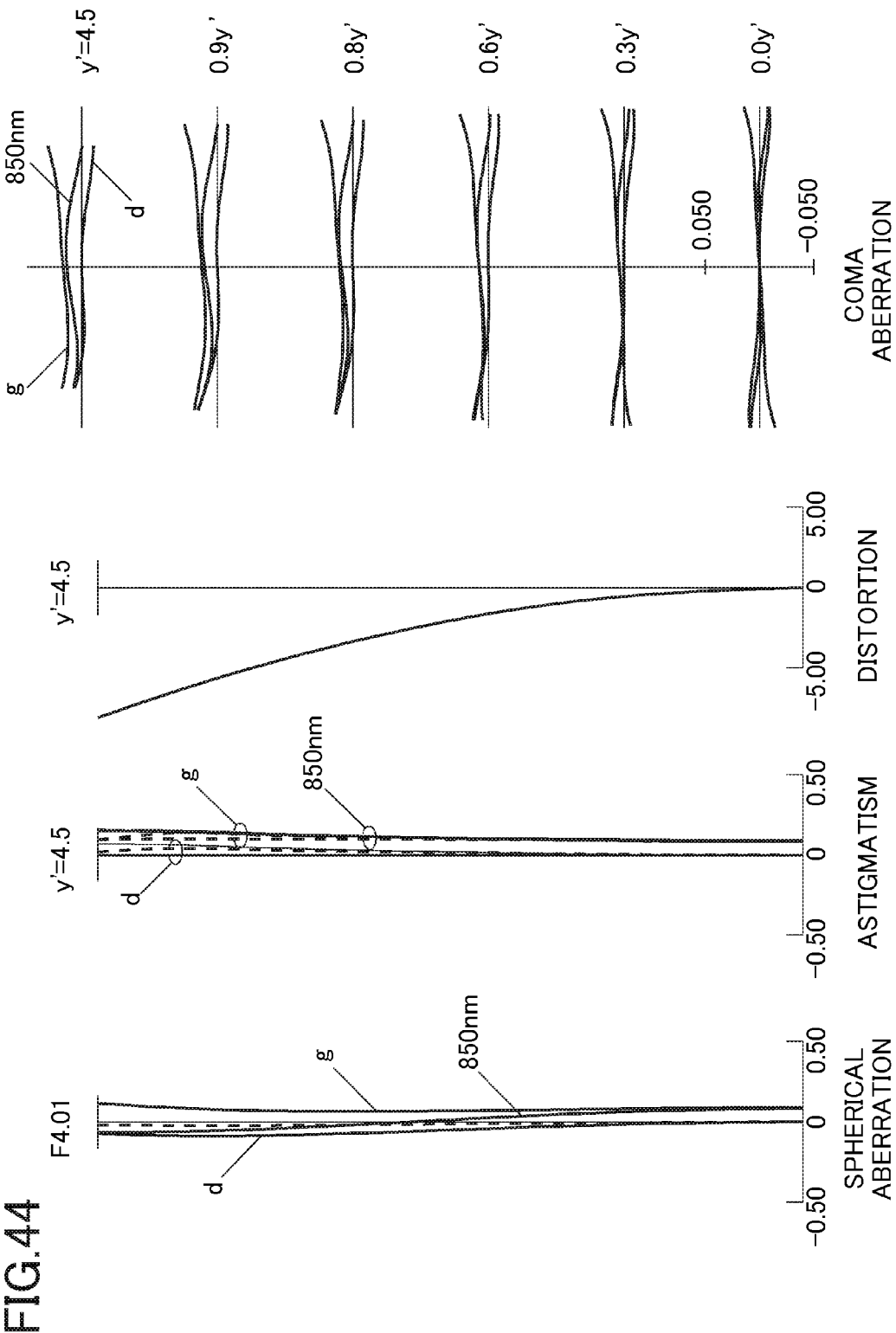
FIG. 44 illustrates aberration curves of the zoom lens (extender lens group is not inserted) of Numerical Example 8 at the wide-angle end.
Figure 45:
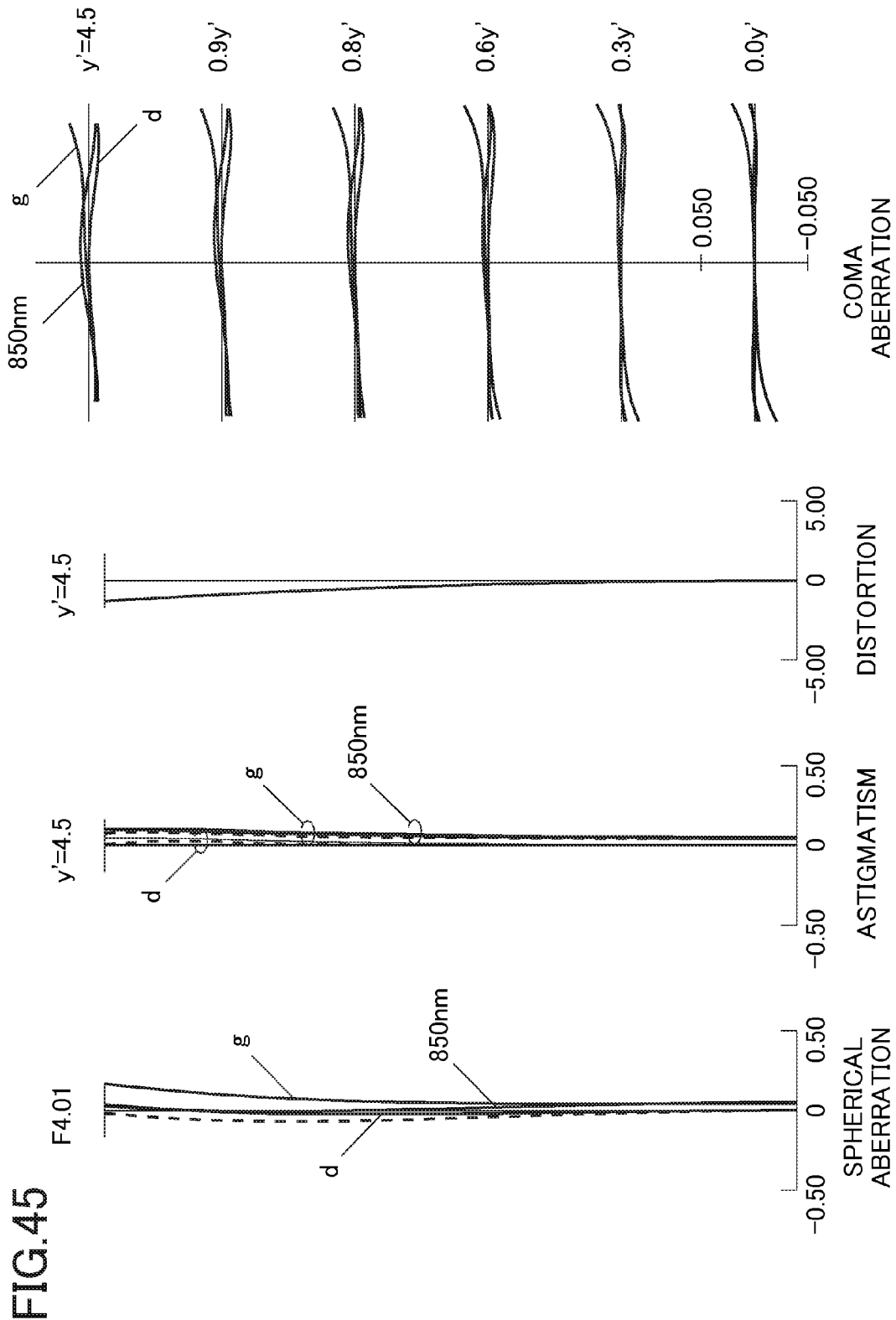
FIG. 45 illustrates aberration curves of the zoom lens (extender lens group is not inserted) of Numerical Example 8 in the intermediate focal distance.
Figure 46:
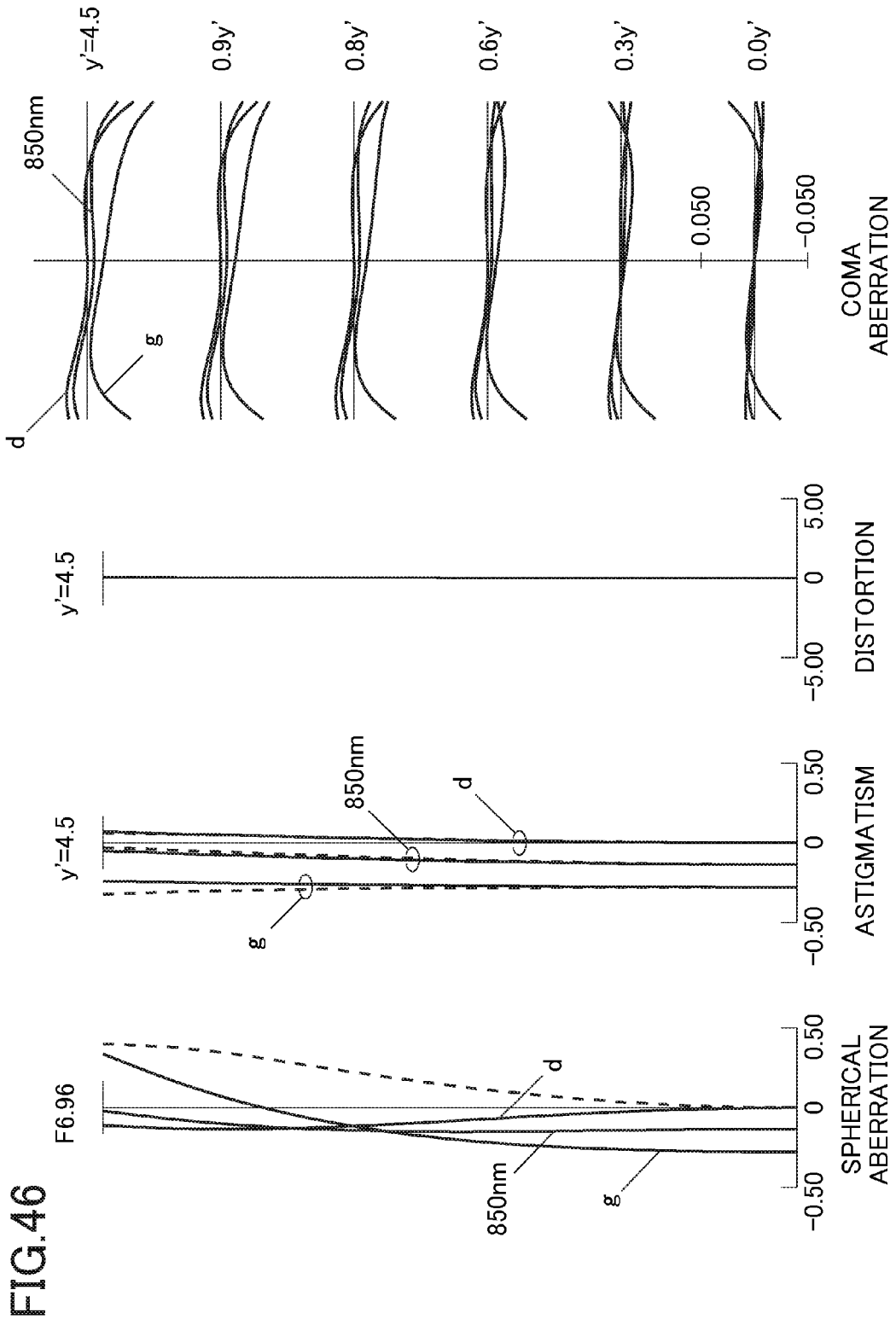
FIG. 46 illustrates aberration curves of the zoom lens (extender lens group is not inserted) of Numerical Example 8 at the telephoto end.
Figure 47:
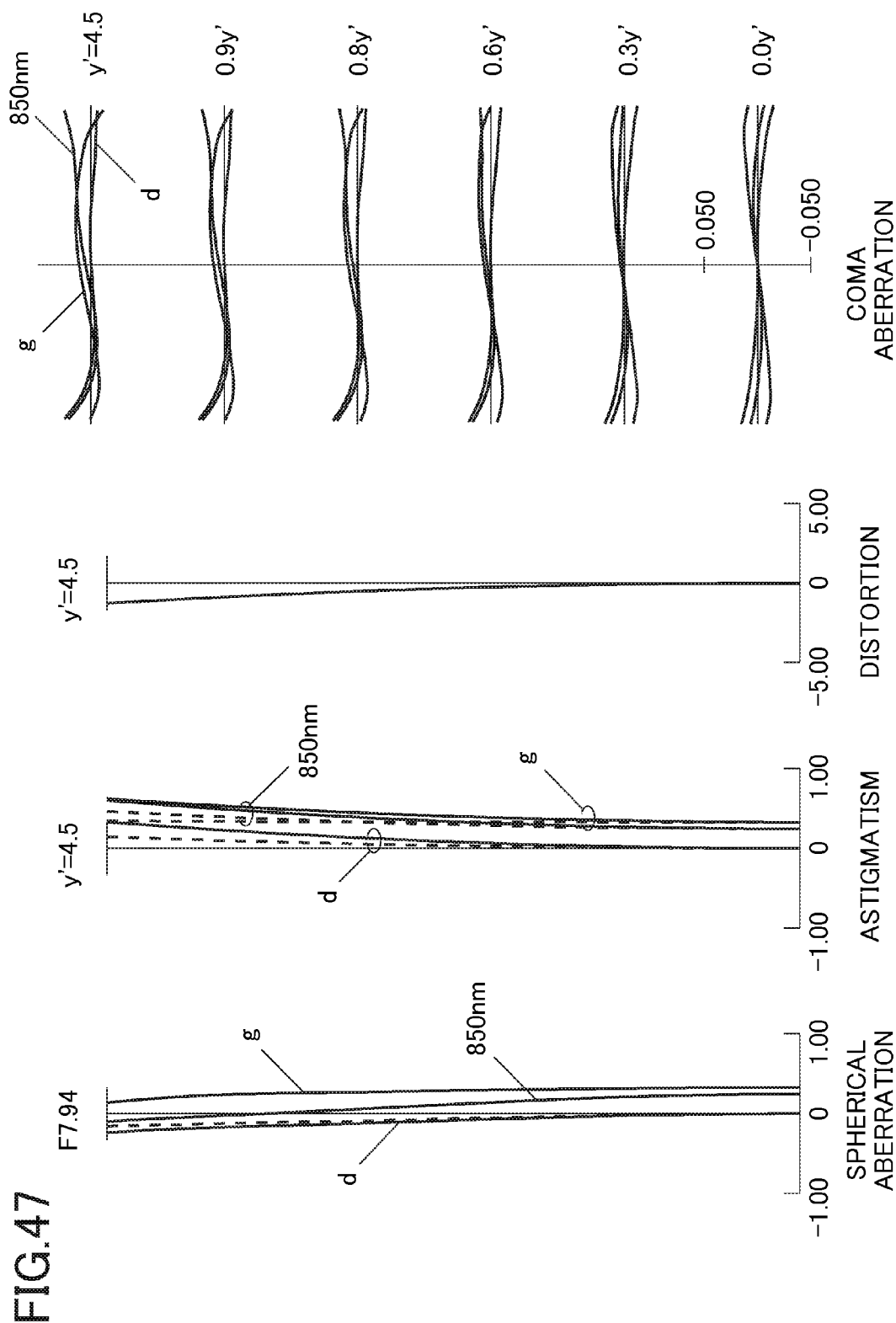
FIG. 47 illustrates aberration curves of the zoom lens (extender lens group is inserted) of Numerical Example 8 at the wide-angle end.
Figure 48:
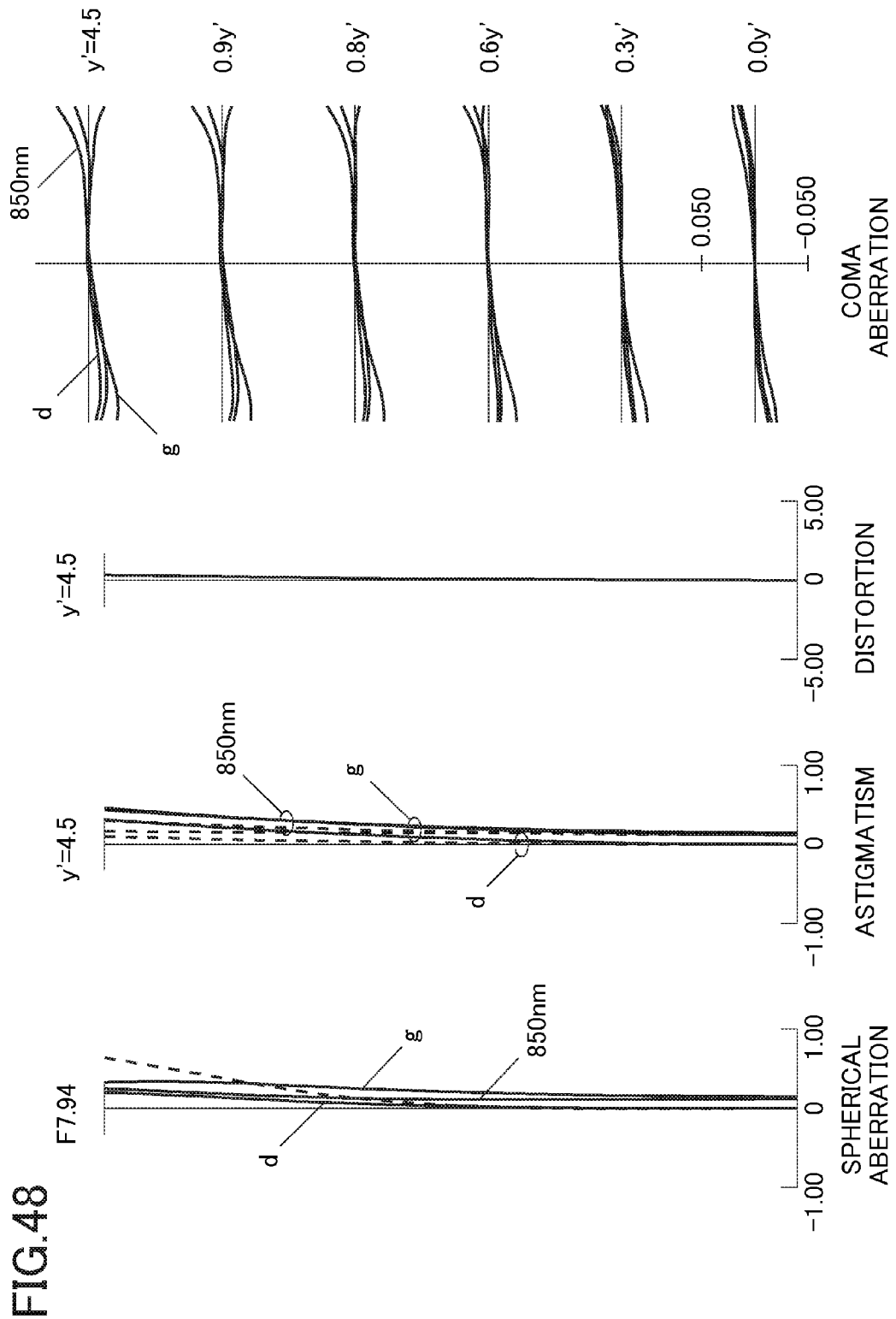
FIG. 48 illustrates aberration curves of the zoom lens (extender lens group is inserted) of Numerical Example 8 in the intermediate focal distance.
Figure 49:
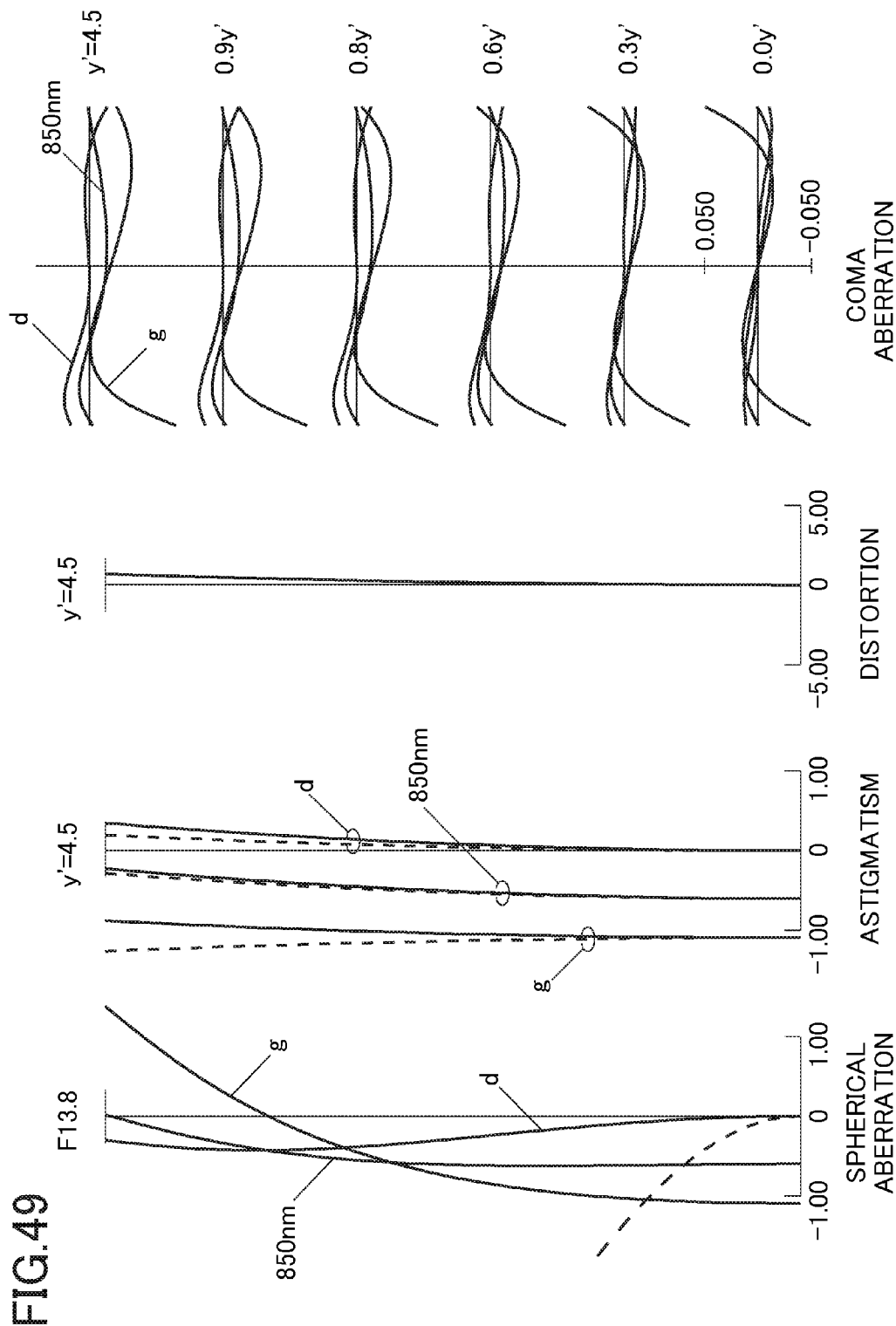
FIG. 49 illustrates aberration curves of the zoom lens (extender lens group is inserted) of Numerical Example 8 at the telephoto end.
Figure 50:
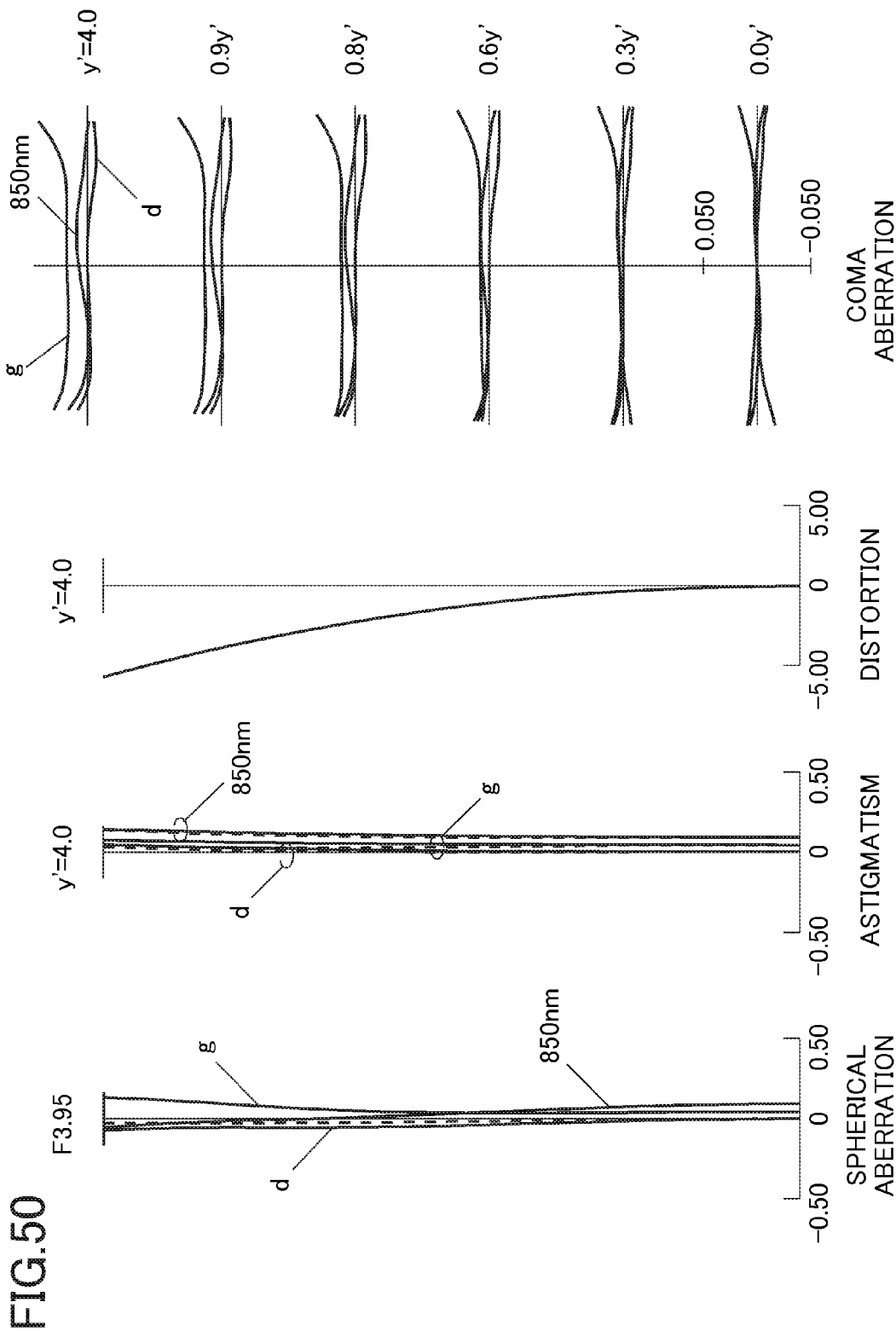
FIG. 50 illustrates aberration curves of the zoom lens (extender lens group is not inserted) of Numerical Example 9 at the wide-angle end.
Figure 51:
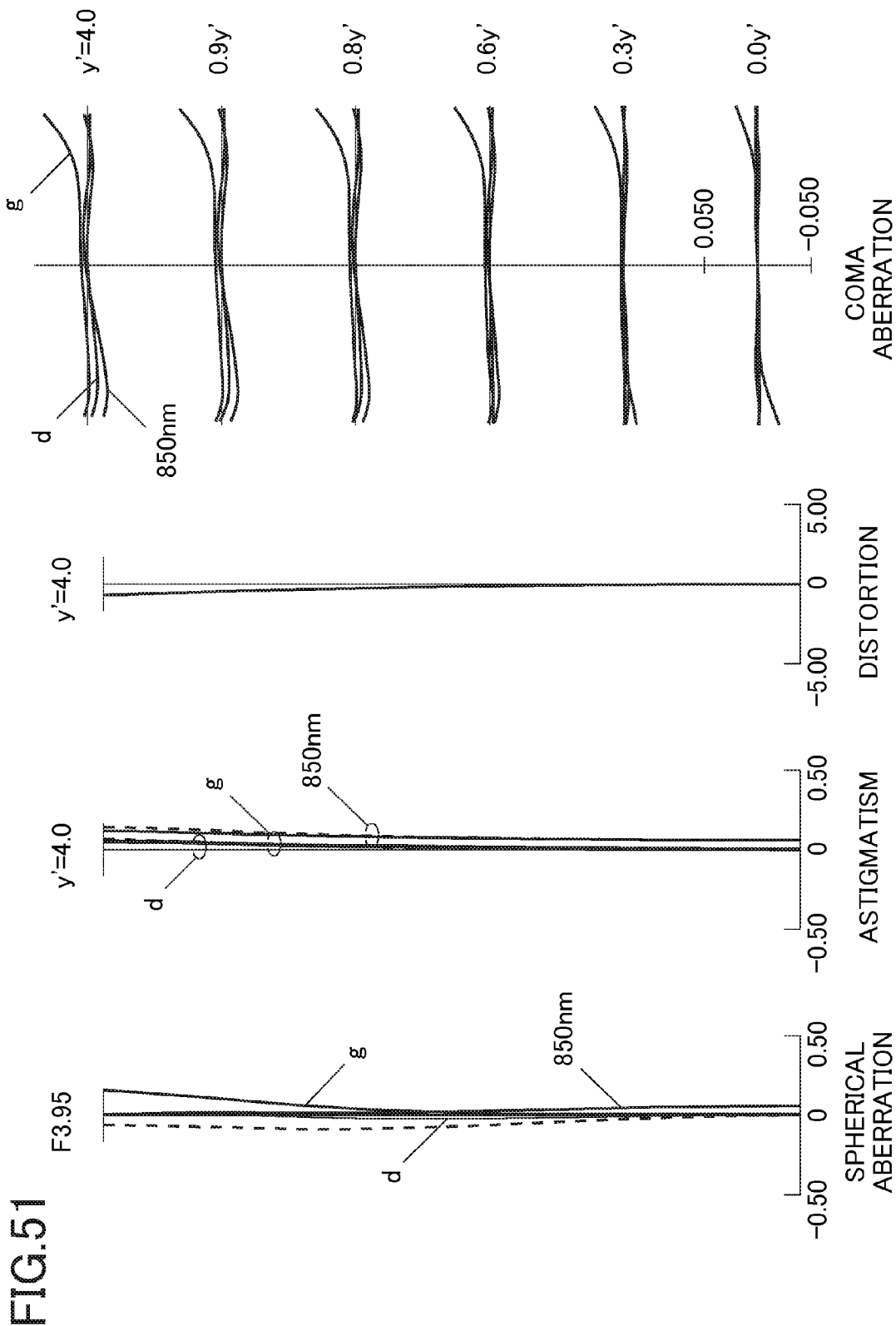
FIG. 51 illustrates aberration curves of the zoom lens (extender lens group is not inserted) of Numerical Example 9 in the intermediate focal distance.
Figure 52:
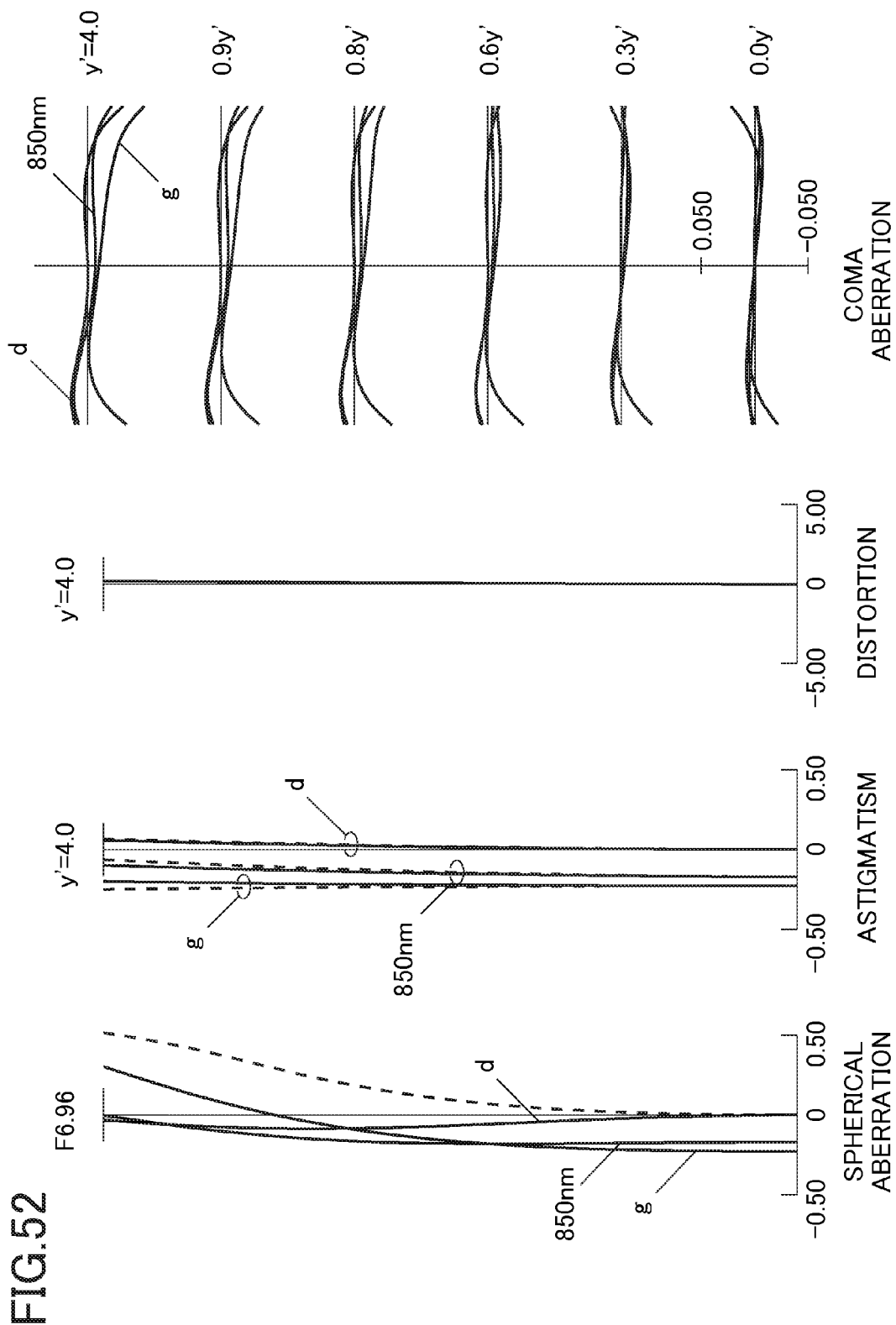
FIG. 52 illustrates aberration curves of the zoom lens (extender lens group is not inserted) of Numerical Example 9 at the telephoto end.
Figure 53:
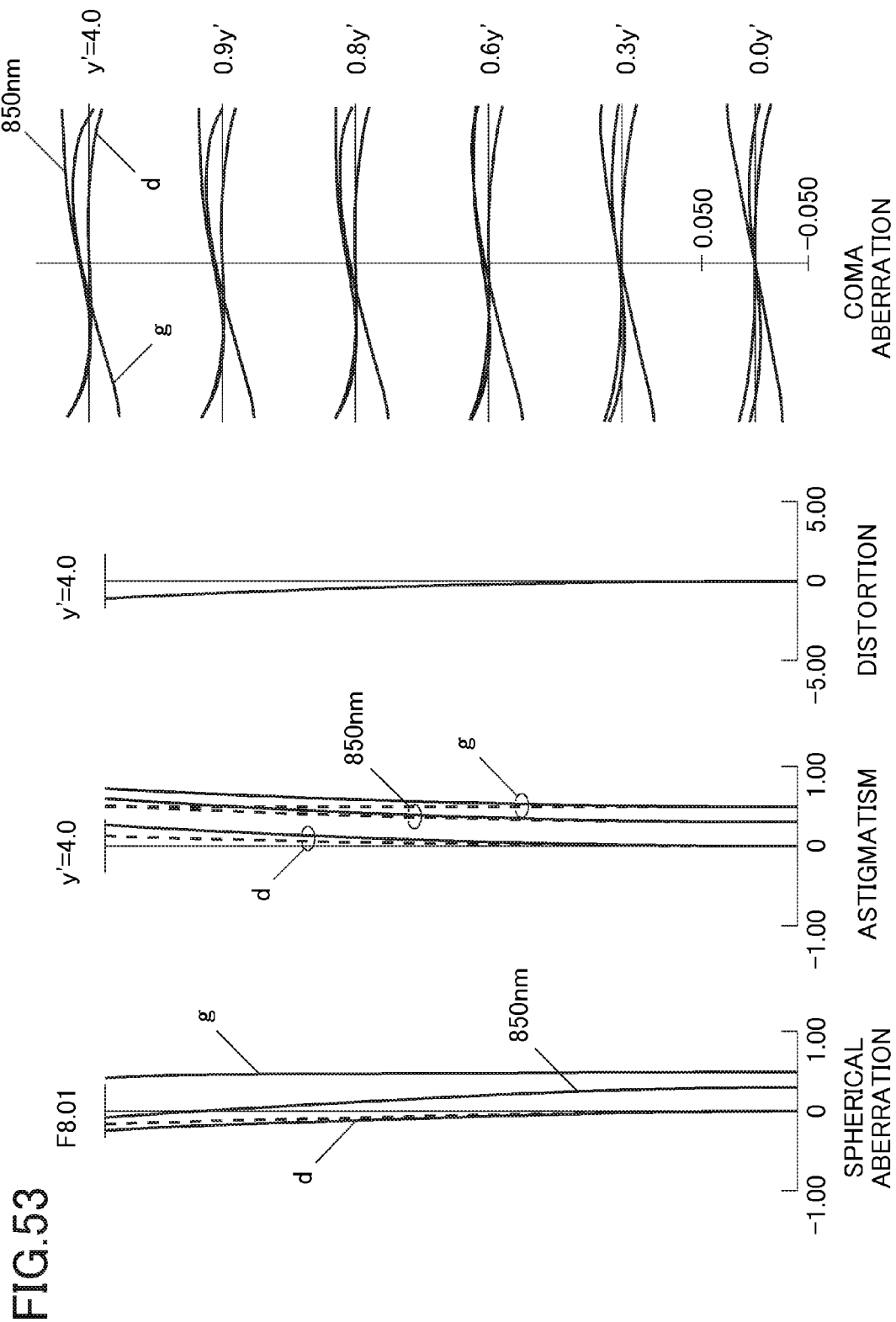
FIG. 53 illustrates aberration curves of the zoom lens (extender lens group is inserted) of Numerical Example 9 at the wide-angle end.
Figure 54:
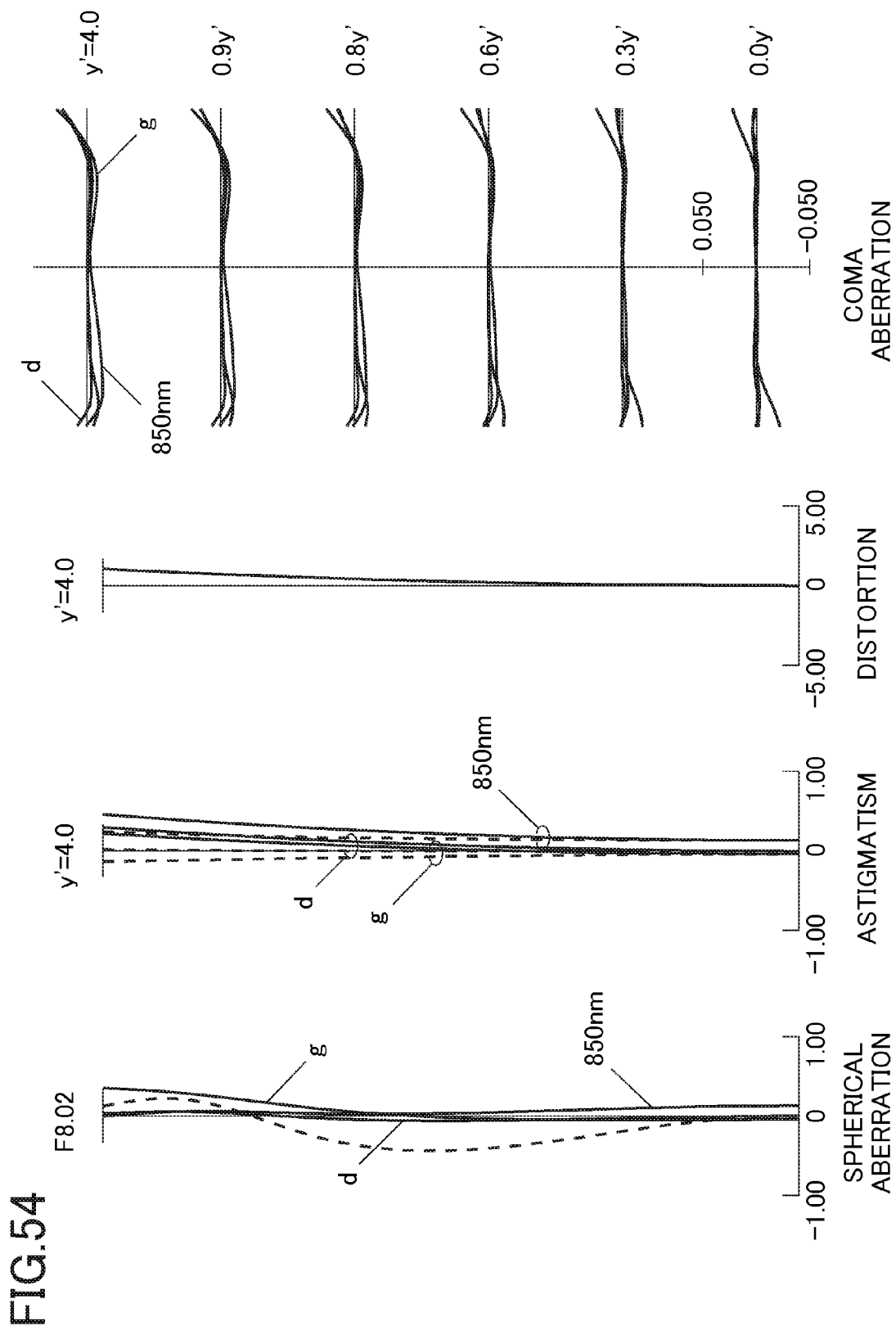
FIG. 54 illustrates aberration curves of the zoom lens (extender lens group is inserted) of Numerical Example 9 in the intermediate focal distance.
Figure 55:
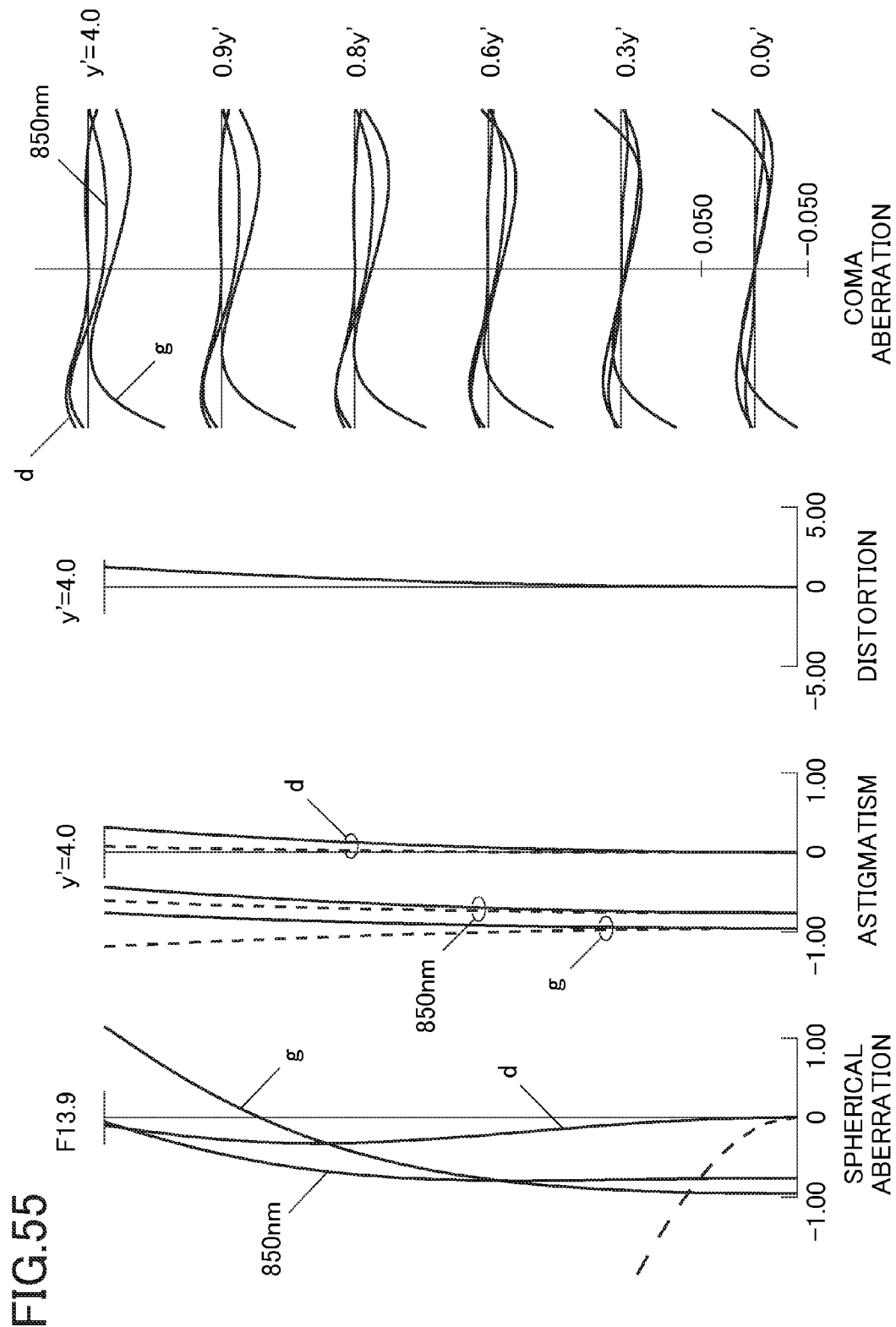
FIG. 55 illustrates aberration curves of the zoom lens (extender lens group is inserted) of Numerical Example 9 at the telephoto end.
Figure 56:
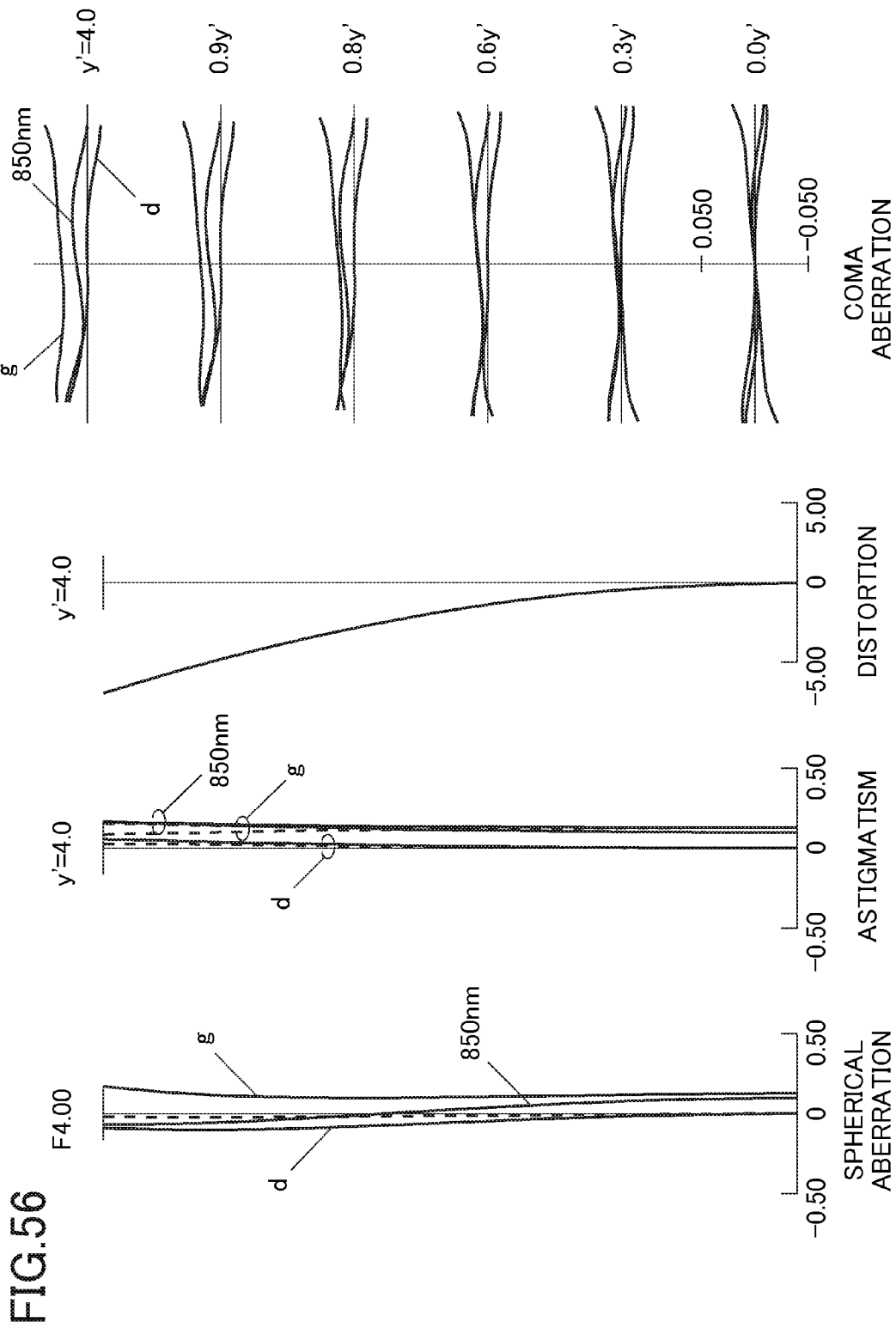
FIG. 56 illustrates aberration curves of the zoom lens (extender lens group is not inserted) of Numerical Example 10 at the wide-angle end.
Figure 58:
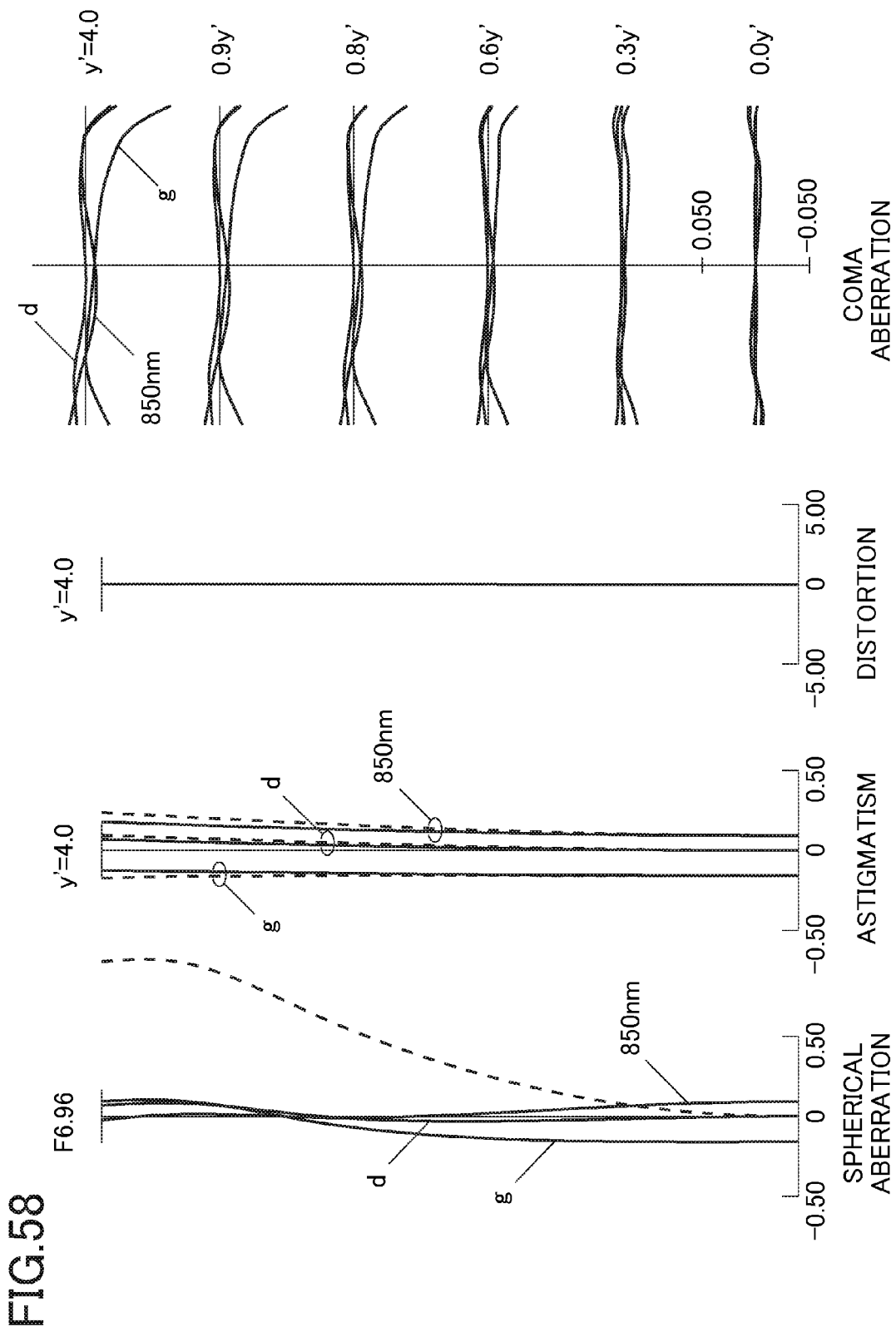
FIG. 58 illustrates aberration curves of the zoom lens (extender lens group is not inserted) of Numerical Example 10 at the telephoto end.
Figure 59:
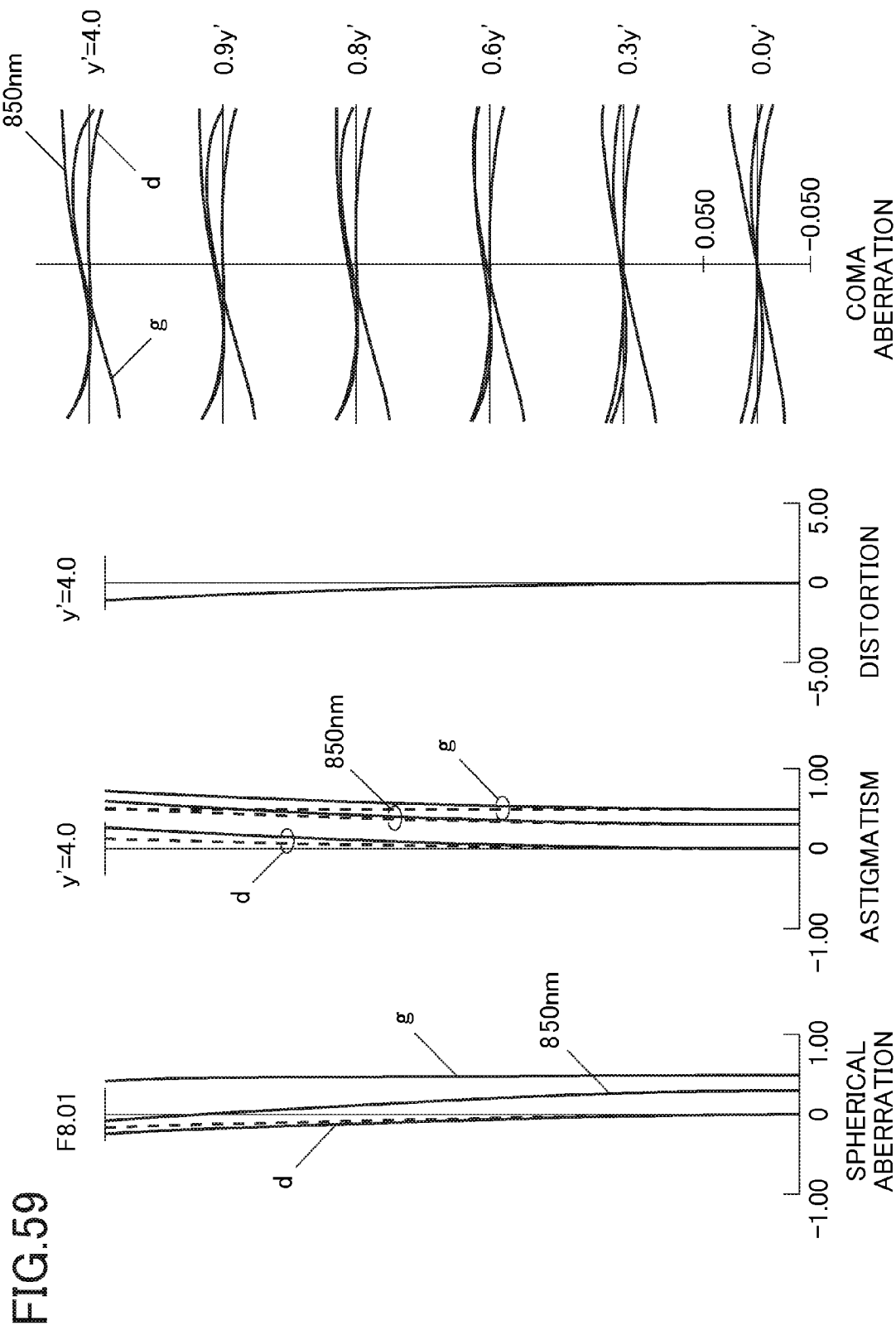
FIG. 59 provides aberration curves of the zoom lens (extender lens group is inserted) of Numerical Example 10 at the wide-angle end.
Figure 60:
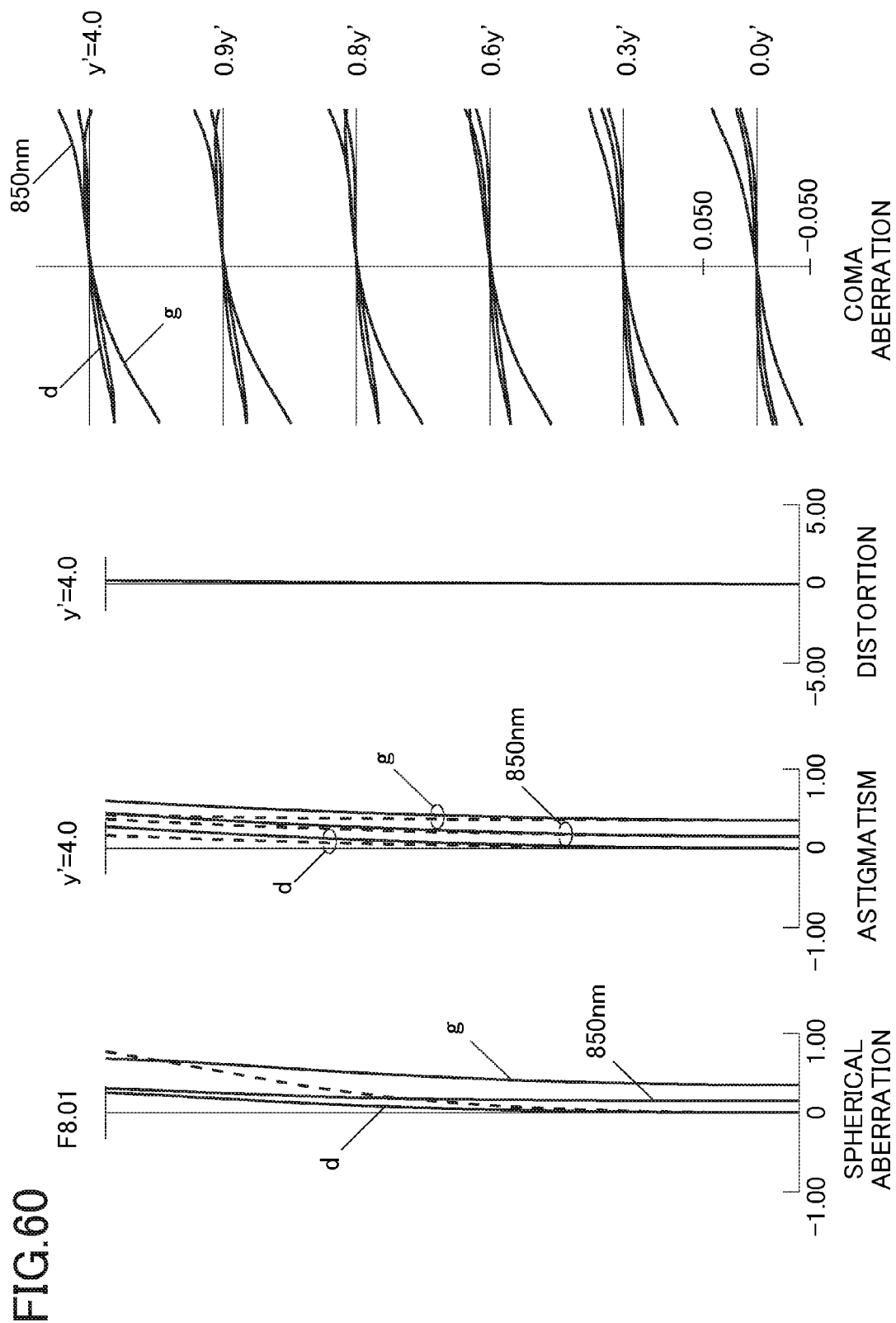
FIG. 60 illustrates aberration curves of the zoom lens (extender lens group is inserted) of Numerical Example 10 in the intermediate focal distance.
Figure 61:
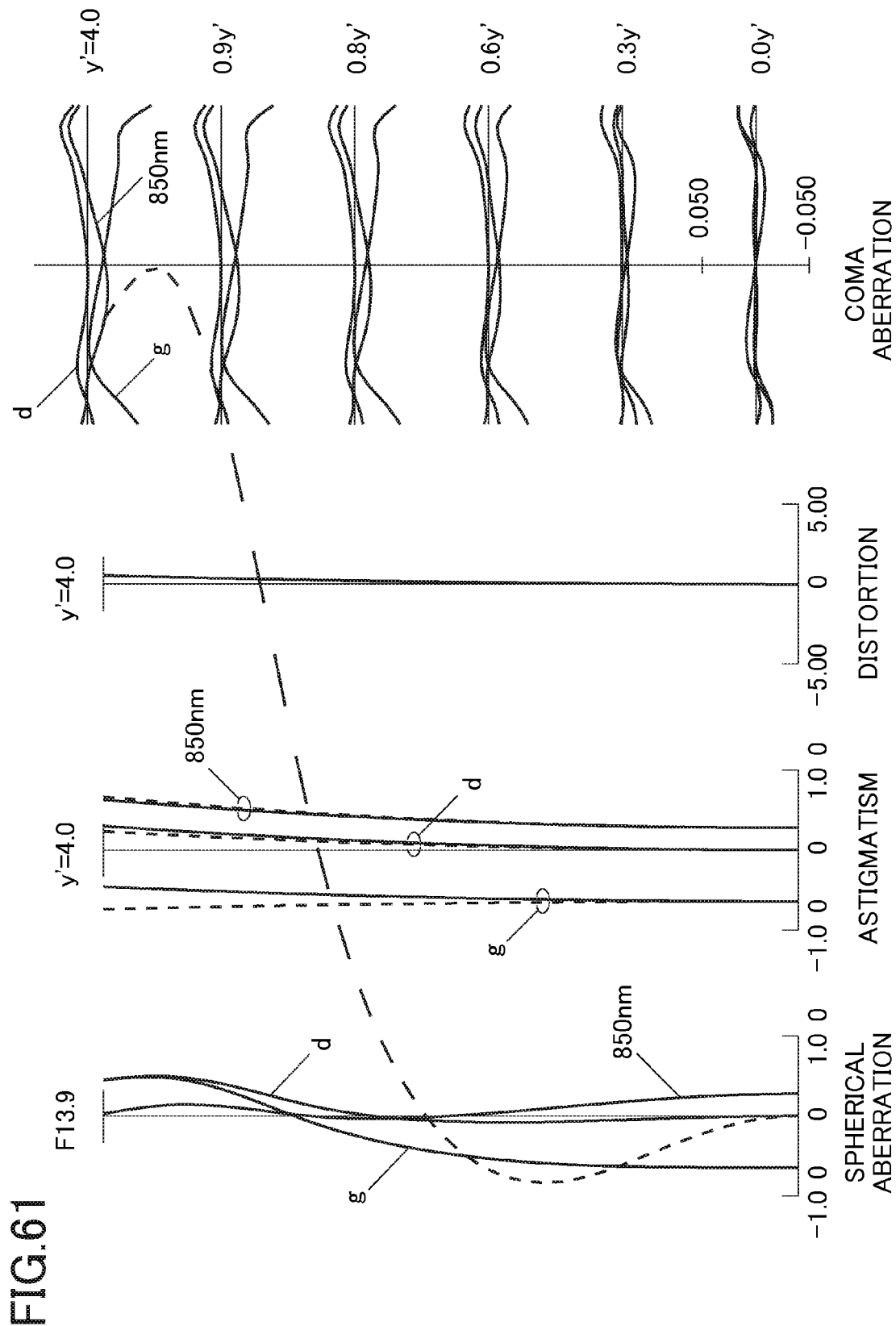
FIG. 61 illustrates aberration curves of the zoom lens (extender lens group is inserted) of Numerical Example 10 at the telephoto end.

Next, an imaging device 10 to which the zoom lens 1 according to Embodiment 1 is applied will be described with reference to FIG. 21.

The imaging device 10 includes a photographing lens 11 and an imaging element 16 (for example, area sensor). The above-described zoom lens 1 can be used for the photographing lens 11. The focusing of the photographing lens 11 is controlled by a focus controller 12. Namely, the focusing operation is performed by the focus controller 12.

The zooming is controlled by a zoom controller 13. Namely, the zooming operation is performed by the zoom controller 13. The aperture SB is controlled by an aperture controller 14'. A filter such as the plane parallel plate FP2 is inserted into and removed from a photographing optical path by a filter controller 14. The aperture controller 14' controls F-number by changing the diameter of the aperture SB. The filter controller 14 switches, for example, an infrared light cut filter and a visible light cut filter.

A subject image is formed on the image surface S of the imaging element 16 by the photographing lens 11. The imaging element 16 photoelectrically converts a subject image formed on the image surface S, and outputs the subject image to a signal processor 17 as an image signal.

The signal processor 17 processes the image signal to be converted into digital information. The image information digitized by the signal processor 17 is processed by a predetermined image process in a not-shown image processor, is recorded in a not-shown semiconductor memory, for example, and is transmitted outside by a not-shown communication device.

According to the above-described imaging device 10, the zoom lens 1 of Numerical Examples 1 to 5 is used as the photographing lens 11. The compact imaging device 10, which provides a high quality image, corresponds to seamless imaging from a visible region to a near-infrared region, and uses the imaging element 16 having 2 million pixels or more, can be therefore achieved.

Consequently, the compact and lightweight zoom lens 1 can be provided. Such a zoom lens 1 has the small number of lenses, a telephoto ratio (ratio of total length of lens relative to focal distance) of less than 0.60 at the telephoto end, a resolution corresponding to an imaging element having 2 million pixels or more, and a zoom ratio exceeding 25:1. A compact and lightweight imaging device, which provides a high image quality and has a high zoom ratio, can be also achieved.

According to this embodiment, the high performance zoom lens 1 in which a chromatic aberration in a telephoto region is further preferably compensated can be provided. Therefore, a user-friendly imaging device in which deterioration in image quality is reduced in an important telephoto region for monitoring can be provided.

According to this embodiment, the high performance zoom lens 1 in which a chromatic aberration in the entire zoom area is compensated with good balance can be provided. A user-friendly imaging device which provides a high image quality can be achieved.

According to this embodiment, the zoom lens 1 further suitable for a high performance and downsizing can be provided by controlling the contribution of the third lens group 4 to the aberration correction. Therefore, a compact imaging device having a high resolution over an entire image can be provided.

Moreover, the second and third lens groups 3, 4 are appropriately used for zooming, so that the zoom lens 1 further suitable for downsizing and a high zoom ratio can be provided. A compact imaging device having a sufficient high zoom ratio can be thus provided.

Furthermore, the fourth lens group 5 is appropriately disposed relative to the image surface S, and the back focusing is sufficiently ensured. Consequently, the higher performance zoom lens 1 can be provided. An imaging device in which a filter switching mechanism or the like is comfortably disposed can be provided.

In addition, since the appropriate configuration examples of each lens group are illustrated, the zoom lens 1 can be realized. Accordingly, a compact and lightweight imaging device having a high zoom ratio can be reliably achieved. In such an imaging device, deterioration in image quality and focusing fluctuation from a visible region to a near-infrared region can be controlled.

The user-friendly and high performance zoom lens 1 can be provided. In such a zoom lens 1, the movable lens group is limited for zooming, so that the entire length of the zoom lens 1 is not changed, and the zoom lens 1 is well balanced.

Moreover, a compact and lightweight imaging device using a compact and lightweight zoom lens can be provided. Such a zoom lens has the small number of lenses, a telephoto ratio (ratio of total length of lens relative to focal distance) of less than 0.60 at the telephoto end, a resolution corresponding to an imaging element having 2 million pixels or more, and a zoom ratio exceeding 25:1. Therefore, a user can perform imaging from a visible region to a near-infrared region with less stress.

Embodiment 2

Hereinafter, a zoom lens according to Embodiment 2 of the present invention will be described with reference to the drawings.

The zoom lens 1 of Embodiment 2 includes, in order from an object side to an image surface side, a first lens group 2 having a positive refractive power, a second lens group 3 having a negative refractive power, a third lens group 4 having a negative refractive power, and a fourth lens group 5 having a positive refractive power as illustrated in FIGS. 22 to 31.

As illustrated in FIGS. 23, 25, 27, 29, 31, an extender lens group 6, which changes a focal distance of the entire system to be increased without changing a distance between each lens group from the first lens group 2 to the fourth lens group 5 and the image surface S, is insertably and removably provided on the image surface S side of the fourth lens group 5.

As illustrated in FIGS. 22 to 29 corresponding to Numerical Examples 6 to 9, the first lens group 2 is made of, for example, three lenses including a lens L1, a lens L2, and a lens L3. The second lens group 3 is also made of, for example, three lenses including a lens L6, a lens L7, and a lens L8.

The third lens group 4 is made of, for example, two lenses including a lens L9 and a lens L10. The fourth lens group 5 is made of, for example, six lenses a lens L11, lens L12, lens L13, lens L14, lens L15, and lens L16.

The extender lens group 6 is made of, for example, five lenses including a lens L17, a lens L18, a lens L19, a lens L20, and a lens L21.

A parallel plate FP2 is disposed just in front of the lens L11 in the fourth lens group 5 between the third lens group 4 and the fourth lens group 5. The parallel plate FP 2 includes an ND filter for adjusting a light volume. An aperture SB is provided between the parallel plate FP2 and the lens L11. A parallel plate FP1 is disposed on the image surface S side of the fourth lens group 5. The parallel plate FP1 includes various filters such as an optical low-pass filter and an infrared cut filter or a cover glass (seal glass) of an imaging element such as a CCD sensor.

In the zoom lens 1 including four lens groups of positive, negative, negative, and positive, the second lens group 3 is constituted as a variator which performs the major zooming operation. In such a zoom lens 1, the third lens group 4 shares the zooming operation, and such a zoom lens 1 is suitable for a high zoom ratio.

In this embodiment, the second and third lens groups 3, 4 are moved such that the second lens group 3 is located on the most object side at the wide-angle end, as illustrated in (a) of FIGS. 22 to 31, and the third lens group 4 is located on the most image surface side at the telephoto end as illustrated in (c) of FIGS. 22 to 31. With this configuration, the third lens group 4 includes a sufficient zooming operation.

During zooming from the wide-angle end to the telephoto end, as illustrated in (a) to (b) of FIGS. 22 to 31, the interval between the second lens group 3 and the third lens group 4 is once reduced, and the extreme value is obtained in an intermediate region of zooming. After that, as illustrated in (c) of FIGS. 22 to 31, the interval between the second lens group 3 and the third lens group 4 is again increased. The second and third lens groups 3, 4 are integrated as a variator which performs the zooming operation, and operate as a compensator which compensates an image surface position by changing the distance between the second and third lens groups 3, 4.

In the zoom lens 1 according to the present embodiment, by the extender lens group 6 insertably and removably provided on the image surface side of the fourth lens group 5, the focal distance of the entire system is changed to be increased without changing a distance between each lens group from the first lens group 2 to the fourth lens group 5 and the image surface S.

The reason for adopting such a configuration is to incorporate the extender lens group 6 in the zoom lens 1. In the configuration in which a distance between the image surface S and each lens group from the first to fourth lens groups 2 to 5 is changed by inserting and removing the extender lens group 6, it is necessary to move the first lens group 2 to the fourth lens group 5 in order to maintain a focused condition in accordance with the inserting and removing of the extender lens group 6.

For this reason, a complicated mechanism is required for driving the zoom lens 1. Moreover, the assembly accuracy of the fourth lens group 5 is easily maintained by providing the extender lens group 6 on the image surface side of the fourth lens group 5 not in the middle of the fourth lens group 5.

Furthermore, the zoom lens 1 of this embodiment is configured to satisfy the following conditional expressions.

$$m_{2T}/m_{2W}<0.0$$

$$m_{3T}/m_{3W}<0.0$$

$$0.80<(m_{3T}/m_{3W})/(m_{2T}/m_{2W})<3.00$$

Where $m_{2W}$ denotes a magnification of the second lens group 3 at the wide-angle end, $m_{2T}$ denotes a magnification of the second lens group 2 at the telephoto end, and $m_{3W}$ denotes a magnification of the third lens group 4 at the wide-angle end, and $m_{3T}$ denotes a magnification of the third lens group 4 at the telephoto end.

When both of $m_{2T}/m_{2W}$ and $m_{3T}/m_{3W}$ are negative, the magnification of the third lens group 4 becomes 0 in the middle of the zooming from the wide-angle end to the telephoto end.

When the magnification of the third lens group 4 becomes 0, a synthesized refractive power of the first lens group 2 and the second lens group 3 becomes 0. From this condition, the signs of the magnification of the second and third lens groups 3, 4 become opposite (when the magnification of the third lens group 4 becomes 0, the magnification of the second lens group 3 becomes infinity). By constituting the zoom lens 1 to include this condition, the contribution of the second and third lens groups 3, 4 to the zooming is balanced, so that aberrations can be preferably compensated.

Moreover, by controlling the contribution of the second and third lens groups 3, 4 to zooming such that $(m_{3T}/m_{3W})/(m_{2T}/m_{2W})$ falls in a predetermined range, the zoom lens 1 can be significantly downsized while achieving a high zoom ratio.

When $(m_{3T}/m_{3W})/(m_{2T}/m_{2W})$ is equal to 0.8 or less, the contribution of the third lens group 4 to the zooming is excessively decreased. When $(m_{3T}/m_{3W})/(m_{2T}/m_{2W})$ is equal to 3.0 or more, the contribution of the second lens group 3 to the zooming is excessively decreased. For this reason, it becomes difficult to compensate various monochromatic aberrations in each case, and it becomes difficult to obtain a high zoom ratio and downsize the zoom lens.

In the zoom lens 1 according to Embodiment 2, it is necessary to more preferably compensate aberrations when the extender lens group 6 is not inserted, in order to change a focal distance to be increased by the extender lens group 6.

Therefore, it is further preferable to satisfy the following conditional expression.

$$1.00<(m_{3T}/m_{3W})/(m_{2T}/m_W)<2.50$$

It is more preferable to satisfy the following conditional expression such that the zoom lens 1 is further applicable for a high zoom ratio.

$$2.5<(D_{34W}-D_{34T})/f_w<6.0$$

Where $D_{34W}$ denotes an interval between the third lens group 4 and the fourth lens group 5 at the wide-angle end, $D_{34T}$ denotes an interval between the third lens group 4 and the fourth lens group 5 at the telephoto end, and $f_W$ denotes a focal distance of the entire system at the wide-angle end.

When $(D_{34W}-D_{34T})/f_W$ is equal to 2.5 or less, the contribution of the third lens group 4 to the zooming is likely to be decreased. When $(D_{34W}-D_{34T})/f_W$ is equal to 6.0 or more, the contribution of the second lens group 3 to the zooming is likely to be decreased. In any case, it becomes difficult to compensate aberrations.

The zoom lens 1 of this embodiment can be configured such that the opening F-number in a telephoto region is controlled by an effective diameter of the first lens group 2 not the aperture SB provided near the object side of the fourth lens group 5. In this case, when $(D_{34W}-D_{34T})/f_W$ is larger than 2.5, it is effective to reduce the effective diameter of the third lens group 4, and it is advantageous for compensating aberrations.

It is desirable for the zoom lens 1 of this embodiment to satisfy the following conditional expression regarding the arrangement of the fourth lens group 5 performing the major imaging operation.

$$0.2<L_4/T_{4F-I}<0.5$$

Where $L_4$ denotes a distance along the optical axis from the most object side surface (surface number 19) to the most image side surface (surface number 28) in the fourth lens group 5, $T_{4F-I}$ denotes a distance along the optical axis from the most object side surface (surface number 28) to the image surface S in the fourth lens group 5. $T_{4F-I}$ denotes an air conversion length when it is assumed that there is no optical element without having a refractive power on the image surface side of the fourth lens group 5.

When $L_4/T_{4F-I}$ is equal to 0.2 or less, the degree of freedom for the configuration of the fourth lens group 5 is disturbed. It becomes difficult to compensate the various aberrations (spherical aberration, astigmatism, distortion, and coma aberration). On the other hand, when $L_4/T_{4F-I}$ is equal to 0.5 or more, a significant space cannot be ensured between the fourth lens group 5 and the image surface S.

Thus, the degree of freedom for the configuration of the extender lens group 6 is disturbed.

Moreover, various aberrations are not sufficiently compensated. It becomes difficult to dispose a switching mechanism such as an infrared light cut filter or a visible light cut filter in the zoom lens 1.

Furthermore, ghost images due to the reflection of the filter or each surface in the fourth lens group 5 and the extender lens group 6 are easily generated. This is not a preferable condition.

It is more preferable to satisfy the following conditional expression.

$$0.2 < L_4/T_{4F-I} < 0.4$$

In the zoom lens 1 of the present embodiment, it is preferable for the positive lens in the first lens group 2 to satisfy the following conditional expression.

$$75 < \nu_{1GP} < 96$$

Where $\nu_{1GP}$ denotes an average value of Abbe's number of the material of the positive lens in the first lens group 2. When a zoom ratio, in particular, a focal distance at the telephoto end is increased, it becomes difficult to compensate the secondary spectrum of the axial chromatic aberration on the telephoto side. In the zoom lens 1 of the present embodiment, it is necessary to further preferably compensate the axial chromatic aberration because the focal distance is changed to be increased by the extender lens group 6.

When the magnification (lateral magnification) of the extender lens group 6 is 2, for example, the F-number doubles, so that a focal depth doubles. However, the aberration volume of the axial chromatic aberration quadruples because the axial chromatic aberration is a longitudinal aberration and it affects the aberration volume with the square of the magnification of the extender lens group 6.

It is desirable for the first lens group 2 in which the axial marginal light beam height is increased on the telephoto side to use the positive lens having a small dispersion.

When $\nu_{1GP}$ is equal to 75 or less, the chromatic aberration in a telephoto region is likely to be insufficiently compensated. On the other hand, even if a material in which $\nu_{1GP}$ is equal to 96 or more is found, it is likely to be very special and expensive, and it cannot be practically used.

Even when another chromatic aberration compensation unit is used, for example, even when a diffraction optical element is provided in the first lens group 2, it is preferable to satisfy the above-described conditional expressions when it is necessary to compensate the chromatic aberration to the near-infrared region.

Moreover, it is further preferable to satisfy the following conditional expression.

$$80 < \nu_{1GP} < 96$$

In the examples illustrated in FIGS. 22 to 29 corresponding to Numerical Examples 6 to 9, the lenses L1 to L3 of the first lens group 2 include, in order from the object side, a negative meniscus lens having a concave surface on the image surface side, a positive lens having a convex surface on the object side, the convex surface having an absolute value of the curvature radius smaller than that on the image side, and a positive lens L3 having a convex surface on the object side, the convex surface having an absolute value of the curvature radius smaller than that on the image side, and a diffraction optical element RF.

When the first lens group 2 includes the diffraction optical element RF, even when the chromatic aberration in a telephoto region including a near-infrared region is sufficiently compensated, the number of lenses in the first lens group 2 having a large lens diameter can be controlled to three, so that the weight of the zoom lens can be reduced.

When the diffraction optical element RF is provided in the first lens group 2, it is desirable to satisfy the following conditional expression.

$$0.02 < f_{TC}/f_{DOE} < 0.10$$

Where $f_{TC}$ denotes a focal distance of the entire system at the telephoto end with the extender lens group 6 being inserted, and $f_{DOE}$ denotes a focal distance of the diffraction section of the diffraction optical element RF.

When the refractive power of the diffraction optical element RF is weak such that $f_{TC}/f_{DOE}$ becomes 0.02 or less, it becomes difficult to sufficiently compensate the chromatic aberration in a telephoto region. On the other hand, when the refractive power of the diffraction optical element RF is strong such that $f_{TC}/f_{DOE}$ becomes 0.01 or more, the chromatic aberration on the telephoto side is excessively compensated. This is not a preferable condition.

As illustrated in FIGS. 30, 31 corresponding to Numerical Example 10, the first lens group 2 includes, in order from the object side, a negative meniscus lens L1' having a concave surface on the image surface side, a positive lens L2' having a convex surface on the object side, the convex surface having an absolute value of the curvature radius smaller than that on the image side, a negative meniscus lens L3' having a concave surface on the image surface side, a positive lens L4' having a convex surface on the object side, the convex surface having an absolute value of the curvature radius smaller than that on the image side, and a positive lens L5' having a convex surface on the object side, the convex surface having an absolute value of the curvature radius smaller than that on the image side.

In this case, it is not necessary to provide the diffraction optical element RF in the first lens group 2. In this case, it is also not necessary to consider unnecessary high order diffraction light resulting from a wavelength dependency of the diffraction optical element RF, flare resulting from the configuration of the diffraction optical element RF, and the like.

In this zoom lens 1, the fourth lens group 5 includes six lenses L11 to L16 disposed in order from the object side. However, as long as it includes at least three positive lenses, the number of the lenses of the fourth lens group 5 is not limited to six. It is desirable to satisfy the following conditional expression.

$$75 < \nu_{4GP} < 96$$

Where $\nu_{4GP}$ denotes an average value of Abbe's number of at least three positive lenses.

With this configuration of the fourth lens group 5, the chromatic aberration from the visible region to the near-infrared region can be preferably compensated particularly in the wide-angle region of the zooming range.

The second lens group 3 includes three lenses in this embodiment. It is preferable for the second lens group 3 to be made of three lenses or less.

In the zoom lens 1 of the present embodiment, the second lens group 3 and the third lens group 4 are not distinguished as a variator and a compensator. The second lens group 3 and the third lens group 4 comprehensively perform zooming and compensate aberrations, so that the second lens group 3 can be made of three lenses or less, and a sufficient imaging performance can be secured even when the aberration correction performance by the single second lens group 3 is relatively low.

The lenses L6, L7, L8 of the second lens group 3 illustrated in FIG. 22 to FIG. 31 corresponding to Numerical Examples are three lenses of a negative lens, a positive lens, and a negative lens in order from the object side.

It is preferable for the first lens group 2 and the fourth lens group 5 to be fixed relative to the image surface S during zooming.

As the zoom lens 1 for a TV camera or a video camera, it is desirable that the entire length be constant and the weight balance is not be changed during zooming. Such a zoom lens 1 can be achieved with the configuration in which the first lens group 2 and the fourth lens group 5 are not moved.

It is functionally advantageous that the number of the movable lens groups is small. Such a configuration leads to a decrease in the number of components, lightweight design, and an improvement in reliability.

It is preferable for the refractive power of each lens group to satisfy the following conditional expressions.

$$6.0 < f_1/f_W < 12.0$$

$$-5.0 < f_2/f_W < -2.0$$

$$-4.5 < f_3/f_W < 1.5$$

$$1.5 < f_4/f_W < 4.5$$

Where $f_1$ denotes a focal distance of the first lens group 2, $f_2$ denotes a focal distance of the second lens group 3, $f_3$ denotes a focal distance of the third lens group 4, $f_4$ denotes a focal distance of the fourth lens group 5, and $f_W$ denotes a focal distance of the entire system at the wide-angle end.

When the refractive power of each lens group falls in the ranges of the conditional expressions, it is more preferable for the zoom lens 1 having a zoom ratio exceeding 25:1 and a half-filed angle of about 0.5 at the telephoto end.

It is desirable for at least one of the positive lenses in the first lens group 2 and at least one of the positive lenses in the fourth lens group 5 to satisfy the following conditional expressions.

$$80 < v_d < 96$$

$$\theta_{C'A'} < 0.000667 \cdot v_d + 0.300$$

Where vd is Abbe's number of the material constituting the positive lens and $\theta_{C'A'}$ is a partial dispersion ratio of the material constituting the positive lens.

In this case, $\theta_{C'A'} = (n_C - n_{A'})/(n_F - n_C)$, $n_F$, $n_C$, $n_{A'}$ denote refractive indexes relative to F-line, C-line, A' line of the material constituting the negative lens.

By providing the positive lens which satisfies the above conditional expressions in the first lens group 2 and the fourth lens group 5, the chromatic aberration including a near-infrared region over the entire region of zooming from the wide-angle end to the telephoto end can be preferably compensated.

It is desirable for the extender lens group 6 to include an extender lens front group having a positive lens L17, a positive lens L18, and a negative lens L19 in order from the object side, and an extender lens back group having a positive lens L20 and a negative lens L21.

The extender lens front group has a positive refractive power as a whole, and the extender lens back group has a negative refractive power as a whole. A focal distance of the entire system can be changed to be increased without changing a distance between the image surface S to each lens group from the first lens group 2 to the fourth lens group 5.

By constituting the extender lens front group and the extender lens back group with a plurality of lenses, the aberration of the extender lens group 6 can be preferably compensated.

It is preferable for the refractive power of the extender lens group 6 to satisfy the following conditional expression.

$$-2.5 < f_E/f_W < 0.7$$

Where $f_E$ is a focal distance of the extender lens group and $f_W$ is a focal distance of the entire system at the wide-angle end.

When the refractive power of the extender lens group 6 falls in the range of the conditional expression, it is more suitable for a built-in extender lens having about twice as a focal distance.

In the zoom lens 1 according to Embodiment 2, various methods are considered for the focusing to a finite distance. The simplest method is to move the first lens group 2.

Specific Numerical Examples of the zoom lens 1 will be described. In addition, the maximum image height y' is 4.0 mm in Numerical Examples 6, 7, 9, 10 and the maximum image height y' is 4.5 mm in Numerical Example 8.

The material of each lens is an optical glass except that resin is used for a diffraction section in the first lens group 2 in Numerical Examples 6 to 9. A product manufactured by OHARA CO., LTD. is used for the optical glass. The name of the glass material is indicated in Numerical Examples.

The aberrations of Numerical Examples 6 to 10 are significantly compensated, so that the zoom lens according to each of Numerical Examples 6 to 10 is applicable for an imaging element having 2 million pixels or more. By constituting the zoom lens 1 as the present embodiment, a preferable image forming performance can be obtained while obtaining a high zoom ratio exceeding 25:1 and sufficiently downsizing the zoom lens 1.

The signs in Numerical Examples 6 to 10 denote as follows.

f: focal distance of entire system
F: F-number
ω: half-field angle
r: curvature radius
d: surface interval
$n_d$: refractive index
$v_d$: Abbe's number
$\theta_{C'A'}$: partial dispersion ratio: $(n_c - n_{A'})/(n_F - n_C)$,
$C_2$: second-order coefficient of phase function
$C_4$: fourth-order coefficient of phase function
K: conical constant of aspheric surface
$A_4$: fourth-order coefficient of aspheric surface formula
$A_6$: sixth-order coefficient of aspheric surface formula
$A_8$: eighth-order coefficient of aspheric surface formula The diffractive surface for use herein is expressed by the following phase function where λ denotes a standard wavelength and h denotes a height from an optical axis. In addition, the first-order diffraction light is used for imaging light, and the refractive power of the diffraction section is $-2 \cdot C_2$.

$$\phi(h) = \frac{2\pi}{\lambda}(C_2 \cdot h^2 + C_4 \cdot h^4)$$

Moreover, the aspheric surface for use herein is expressed by the following aspheric surface formula where R denotes a paraxial curvature radius and H denotes a height from an optical axis.

$$X = \frac{(1/R) \cdot H^2}{1 + \sqrt{(1 - (1+K) \cdot (H/R)^2)}} + A_4 \cdot H^4 + A_6 \cdot H^6 + A_8 \cdot H^8$$

The dashed line in the aberration curve illustrating the spherical aberration illustrates a sine condition.

The solid line and the dashed line in the aberration curve illustrating the astigmatism illustrate a sagittal aberration and a meridional aberration, respectively.

MAGNIFICATION OF EACH LENS GROUP

| | WIDE ANGLE END f = 17.07 | INTERMEDIATE FOCAL DISTANCE f = 91.34 | TELEPHOTO END f = 487.3 |
|---|---|---|---|
| SECOND LENS GROUP | −0.821 | 14.545 | 3.320 |
| THIRD LENS GROUP | 0.206 | −0.0623 | −1.455 |
| FOURTH LENS GROUP | −0.680 | −0.680 | −0.680 |

(NUMERICAL EXAMPLE 6)
WHEN EXTENDER LENS GROUP 6 IS NOT PROVIDED
f = 17.1 to 487, F = 4.01 to 6.96, ω = 14.1 to 0.470

| SURFACE NUMBER | r | d | $n_d$ | $v_d$ | $\theta_{C,A'}$ | GLASS TYPE NAME |
|---|---|---|---|---|---|---|
| 01 | 144.855 | 2.50 | 1.83400 | 37.16 | 0.3245 | OHARA S-LAH60 |
| 02 | 76.469 | 0.10 | 1.64310 | 38.82 | 0.3124 | RESIN MATERIAL |
| 03* | 76.469 | 0.10 | 1.61505 | 26.54 | 0.2831 | RESIN MATERIAL |
| 04 | 76.469 | 10.59 | 1.48749 | 70.24 | 0.3633 | OHARA S-FSL5 |
| 05 | 19773.507 | 0.20 | | | | |
| 06 | 74.791 | 10.29 | 1.43875 | 94.94 | 0.3529 | OHARA S-FPL53 |
| 07 | 1414.256 | VARIABLE(A) | | | | |
| 08 | −168.994 | 2.00 | 1.61800 | 63.33 | 0.3454 | OHARA S-PHM52 |
| 09 | 73.668 | 0.20 | | | | |
| 10 | 50.000 | 7.46 | 1.80000 | 29.84 | 0.3117 | OHARA S-NBH55 |
| 11 | −161.070 | 2.00 | 1.74320 | 49.34 | 0.3414 | OHARA S-LAM60 |
| 12 | 33.127 | VARIABLE(B) | | | | |
| 13 | −55.514 | 1.50 | 1.60300 | 65.44 | 0.3498 | OHARA S-PHM53 |
| 14 | 19.259 | 2.83 | 1.85026 | 32.27 | 0.3145 | OHARA S-LAH71 |
| 15 | 34.731 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 68.120 | 3.62 | 1.49700 | 81.54 | 0.3501 | OHARA S-FPL51 |
| 20 | −64.999 | 0.20 | | | | |
| 21 | 36.048 | 3.73 | 1.49700 | 81.54 | 0.3501 | OHARA S-FPL51 |
| 22 | −253.146 | 0.20 | | | | |
| 23 | 25.441 | 4.97 | 1.49700 | 81.54 | 0.3501 | OHARA S-FPL51 |
| 24 | −53.850 | 1.55 | 1.83400 | 37.16 | 0.3245 | OHARA S-LAH60 |
| 25 | 23.762 | 2.83 | | | | |
| 26 | −34.001 | 1.50 | 1.48749 | 70.24 | 0.3633 | OHARA S-FSL5 |
| 27 | 20.000 | 5.40 | 1.54072 | 47.23 | 0.3353 | OHARA S-TIL2 |
| 28 | −30.706 | 57.344 | | | | |
| 29 | ∞ | 3.50 | 1.51633 | 64.14 | | VARIOUS FILTER |
| 30 | ∞ | 1.000 | | | | |

Diffractive Surface; Third Surface

λ=587.56 (nm), $C_4$=−1.80594×10$^{-5}$, $C_6$=1.02994×10$^{-9}$

Surface number 3 denotes the third surface.

VARIABLE INTERVAL

| | WIDE ANGLE END f = 17.07 | INTERMEDIATE FOCAL DISTANCE f = 91.34 | TELEPHOTO END f = 487.3 |
|---|---|---|---|
| A | 5.400 | 77.984 | 91.096 |
| B | 66.759 | 6.083 | 54.757 |
| C | 76.794 | 64.886 | 3.100 |

Conditional Expression Numerical Value $m_{2T}/m_{2W}$=−4.04

$m_{3T}/m_{3W}$=−7.06

$(m_{3T}/m_{3W})/(m_{2T}/m_{2W})$=1.75

$(D_{34W}-D_{34T})/f_w$=4.32

$L_4/T_{4F-J}$=0.284

$v_{1GP}$=82.6

$v_{4GP}$=81.5

$f_1/f_W$=8.68

$f_1/f_W$=−3.30

$f_3/f_W$=−2.60

$f_4/f_W$=2.75

Telephoto Ratio at Telephoto End: 0.572

(NUMERICAL EXAMPLE 6)
WHEN EXTENDER LENS GROUP 6 IS PROVIDED
f = 33.9 to 968, F = 7.96 to 13.8, ω = 6.78 to 0.235

| SURFACE NUMBER | r | d | $n_d$ | $v_d$ | $\theta_{C,A'}$ | GLASS TYPE NAME |
|---|---|---|---|---|---|---|
| 01 | 144.855 | 2.50 | 1.83400 | 37.16 | 0.3245 | OHARA S-LAH60 |
| 02 | 76.469 | 0.10 | 1.64310 | 38.82 | 0.3124 | RESIN MATERIAL |
| 03* | 76.469 | 0.10 | 1.61505 | 26.54 | 0.2831 | RESIN MATERIAL |
| 04 | 76.469 | 10.59 | 1.48749 | 70.24 | 0.3633 | OHARA S-FSL5 |
| 05 | 19773.507 | 0.20 | | | | |
| 06 | 74.791 | 10.29 | 1.43875 | 94.94 | 0.3529 | OHARA S-FPL53 |
| 07 | 1414.256 | VARIABLE(A) | | | | |
| 08 | −168.994 | 2.00 | 1.61800 | 63.33 | 0.3454 | OHARA S-PHM52 |
| 09 | 73.668 | 0.20 | | | | |
| 10 | 50.000 | 7.46 | 1.80000 | 29.84 | 0.3117 | OHARA S-NBH55 |
| 11 | −161.070 | 2.00 | 1.74320 | 49.34 | 0.3414 | OHARA S-LAM60 |
| 12 | 33.127 | VARIABLE(B) | | | | |
| 13 | −55.514 | 1.50 | 1.60300 | 65.44 | 0.3498 | OHARA S-PHM53 |
| 14 | 19.259 | 2.83 | 1.85026 | 32.27 | 0.3145 | OHARA S-LAH71 |
| 15 | 34.731 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 68.120 | 3.62 | 1.49700 | 81.54 | 0.3501 | OHARA S-FPL51 |
| 20 | −64.999 | 0.20 | | | | |
| 21 | 36.048 | 3.73 | 1.49700 | 81.54 | 0.3501 | OHARA S-FPL51 |
| 22 | −253.146 | 0.20 | | | | |
| 23 | 25.441 | 4.97 | 1.49700 | 81.54 | 0.3501 | OHARA S-FPL51 |
| 24 | −53.850 | 1.55 | 1.83400 | 37.16 | 0.3245 | OHARA S-LAH60 |
| 25 | 23.762 | 2.83 | | | | |
| 26 | −34.001 | 1.50 | 1.48749 | 70.24 | 0.3633 | OHARA S-FSL5 |
| 27 | 20.000 | 5.40 | 1.54072 | 47.23 | 0.3353 | OHARA S-TIL2 |
| 28 | −30.706 | 4.963 | | | | |
| 29 | 19.259 | 3.82 | 1.49700 | 81.54 | 0.3501 | OHARA S-FPL51 |
| 30 | −95.908 | 2.72 | | | | |
| 31 | −170.947 | 2.68 | 1.48749 | 70.24 | 0.3633 | OHARA S-FSL5 |
| 32 | −20.944 | 1.50 | 1.60562 | 43.71 | 0.3289 | OHARA S-BAM4 |
| 33 | 38.745 | 8.16 | | | | |
| 34 | −277.384 | 2.77 | 1.84666 | 23.78 | 0.3035 | OHARA S-TIH53 |
| 35 | −7.574 | 1.50 | 1.80610 | 40.93 | 0.3289 | OHARA S-LAH53 |
| 36 | 9.852 | 29.221 | | | | |
| 37 | ∞ | 3.50 | 1.51633 | 64.14 | | VARIOUS FILTER |
| 38 | ∞ | 1.000 | | | | |

Diffractive Surface; Third Surface $\lambda = 587.56$ (nm), $C_4 = -1.80594 \times 10^{-5}$, $C_6 = 1.02994 \times 10^{-9}$

| VARIABLE INTERVAL | | | |
|---|---|---|---|
| | WIDE ANGLE END f = 33.92 | INTERMEDIATE FOCAL DISTANCE f = 181.5 | TELEPHOTO END f = 968.1 |
| A | 5.400 | 77.984 | 91.096 |
| B | 66.759 | 6.083 | 54.757 |
| C | 76.794 | 64.886 | 3.100 |

| MAGNIFICATION OF EACH LENS GROUP | | | |
|---|---|---|---|
| | WIDE ANGLE END f = 33.92 | INTERMEDIATE FOCAL DISTANCE f = 181.5 | TELEPHOTO END f = 968.1 |
| SECOND LENS GROUP | −0.821 | 14.545 | 3.320 |
| THIRD LENS GROUP | 0.206 | −0.0623 | −1.455 |
| FOURTH LENS GROUP | −0.680 | −0.680 | −0.680 |
| EXTENDER | 1.987 | 1.987 | 1.987 |

Conditional Expression Numerical Value $f_{TC}/f_{DOE} = 0.0350$ $f_E/f_W = -1.44$ (NUMERICAL EXAMPLE 7)
WHEN EXTENDER IS NOT PROVIDED
f = 17.1 to 486, F = 4.00 to 6.95, ω = 14.2 to 0.471

| SURFACE NUMBER | r | d | $n_d$ | $v_d$ | $\theta_{C,A'}$ | GLASS TYPE NAME |
|---|---|---|---|---|---|---|
| 01 | 138.534 | 2.50 | 1.83400 | 37.16 | 0.3245 | OHARA S-LAH60 |
| 02 | 75.010 | 0.10 | 1.64310 | 38.82 | 0.3124 | RESIN MATERIAL |
| 03* | 75.010 | 0.10 | 1.61505 | 26.54 | 0.2831 | RESIN MATERIAL |
| 04 | 75.010 | 10.72 | 1.48749 | 70.24 | 0.3633 | OHARA S-FSL5 |
| 05 | 9346.827 | 0.20 | | | | |
| 06 | 73.420 | 10.32 | 1.43875 | 94.94 | 0.3529 | OHARA S-FPL53 |
| 07 | 1141.217 | VARIABLE(A) | | | | |
| 08 | −211.333 | 2.00 | 1.59522 | 67.73 | 0.3431 | OHARA S-FPM2 |
| 09 | 85.820 | 0.20 | | | | |
| 10 | 50.000 | 8.57 | 1.68893 | 31.07 | 0.3142 | OHARA S-TIM28 |
| 11 | −72.415 | 2.00 | 1.74320 | 49.34 | 0.3414 | OHARA S-LAM60 |
| 12 | 32.269 | VARIABLE(B) | | | | |
| 13 | −46.892 | 1.50 | 1.59522 | 67.73 | 0.3431 | OHARA S-FPM2 |
| 14 | 16.804 | 2.86 | 1.85026 | 32.27 | 0.3145 | OHARA S-LAH71 |
| 15 | 29.833 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 71.102 | 3.88 | 1.43875 | 94.94 | 0.3529 | OHARA S-FPL53 |
| 20 | −49.574 | 0.20 | | | | |
| 21 | 33.482 | 3.99 | 1.49700 | 81.54 | 0.3501 | OHARA S-FPL51 |
| 22 | −174.686 | 0.21 | | | | |
| 23 | 23.063 | 4.97 | 1.49700 | 81.54 | 0.3501 | OHARA S-FPL51 |
| 24 | −59.924 | 3.33 | 1.83400 | 37.16 | 0.3245 | OHARA S-LAH60 |
| 25 | 20.958 | 2.86 | | | | |
| 26 | −31.574 | 1.50 | 1.48749 | 70.24 | 0.3633 | OHARA S-FSL5 |
| 27 | 20.000 | 5.03 | 1.54814 | 45.78 | 0.3331 | OHARA S-TIL1 |
| 28 | −31.180 | 51.371 | | | | |
| 29 | ∞ | 3.50 | 1.51633 | 64.14 | | VARIOUS FILTER |
| 30 | ∞ | 1.000 | | | | |

Diffractive Surface; Third Surface
λ=587.56 (nm), $C_4=2.05523\times10^{-5}$, $C_6=8.88676\times10^{-10}$

VARIABLE INTERVAL

| | WIDE ANGLE END f = 17.08 | INTERMEDIATE FOCAL DISTANCE f = 91.53 | TELEPHOTO END f = 486.2 |
|---|---|---|---|
| A | 7.192 | 75.842 | 89.762 |
| B | 65.781 | 6.155 | 43.715 |
| C | 63.691 | 54.667 | 3.187 |

MAGNIFICATION OF EACH LENS GROUP

| | WIDE ANGLE END f = 17.08 | INTERMEDIATE FOCAL DISTANCE f = 91.53 | TELEPHOTO END f = 486.2 |
|---|---|---|---|
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |

Conditional Expression Numerical Value $m_{2T}/m_{2W}=-3.99$ $m_{3T}/m_{3W}=-7.12$ $(m_{3T}/m_{3W})/(m_{2T}/m_{2W})=1.79$ $(D_{34W}-D_{34T})/f_w=3.54$ $L_4/T_{4F-I}=0.322$ $v_{1GP}=82.6$ $v_{4GP}=86.0$ $f_1/f_W=8.45$ $f_2/f_W=-3.04$ $f_3/f_W=-2.25$ $f_4/f_W=2.48$ Telephoto Ratio at Telephoto End: 0.543

(NUMERICAL EXAMPLE 7)
WHEN EXTENDER IS PROVIDED
f = 33.5 to 954, F = 7.85 to 13.6, ω = 6.85 to 0.237

| SURFACE NUMBER | r | d | $n_d$ | $v_d$ | $\theta_{C,A'}$ | GLASS TYPE NAME |
|---|---|---|---|---|---|---|
| 01 | 138.534 | 2.50 | 1.83400 | 37.16 | 0.3245 | OHARA S-LAH60 |
| 02 | 75.010 | 0.10 | 1.64310 | 38.82 | 0.3124 | RESIN MATERIAL |
| 03* | 75.010 | 0.10 | 1.61505 | 26.54 | 0.2831 | RESIN MATERIAL |
| 04 | 75.010 | 10.72 | 1.48749 | 70.24 | 0.3633 | OHARA S-FSL5 |
| 05 | 9346.827 | 0.20 | | | | |
| 06 | 73.420 | 10.32 | 1.43875 | 94.94 | 0.3529 | OHARA S-FPL53 |
| 07 | 1141.217 | VARIABLE(A) | | | | |
| 08 | −211.333 | 2.00 | 1.59522 | 67.73 | 0.3431 | OHARA S-FPM2 |
| 09 | 85.820 | 0.20 | | | | |
| 10 | 50.000 | 8.57 | 1.68893 | 31.07 | 0.3142 | OHARA S-TIM28 |
| 11 | −72.415 | 2.00 | 1.74320 | 49.34 | 0.3414 | OHARA S-LAM60 |
| 12 | 32.269 | VARIABLE(B) | | | | |
| 13 | −46.892 | 1.50 | 1.59522 | 67.73 | 0.3431 | OHARA S-FPM2 |
| 14 | 16.804 | 2.86 | 1.85026 | 32.27 | 0.3145 | OHARA S-LAH71 |
| 15 | 29.833 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 71.102 | 3.88 | 1.43875 | 94.94 | 0.3529 | OHARA S-FPL53 |
| 20 | −49.574 | 0.20 | | | | |
| 21 | 33.482 | 3.99 | 1.49700 | 81.54 | 0.3501 | OHARA S-FPL51 |
| 22 | −174.686 | 0.21 | | | | |
| 23 | 23.063 | 4.97 | 1.49700 | 81.54 | 0.3501 | OHARA S-FPL51 |
| 24 | −59.924 | 3.33 | 1.83400 | 37.16 | 0.3245 | OHARA S-LAH60 |
| 25 | 20.958 | 2.86 | | | | |
| 26 | −31.574 | 1.50 | 1.48749 | 70.24 | 0.3633 | OHARA S-FSL5 |
| 27 | 20.000 | 5.03 | 1.54814 | 45.78 | 0.3331 | OHARA S-TIL1 |
| 28 | −31.180 | 4.086 | | | | |
| 29 | 20.373 | 3.68 | 1.49700 | 81.54 | 0.3501 | OHARA S-FPL51 |
| 30 | −91.838 | 1.88 | | | | |
| 31 | −198.726 | 2.43 | 1.48749 | 70.24 | 0.3633 | OHARA S-FSL5 |
| 32 | −33.723 | 2.38 | 1.65844 | 50.88 | 0.3370 | OHARA S-BSM25 |
| 33 | 32.345 | 11.37 | | | | |
| 34 | 345.188 | 2.70 | 1.80518 | 25.42 | 0.3054 | OHARA S-TIH6 |
| 35 | −6.641 | 1.56 | 1.80610 | 40.93 | 0.3289 | OHARA S-LAH53 |
| 36 | 9.719 | 21.285 | | | | |
| 37 | ∞ | 3.50 | 1.51633 | 64.14 | | VARIOUS FILTER |
| 38 | ∞ | 1.000 | | | | |

Diffractive Surface; Third Surface $\lambda = 587.56$ (nm), $C_4 = -2.05523 \times 10^{-5}$, $C_6 = 8.88676 \times 10^{-10}$

VARIABLE INTERVAL

| | WIDE ANGLE END f = 33.50 | INTERMEDIATE FOCAL DISTANCE f = 179.5 | TELEPHOTO END f = 953.7 |
|---|---|---|---|
| A | 7.192 | 75.842 | 89.762 |
| B | 65.781 | 6.155 | 43.715 |
| C | 63.691 | 54.667 | 3.187 |

MAGNIFICATION OF EACH LENS GROUP

| | WIDE ANGLE END f = 33.50 | INTERMEDIATE FOCAL DISTANCE f = 179.5 | TELEPHOTO END f = 953.7 |
|---|---|---|---|
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |
| EXTENDER | 1.962 | 1.962 | 1.962 |

Conditional Expression Numerical Value $f_{TC}/f_{DOE} = 0.0392$ $f_E/f_W = -1.15$ (NUMERICAL EXAMPLE 8)
WHEN EXTENDER IS NOT PROVIDED
f = 17.1 to 487, F = 4.01 to 6.96, ω = 16.0 to 0.529

| SURFACE NUMBER | r | d | $n_d$ | $v_d$ | $\theta_{C,A'}$ | GLASS TYPE NAME |
|---|---|---|---|---|---|---|
| 01 | 143.610 | 2.50 | 1.83400 | 37.16 | 0.3245 | OHARA S-LAH60 |
| 02 | 76.816 | 0.10 | 1.64310 | 38.82 | 0.3124 | RESIN MATERIAL |
| 03* | 76.816 | 0.10 | 1.61505 | 26.54 | 0.2831 | RESIN MATERIAL |
| 04 | 76.816 | 10.55 | 1.48749 | 70.24 | 0.3633 | OHARA S-FSL5 |
| 05 | 15446.495 | 0.20 | | | | |
| 06 | 75.559 | 10.17 | 1.43875 | 94.94 | 0.3529 | OHARA S-FPL53 |
| 07 | 1368.706 | VARIABLE(A) | | | | |
| 08 | −146.028 | 2.00 | 1.59522 | 67.73 | 0.3431 | OHARA S-FPM2 |
| 09 | 42.654 | 0.20 | | | | |
| 10 | 40.000 | 6.73 | 1.80000 | 29.84 | 0.3117 | OHARA S-NBH55 |
| 11 | −3191.505 | 2.00 | 1.67003 | 47.23 | 0.3338 | OHARA S-BAH10 |
| 12 | 31.671 | VARIABLE(B) | | | | |
| 13 | −50.487 | 1.50 | 1.60300 | 65.44 | 0.3498 | OHARA S-PHM53 |
| 14 | 18.890 | 2.94 | 1.85026 | 32.27 | 0.3145 | OHARA S-LAH71 |
| 15 | 34.671 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 80.235 | 3.47 | 1.49700 | 81.54 | 0.3501 | OHARA S-FPL51 |
| 20 | −73.028 | 0.20 | | | | |
| 21 | 57.165 | 3.63 | 1.49700 | 81.54 | 0.3501 | OHARA S-FPL51 |
| 22 | −89.319 | 0.20 | | | | |
| 23 | 30.165 | 5.04 | 1.49700 | 81.54 | 0.3501 | OHARA S-FPL51 |
| 24 | −38.510 | 1.50 | 1.83400 | 37.16 | 0.3245 | OHARA S-LAH60 |
| 25 | 33.545 | 2.44 | | | | |
| 26 | −47.119 | 1.50 | 1.48749 | 70.24 | 0.3633 | OHARA S-FSL5 |
| 27 | 20.000 | 5.95 | 1.54072 | 47.23 | 0.3353 | OHARA S-TIL2 |
| 28 | −33.828 | 64.462 | | | | |
| 29 | ∞ | 3.50 | 1.51633 | 64.14 | | VARIOUS FILTER |
| 30 | ∞ | 1.000 | | | | |

Diffractive Surface; Third Surface
$\lambda = 587.56$ (nm), $C_4 = -2.06961 \times 10^{-5}$, $C_6 = 1.17380 \times 10^{-9}$

VARIABLE INTERVAL

| | WIDE ANGLE END f = 17.07 | INTERMEDIATE FOCAL DISTANCE f = 91.26 | TELEPHOTO END f = 487.2 |
|---|---|---|---|
| A | 5.400 | 78.425 | 94.911 |
| B | 71.253 | 6.594 | 44.438 |
| C | 66.028 | 57.662 | 3.332 |

MAGNIFICATION OF EACH LENS GROUP

| | WIDE ANGLE END f = 17.07 | INTERMEDIATE FOCAL DISTANCE f = 91.26 | TELEPHOTO END f = 487.2 |
|---|---|---|---|
| SECOND LENS GROUP | −0.713 | −73.919 | 3.335 |
| THIRD LENS GROUP | 0.207 | 0.0107 | −1.264 |
| FOURTH LENS GROUP | −0.780 | −0.780 | −0.780 |

Conditional Expression Numerical Value $m_{2T}/m_{2W} = -4.68$ $m_{3T}/m_{3W} = -6.11$ $(m_{3T}/m_{3W})/(m_{2T}/m_{2W}) = 1.31$ $(D_{34W} - D_{34T})/f_w = 3.67$ $L_4/T_{4F-I} = 0.261$ $v_{1GP} = 82.6$ $v_{4GP} = 81.5$ $f_1/f_W = 8.68$ $f_2/f_W = -3.08$ $f_3/f_W = -2.50$ $f_4/f_W = 2.74$ Telephoto Ratio at Telephoto End: 0.573

(NUMERICAL EXAMPLE 8)
WHEN EXTENDER IS PROVIDED
f = 33.9 to 968, F = 7.96 to 13.8, ω = 6.78 to 0.235

| SURFACE NUMBER | r | d | $n_d$ | $v_d$ | $\theta_{C,A'}$ | GLASS TYPE NAME |
|---|---|---|---|---|---|---|
| 01 | 143.610 | 2.50 | 1.83400 | 37.16 | 0.3245 | OHARA S-LAH60 |
| 02 | 76.816 | 0.10 | 1.64310 | 38.82 | 0.3124 | RESIN MATERIAL |
| 03* | 76.816 | 0.10 | 1.61505 | 26.54 | 0.2831 | RESIN MATERIAL |
| 04 | 76.816 | 10.55 | 1.48749 | 70.24 | 0.3633 | OHARA S-FSL5 |
| 05 | 15446.495 | 0.20 | | | | |
| 06 | 75.559 | 10.17 | 1.43875 | 94.94 | 0.3529 | OHARA S-FPL53 |
| 07 | 1368.706 | VARIABLE(A) | | | | |
| 08 | −146.028 | 2.00 | 1.59522 | 67.73 | 0.3431 | OHARA S-FPM2 |
| 09 | 42.654 | 0.20 | | | | |
| 10 | 40.000 | 6.73 | 1.80000 | 29.84 | 0.3117 | OHARA S-NBH55 |
| 11 | −3191.505 | 2.00 | 1.67003 | 47.23 | 0.3338 | OHARA S-BAH10 |
| 12 | 31.671 | VARIABLE(B) | | | | |
| 13 | −50.487 | 1.50 | 1.60300 | 65.44 | 0.3498 | OHARA S-PHM53 |
| 14 | 18.890 | 2.94 | 1.85026 | 32.27 | 0.3145 | OHARA S-LAH71 |
| 15 | 34.671 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 80.235 | 3.47 | 1.49700 | 81.54 | 0.3501 | OHARA S-FPL51 |
| 20 | −73.028 | 0.20 | | | | |
| 21 | 57.165 | 3.63 | 1.49700 | 81.54 | 0.3501 | OHARA S-FPL51 |
| 22 | −89.319 | 0.20 | | | | |
| 23 | 30.165 | 5.04 | 1.49700 | 81.54 | 0.3501 | OHARA S-FPL51 |
| 24 | −38.510 | 1.50 | 1.83400 | 37.16 | 0.3245 | OHARA S-LAH60 |
| 25 | 33.545 | 2.44 | | | | |
| 26 | −47.119 | 1.50 | 1.48749 | 70.24 | 0.3633 | OHARA S-FSL5 |
| 27 | 20.000 | 5.95 | 1.54072 | 47.23 | 0.3353 | OHARA S-TIL2 |
| 28 | −33.828 | 4.971 | | | | |
| 29 | 17.944 | 4.31 | 1.49700 | 81.54 | 0.3501 | OHARA S-FPL51 |
| 30 | −80.952 | 1.67 | | | | |
| 31 | −197.901 | 2.82 | 1.48749 | 70.24 | 0.3633 | OHARA S-FSL5 |
| 32 | −22.010 | 1.55 | 1.60562 | 43.71 | 0.3289 | OHARA S-BAM4 |
| 33 | 48.486 | 7.51 | | | | |
| 34 | −66.664 | 2.85 | 1.84666 | 23.78 | 0.3035 | OHARA S-TIH53 |
| 35 | −9.531 | 1.50 | 1.80400 | 46.58 | 0.3371 | OHARA S-LAH65V |
| 36 | 11.184 | 37.282 | | | | |
| 37 | ∞ | 3.50 | 1.51633 | 64.14 | | VARIOUS FILTER |
| 38 | ∞ | 1.000 | | | | |

Diffractive Surface; Third Surface $\lambda = 587.56$ (nm), $C_4 = -2.06961 \times 10^{-5}$, $C_6 = 1.17380^{-9}$

| VARIABLE INTERVAL | | | |
|---|---|---|---|
| | WIDE ANGLE END f = 33.79 | INTERMEDIATE FOCAL DISTANCE f = 180.7 | TELEPHOTO END f = 964.7 |
| A | 5.400 | 78.425 | 94.911 |
| B | 71.253 | 6.594 | 44.438 |
| C | 66.028 | 57.662 | 3.332 |

| MAGNIFICATION OF EACH LENS GROUP | | | |
|---|---|---|---|
| | WIDE ANGLE END f = 33.79 | INTERMEDIATE FOCAL DISTANCE f = 180.7 | TELEPHOTO END f = 964.7 |
| SECOND LENS GROUP | −0.713 | −73.919 | 3.335 |
| THIRD LENS GROUP | 0.207 | 0.0107 | −1.264 |
| FOURTH LENS GROUP | −0.780 | −0.780 | −0.780 |
| EXTENDER | 1.980 | 1.980 | 1.980 |

Conditional Expression Numerical Value $f_{TC}/f_{DOE} = 0.0399$ $f_E/f_W = -1.76$ (NUMERICAL EXAMPLE 9)
WHEN EXTENDER IS NOT PROVIDED
f = 17.1 to 487, F = 3.95 to 6.96, ω = 14.0 to 0.470

| SURFACE NUMBER | r | d | $n_d$ | $v_d$ | $\theta_{C,A'}$ | GLASS TYPE NAME |
|---|---|---|---|---|---|---|
| 01 | 157.716 | 2.50 | 1.83400 | 37.16 | 0.3245 | OHARA S-LAH60 |
| 02 | 80.188 | 0.10 | 1.64310 | 38.82 | 0.3124 | RESIN MATERIAL |
| 03* | 80.188 | 0.10 | 1.61505 | 26.54 | 0.2831 | RESIN MATERIAL |
| 04 | 80.188 | 10.84 | 1.48749 | 70.24 | 0.3633 | OHARA S-FSL5 |
| 05 | −965.701 | 0.20 | | | | |
| 06 | 74.859 | 10.21 | 1.43875 | 94.94 | 0.3529 | OHARA S-FPL53 |
| 07 | 1250.261 | VARIABLE(A) | | | | |
| 08 | −1102.688 | 2.00 | 1.59522 | 67.73 | 0.3431 | OHARA S-FPM2 |
| 09 | 54.624 | 0.20 | | | | |
| 10 | 51.978 | 9.76 | 1.68893 | 31.07 | 0.3142 | OHARA S-TIM28 |
| 11 | −48.077 | 2.00 | 1.85026 | 32.27 | 0.3331 | OHARA S-LAH51 |
| 12 | 42.896 | VARIABLE(B) | | | | |
| 13 | −47.465 | 1.50 | 1.59522 | 67.73 | 0.3431 | OHARA S-FPM2 |
| 14 | 16.926 | 2.87 | 1.85026 | 32.27 | 0.3145 | OHARA S-LAH71 |
| 15 | 30.040 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19* | 25.662 | 4.50 | 1.43875 | 94.94 | 0.3529 | OHARA S-FPL53 |
| 20 | −107.684 | 0.20 | | | | |
| 21 | 39.448 | 3.48 | 1.49700 | 81.54 | 0.3501 | OHARA S-FPL51 |
| 22 | −244.335 | 0.20 | | | | |
| 23 | 30.534 | 4.06 | 1.49700 | 81.54 | 0.3501 | OHARA S-FPL51 |
| 24 | −65.075 | 3.64 | 1.80610 | 40.93 | 0.3289 | OHARA S-LAH53 |
| 25 | 19.436 | 4.53 | | | | |
| 26 | 385.080 | 1.50 | 1.48749 | 70.24 | 0.3633 | OHARA S-FSL5 |
| 27 | 20.000 | 3.89 | 1.54814 | 45.78 | 0.3331 | OHARA S-TIL1 |
| 28 | −99.699 | 48.589 | | | | |
| 29 | ∞ | 3.50 | 1.51633 | 64.14 | | VARIOUS FILTER |
| 30 | ∞ | 1.000 | | | | |

Diffractive Surface; Third Surface
λ=587.56 (nm), $C_4$=−2.07977×10$^{-5}$, $C_6$=9.76351×10$^{-10}$
Aspheric Surface; Nineteenth Surface
K=0.0, $A_4$=7.21843×10$^{-6}$, $A_6$=−6.52396×10$^{-9}$, $A_8$=4.67279×10$^{-12}$
Surface number 19 denotes the nineteenth surface.

VARIABLE INTERVAL

| | WIDE ANGLE END f = 17.05 | INTERMEDIATE FOCAL DISTANCE f = 91.30 | TELEPHOTO END f = 487.3 |
|---|---|---|---|
| A | 5.846 | 75.128 | 87.903 |
| B | 65.173 | 6.100 | 47.276 |
| C | 67.232 | 57.023 | 3.072 |

MAGNIFICATION OF EACH LENS GROUP

| | WIDE ANGLE END f = 17.05 | INTERMEDIATE FOCAL DISTANCE f = 91.30 | TELEPHOTO END f = 487.3 |
|---|---|---|---|
| SECOND LENS GROUP | −0.847 | 11.221 | 3.093 |
| THIRD LENS GROUP | 0.188 | −0.0758 | −1.469 |
| FOURTH LENS GROUP | −0.749 | −0.749 | −0.749 |

Conditional Expression Numerical Value $m_{2T}/m_{2W}$=−3.65

$m_{3T}/m_{3W}$=−7.781

$(m_{3T}/m_{3W})/(m_{2T}/m_{2W})$=−2.14

$(D_{34W}-D_{34T})/f_w$=3.64

$L_4/T_{4F-I}$=0.334

$v_{1GP}$=82.6

$v_{4GP}$=86.0

$f_1/f_W$=8.39

$f_2/f_W$=−3.19

$f_3/f_W$=−2.27

$f_4/f_W$=2.47

Telephoto Ratio at Telephoto End: 0.542

(NUMERICAL EXAMPLE 9)
WHEN EXTENDER IS PROVIDED
f = 33.9 to 968, F = 7.96 to 13.8, ω = 6.78 to 0.235

| SURFACE NUMBER | r | d | $n_d$ | $v_d$ | $θ_{C,A'}$ | GLASS TYPE NAME |
|---|---|---|---|---|---|---|
| 01 | 157.716 | 2.50 | 1.83400 | 37.16 | 0.3245 | OHARA S-LAH60 |
| 02 | 80.188 | 0.10 | 1.64310 | 38.82 | 0.3124 | RESIN MATERIAL |
| 03* | 80.188 | 0.10 | 1.61505 | 26.54 | 0.2831 | RESIN MATERIAL |
| 04 | 80.188 | 10.84 | 1.48749 | 70.24 | 0.3633 | OHARA S-FSL5 |
| 05 | −965.701 | 0.20 | | | | |
| 06 | 74.859 | 10.21 | 1.43875 | 94.94 | 0.3529 | OHARA S-FPL53 |
| 07 | 1250.261 | VARIABLE(A) | | | | |
| 08 | −1102.688 | 2.00 | 1.59522 | 67.73 | 0.3431 | OHARA S-FPM2 |
| 09 | 54.624 | 0.20 | | | | |
| 10 | 51.978 | 9.76 | 1.68893 | 31.07 | 0.3142 | OHARA S-TIM28 |
| 11 | −48.077 | 2.00 | 1.85026 | 32.27 | 0.3331 | OHARA S-LAH51 |
| 12 | 42.896 | VARIABLE(B) | | | | |
| 13 | −47.465 | 1.50 | 1.59522 | 67.73 | 0.3431 | OHARA S-FPM2 |
| 14 | 16.926 | 2.87 | 1.85026 | 32.27 | 0.3145 | OHARA S-LAH71 |
| 15 | 30.040 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19* | 25.662 | 4.50 | 1.43875 | 94.94 | 0.3529 | OHARA S-FPL53 |
| 20 | −107.684 | 0.20 | | | | |
| 21 | 39.448 | 3.48 | 1.49700 | 81.54 | 0.3501 | OHARA S-FPL51 |
| 22 | −244.335 | 0.20 | | | | |
| 23 | 30.534 | 4.06 | 1.49700 | 81.54 | 0.3501 | OHARA S-FPL51 |
| 24 | −65.075 | 3.64 | 1.80610 | 40.93 | 0.3289 | OHARA S-LAH53 |
| 25 | 19.436 | 4.53 | | | | |
| 26 | 385.080 | 1.50 | 1.48749 | 70.24 | 0.3633 | OHARA S-FSL5 |
| 27 | 20.000 | 3.89 | 1.54814 | 45.78 | 0.3331 | OHARA S-TIL1 |
| 28 | −99.699 | 4.081 | | | | |
| 29 | 17.333 | 3.88 | 1.49700 | 81.54 | 0.3501 | OHARA S-FPL51 |
| 30 | −196.841 | 0.87 | | | | |
| 31 | 106.050 | 3.93 | 1.48749 | 70.24 | 0.3633 | OHARA S-FSL5 |
| 32 | −46.918 | 4.82 | 1.69350 | 53.20 | 0.3455 | OHARA S-LAL13 |
| 33 | 19.815 | 5.45 | | | | |
| 34 | −145.623 | 4.36 | 1.78472 | 25.68 | 0.3059 | OHARA S-TIH11 |
| 35 | −6.064 | 1.50 | 1.83481 | 42.72 | 0.3314 | OHARA S-LAH55V |
| 36 | 10.300 | 19.697 | | | | |
| 37 | ∞ | 3.50 | 1.51633 | 64.14 | | VARIOUS FILTER |
| 38 | ∞ | 1.000 | | | | |

Diffractive Surface; Third Surface
  $λ=587.56$ (nm), $C_4=2.07977×10^{-5}$, $C_6=9.76351×10^{-10}$
Aspheric Surface; Nineteenth Surface
  $K=0.0$, $A_4=-7.21843×10^{-6}$, $A_6=-6.52396×10^{-9}$, $A_8=4.67279×10^{-12}$

VARIABLE INTERVAL

| | WIDE ANGLE END f = 34.04 | INTERMEDIATE FOCAL DISTANCE f = 182.3 | TELEPHOTO END f = 972.8 |
|---|---|---|---|
| A | 5.846 | 75.128 | 87.903 |
| B | 65.173 | 6.100 | 47.276 |
| C | 67.232 | 57.023 | 3.072 |

MAGNIFICATION OF EACH LENS GROUP

| | WIDE ANGLE END f = 34.04 | INTERMEDIATE FOCAL DISTANCE f = 182.3 | TELEPHOTO END f = 972.8 |
|---|---|---|---|
| SECOND LENS GROUP | −0.847 | 11.221 | 3.093 |

-continued

MAGNIFICATION OF EACH LENS GROUP

| | WIDE ANGLE END f = 34.04 | INTERMEDIATE FOCAL DISTANCE f = 182.3 | TELEPHOTO END f = 972.8 |
|---|---|---|---|
| THIRD LENS GROUP | 0.188 | −0.0758 | −1.469 |
| FOURTH LENS GROUP | −0.749 | −0.749 | −0.749 |
| EXTENDER | 1.996 | 1.996 | 1.996 |

Conditional Expression Numerical Value $f_{TC}/f_{DOE}=0.405$ $f_E/f_W=-1.02$ (NUMERICAL EXAMPLE 10)
WHEN EXTENDER IS NOT PROVIDED
f = 17.1 to 487, F = 4.00 to 6.96, ω = 14.1 to 0.470

| SURFACE NUMBER | r | d | $n_d$ | $v_d$ | $\theta_{C,A'}$ | GLASS TYPE NAME |
|---|---|---|---|---|---|---|
| 01 | 172.744 | 2.50 | 1.78800 | 47.37 | 0.3383 | OHARA S-LAH64 |
| 02 | 81.144 | 0.78 | | | | |
| 03 | 80.286 | 9.17 | 1.43875 | 94.94 | 0.3529 | OHARA S-FPL53 |
| 04 | 505.373 | 0.20 | | | | |
| 05 | 98.978 | 2.50 | 1.51742 | 52.43 | 0.3410 | OHARA S-NSL36 |
| 06 | 68.083 | 0.96 | | | | |
| 07 | 69.238 | 10.05 | 1.43875 | 94.94 | 0.3529 | OHARA S-FPL53 |
| 08 | 368.951 | 0.20 | | | | |
| 09 | 82.756 | 9.61 | 1.43875 | 94.94 | 0.3529 | OHARA S-FPL53 |
| 10 | 5833.436 | VARIABLE(A) | | | | |
| 11 | −104.036 | 2.00 | 1.59522 | 67.73 | 0.3431 | OHARA S-FPM2 |
| 12 | 211.482 | 0.20 | | | | |
| 13 | 86.251 | 7.34 | 1.80000 | 29.84 | 0.3117 | OHARA S-NBH55 |
| 14 | −50.501 | 2.00 | 1.74320 | 49.34 | 0.3414 | OHARA S-LAM60 |
| 15 | 33.103 | VARIABLE(B) | | | | |
| 16 | −46.420 | 1.50 | 1.60300 | 65.44 | 0.3498 | OHARA S-PHM53 |
| 17 | 16.928 | 2.36 | 1.85026 | 32.27 | 0.3145 | OHARA S-LAH71 |
| 18 | 30.729 | VARIABLE(C) | | | | |
| 19 | ∞ | 1.00 | 1.51633 | 64.14 | | FILTER |
| 20 | ∞ | 0.90 | | | | |
| 21 | APERTURE | 3.50 | | | | |
| 22 | 75.345 | 3.41 | 1.49700 | 81.54 | 0.3501 | OHARA S-FPL51 |
| 23 | −86.106 | 1.70 | | | | |
| 24 | 70.964 | 3.31 | 1.49700 | 81.54 | 0.3501 | OHARA S-FPL51 |
| 25 | −117.159 | 0.20 | | | | |
| 26 | 41.750 | 4.51 | 1.49700 | 81.54 | 0.3501 | OHARA S-FPL51 |
| 27 | −45.320 | 1.50 | 1.83400 | 37.16 | 0.3245 | OHARA S-LAH60 |
| 28 | 50.233 | 1.71 | | | | |
| 29 | 629.774 | 1.50 | 1.48749 | 70.24 | 0.3633 | OHARA S-FSL5 |
| 30 | 20.000 | 5.48 | 1.51742 | 52.43 | 0.3410 | OHARA S-NSL36 |
| 31 | −63.386 | 64.546 | | | | |
| 32 | ∞ | 3.50 | 1.51633 | 64.14 | | VARIOUS FILTER |
| 33 | ∞ | 1.000 | | | | |

VARIABLE INTERVAL

| | WIDE ANGLE END f = 17.08 | INTERMEDIATE FOCAL DISTANCE f = 91.51 | TELEPHOTO END f = 487.2 |
|---|---|---|---|
| A | 6.436 | 70.816 | 83.849 |
| B | 61.795 | 6.263 | 43.915 |
| C | 62.699 | 53.851 | 3.166 |

MAGNIFICATION OF EACH LENS GROUP

| | WIDE ANGLE END f = 17.08 | INTERMEDIATE FOCAL DISTANCE f = 91.51 | TELEPHOTO END f = 487.2 |
|---|---|---|---|
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |

Conditional Expression Numerical Value $m_{2T}/m_{2W} = -4.28$ $m_{3T}/m_{3W} = -6.67$ $(m_{3T}/m_{3W})/(m_{2T}/m_{2W}) = 1.56$ $(D_{34W} - D_{34T})/f_w = 3.49$ $L_4/T_{4F-I} = 0.256$ $v_{1GP} = 94.9$ $v_{4GP} = 81.5$ $f_1/f_W = 7.94$ $f_2/f_W = -2.84$ $f_3/f_W = -2.24$ $f_4/f_W = 2.66$ Telephoto Ratio at Telephoto End: 0.575

(NUMERICAL EXAMPLE 10)
WHEN EXTENDER IS PROVIDED
f = 33.9 to 968, F = 7.96 to 13.8, ω = 6.78 to 0.235

| SURFACE NUMBER | r | d | $n_d$ | $v_d$ | $\theta_{C,A'}$ | GLASS TYPE NAME |
|---|---|---|---|---|---|---|
| 01 | 172.744 | 2.50 | 1.78800 | 47.37 | 0.3383 | OHARA S-LAH64 |
| 02 | 81.144 | 0.78 | | | | |
| 03 | 80.286 | 9.17 | 1.43875 | 94.94 | 0.3529 | OHARA S-FPL53 |
| 04 | 505.373 | 0.20 | | | | |
| 05 | 98.978 | 2.50 | 1.51742 | 52.43 | 0.3410 | OHARA S-NSL36 |
| 06 | 68.083 | 0.96 | | | | |
| 07 | 69.238 | 10.05 | 1.43875 | 94.94 | 0.3529 | OHARA S-FPL53 |
| 08 | 368.951 | 0.20 | | | | |
| 09 | 82.756 | 9.61 | 1.43875 | 94.94 | 0.3529 | OHARA S-FPL53 |
| 10 | 5833.436 | VARIABLE(A) | | | | |
| 11 | −104.036 | 2.00 | 1.59522 | 67.73 | 0.3431 | OHARA S-FPM2 |
| 12 | 211.482 | 0.20 | | | | |
| 13 | 86.251 | 7.34 | 1.80000 | 29.84 | 0.3117 | OHARA S-NBH55 |
| 14 | −50.501 | 2.00 | 1.74320 | 49.34 | 0.3414 | OHARA S-LAM60 |
| 15 | 33.103 | VARIABLE(B) | | | | |
| 16 | −46.420 | 1.50 | 1.60300 | 65.44 | 0.3498 | OHARA S-PHM53 |
| 17 | 16.928 | 2.36 | 1.85026 | 32.27 | 0.3145 | OHARA S-LAH71 |
| 18 | 30.729 | VARIABLE(C) | | | | |
| 19 | ∞ | 1.00 | 1.51633 | 64.14 | | FILTER |
| 20 | ∞ | 0.90 | | | | |
| 21 | APERTURE | 3.50 | | | | |
| 22 | 75.345 | 3.41 | 1.49700 | 81.54 | 0.3501 | OHARA S-FPL51 |
| 23 | −86.106 | 1.70 | | | | |
| 24 | 70.964 | 3.31 | 1.49700 | 81.54 | 0.3501 | OHARA S-FPL51 |
| 25 | −117.159 | 0.20 | | | | |
| 26 | 41.750 | 4.51 | 1.49700 | 81.54 | 0.3501 | OHARA S-FPL51 |
| 27 | −45.320 | 1.50 | 1.83400 | 37.16 | 0.3245 | OHARA S-LAH60 |
| 28 | 50.233 | 1.71 | | | | |
| 29 | 629.774 | 1.50 | 1.48749 | 70.24 | 0.3633 | OHARA S-FSL5 |
| 30 | 20.000 | 5.48 | 1.51742 | 52.43 | 0.3410 | OHARA S-NSL36 |
| 31 | −63.386 | 4.949 | | | | |
| 32 | 17.945 | 4.37 | 1.49700 | 81.54 | 0.3501 | OHARA S-FPL51 |
| 33 | −70.751 | 1.10 | | | | |
| 34 | −162.994 | 2.84 | 1.48749 | 70.24 | 0.3633 | OHARA S-FSL5 |
| 35 | −22.360 | 1.50 | 1.60562 | 43.71 | 0.3289 | OHARA S-BAM4 |
| 36 | 54.030 | 8.25 | | | | |
| 37 | −56.960 | 2.65 | 1.84666 | 23.78 | 0.3035 | OHARA S-TIH53 |
| 38 | −8.945 | 1.50 | 1.80400 | 46.58 | 0.3371 | OHARA S-LAH65V |
| 39 | 11.006 | 37.387 | | | | |
| 40 | ∞ | 3.50 | 1.51633 | 64.14 | | VARIOUS FILTER |
| 41 | ∞ | 1.000 | | | | |

VARIABLE INTERVAL

| | WIDE ANGLE END f = 34.18 | INTERMEDIATE FOCAL DISTANCE f = 183.1 | TELEPHOTO END f = 974.9 |
|---|---|---|---|
| A | 6.436 | 70.816 | 83.349 |
| B | 61.795 | 6.263 | 43.915 |
| C | 62.699 | 53.851 | 3.166 |

MAGNIFICATION OF EACH LENS GROUP

| | WIDE ANGLE END f = 34.18 | INTERMEDIATE FOCAL DISTANCE f = 183.1 | TELEPHOTO END f = 974.9 |
|---|---|---|---|
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |
| EXTENDER | 2.001 | 2.001 | 2.001 |

Conditional Expression Numerical Value $f_{TC}/f_{DOE}$=NA $f_E/f_W$=−1.72

Figure 62:
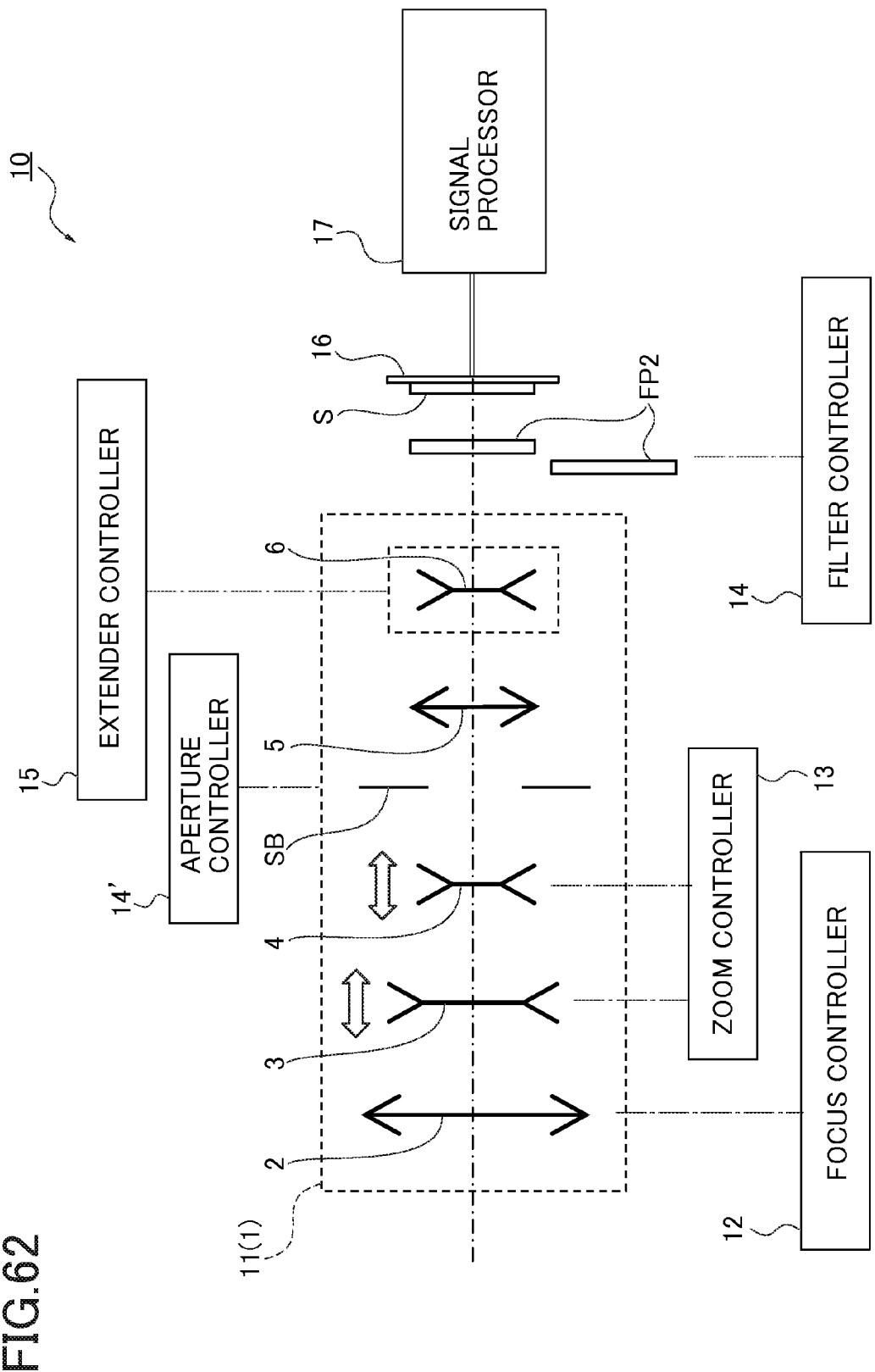
FIG. 62 is a view illustrating one example of an imaging device.

Next, an imaging device 10 to which the zoom lens 1 according to Embodiment 2 is applied will be described with reference to FIG. 62.

The imaging device 10 includes a photographing lens 11 and an imaging element 16 (for example, area sensor). The above-described zoom lens 1 can be used for the photographing lens 11. The focusing of the photographing lens 11 is controlled by a focus controller 12. Namely, the focusing operation is performed by the focus controller 12.

The zooming is controlled by a zoom controller 13. Namely, the zooming operation is performed by the zoom controller 13. The aperture SB is controlled by an aperture stop controller 14'. A filter such as a plane parallel plate FP2 is inserted in and removed from a photographing optical path by a filter controller 14, and the extender lens group 6 is inserted in and removed from the photographing optical path by an extender controller 15. The aperture controller 14' controls F-number by changing the diameter of the aperture SB. The filter controller 14 switches, for example, an infrared light cut filter and a visible light cut filter.

A subject image is formed on the image surface S of the imaging element 16 by the photographing lens 11. The imaging element 16 photoelectrically converts the subject image formed on the image surface, and outputs the converted subject image to a signal processor 17 as an image signal.

The signal processor 17 processes the image signal, and converts the image signal into digital information. The image information digitized by the signal processor 17 receives a predetermined image process in a not-shown image processor, is recorded in a not-shown semiconductor memory or the like, and is transferred outside by a not-shown communication device.

An image during photographing can be displayed on a not-shown monitor, or the image recorded in a semiconductor memory or the like can be displayed on the monitor.

According to the imaging device 10 as described above, the zoom lens 1 of Numerical Examples 6 to 10 can be used as the photographing lens 11, so that the compact imaging device 10, which corresponds to seamless imaging from a visible region to a near-infrared region, uses the imaging element 16 having 2 million pixels or more, and provides a high quality image, can be achieved.

Consequently, the compact and lightweight zoom lens 1 can be provided. Such a zoom lens 1 has the small number of lenses, a telephoto ratio (ratio of total length of lens relative to focal distance) of less than 0.60 at the telephoto end, a resolution corresponding to an imaging element having 2 million pixels or more, a zoom ratio exceeding 25:1, and a built-in extender of about 2×. A compact and lightweight imaging device, which provides a high image quality and has a high zoom ratio, can be achieved.

According to this embodiment, the high performance zoom lens 1 in which a chromatic aberration in a telephoto region is further preferably compensated can be provided. Therefore, a user-friendly imaging device in which deterioration in image quality is reduced in an important telephoto region for monitoring can be provided.

According to this embodiment, the high performance zoom lens 1 in which the chromatic aberration in the entire zoom area can be compensated with good balance can be provided. A user-friendly imaging device which provides a high image quality can be achieved.

According to this embodiment, the zoom lens 1 further suitable for a high performance and downsizing can be provided by controlling the contribution of the third lens group 4 to the aberration correction. Therefore, a compact imaging device having a high resolution over an entire image can be provided.

Moreover, the second and third lens groups 3, 4 are appropriately used for zooming, so that the zoom lens 1 further suitable for downsizing and a high zoom ratio can be provided. A compact imaging device having a sufficient high zoom ratio can be thus provided.

Furthermore, the fourth lens group 5 is appropriately disposed relative to the image surface S, and the back focusing is sufficiently ensured. Consequently, the higher performance zoom lens 1 can be provided. An imaging device in which a filter switching mechanism or the like is comfortably disposed can be provided.

In addition, since the appropriate configuration examples of each lens group are illustrated, the zoom lens 1 can be realized. Accordingly, a compact and lightweight imaging device having a high zoom ratio can be reliably achieved. In such an imaging device, deterioration in image quality and focusing fluctuation from a visible region to a near-infrared region can be controlled.

The user-friendly and high performance zoom lens 1 can be provided. In such a zoom lens 1, the movable lens group is limited for zooming, so that the entire length of the zoom lens 1 is not changed, and the zoom lens 1 is well balanced.

Moreover, a compact and lightweight imaging device using a compact and lightweight zoom lens can be provided. Such a zoom lens has the small number of lenses, a telephoto ratio (ratio of total length of lens relative to focal distance) of less than 0.60 at the telephoto end, a resolution corresponding to an imaging element having 2 million pixels or more, a zoom ratio exceeding 25:1, and a built-in extender of about 2×. Therefore, a user can perform imaging from a visible region to a near-infrared region with less stress.

According to the embodiments of the present invention, a compact zoom lens in which aberrations are preferably compensated can be provided.

What is claimed is:

1. A zoom lens comprising, in order from an object side to an image surface side:

a first lens group having a positive refractive power;

a second lens group having a negative refractive power;

a third lens group having a negative refractive power; and a fourth lens group having a positive refractive power, the second lens group and the third lens group being moved such that the second lens group is located on a most object side at a wide-angle end and the third lens group is located on a most image surface side at a telephoto end during zooming, wherein the following conditional expressions are satisfied where $m_{2W}$ denotes a magnification of the second lens group at the wide-angle end, $m_{2T}$ denotes a magnification of the second lens group at the telephoto end, $m_{3W}$ denotes a magnification of the third lens group at the wide-angle end, and $m_{3T}$ denotes a magnification of the third lens group at the telephoto end $$m_{2T}/m_{2W}<0.0$$

$$m_{3T}/m_{3W}<0.0$$

$$0.80<(m_{3T}/m_{3W})/(m_{2T}/m_{2W})<3.00, \text{ and}$$

the following conditional expression is satisfied where $D_{34W}$ denotes a distance between the third lens group and the fourth lens group at the wide-angle end, $D_{34T}$ denotes a distance between the third lens group and the fourth lens group at the telephoto end, and $f_w$ denotes a focal distance of an entire system at the wide-angle end, $$2.5<(D_{34W}-D_{34T})/f_w<6.0.$$

2. The zoom lens according to claim 1, wherein the following conditional expression is satisfied where $L_4$ denotes a distance along the optical axis from a most object side surface to a most image side surface of the fourth lens group, and $T_{4F-I}$ denotes a distance along the optical axis from the most object side surface of the fourth lens group to the image surface and an air conversion length when it is assumed that there is no optical element without having a refractive power on the image surface side of the fourth lens group, $$0.2<L_4/T_{4F-I}<0.5.$$

3. The zoom lens according to claim 1, wherein the following conditional expression is satisfied where $v_{1GP}$ denotes an average value of Abbe's number of a material of a positive lens in the first lens group, $$75<v_{1GP}<96.$$

4. The zoom lens according to claim 3, wherein
the first lens group is made of three lenses including, in order from the object side, a negative meniscus lens having a concave surface on the image surface side, a positive lens having a convex surface on the object side, the convex surface having an absolute value of a curvature radius smaller than that on the image side, and a positive lens having a convex surface on the object side, the convex surface having an absolute value of a curvature radius smaller than that on the image side, and
the first lens group includes a diffraction optical element.

5. The zoom lens according to claim 4, wherein the following conditional expression is satisfied where $f_T$ denotes a focal distance of an entire system at the telephoto end, and $f_{DOE}$ denotes a focal distance of a diffraction section of the diffraction optical element, $$0.01<f_T/f_{DOE}<0.05.$$

6. The zoom lens according to claim 3, wherein
the first lens group is made of five lenses including, in order from the object side, a negative meniscus lens having a concave surface on the image surface side, a positive lens having a convex surface on the object side, the convex surface having an absolute value of a curvature radius smaller than that on the image side, a negative meniscus lens having a concave surface on the image surface side, a positive lens having a convex surface on the object side, the convex surface having an absolute value of a curvature radius smaller than that on the image side, and a positive lens having a convex surface on the object side, the convex surface having an absolute value of a curvature radius smaller than that on the image side.

7. The zoom lens according to claim 1, wherein
the fourth lens group includes, in order from the object side, at least three positive lenses, and
the following conditional expression is satisfied where $v_{4GP}$ denotes an average value of Abbe's number of at least three positive lenses, $$75<v_{4GP}<96.$$

8. The zoom lens according to claim 1, wherein the second lens group includes three lenses or less.

9. The zoom lens according to claim 1, wherein the first lens group and the fourth lens group are fixed relative to the image surface during zooming.

10. A zoom lens comprising, in order from an object side to an image surface side:
a first lens group having a positive refractive power;
a second lens group having a negative refractive power;
a third lens group having a negative refractive power;
a fourth lens group having a positive refractive power; and
an extender lens group insertably and removably provided on the image side of the fourth lens group so as to change a focal distance of an entire system to be increased without changing a distance between each lens group from the first lens group to the fourth lens group and the image surface,
the second lens group and the third lens group being moved such that the second lens group is located on a most object side at a wide-angle end and the third lens group is located on a most image surface side at a telephoto end during zooming, wherein
the following conditional expressions are satisfied where $m_{2W}$ denotes a magnification of the second lens group at the wide-angle end, $m_{2T}$ denotes a magnification of the second lens group at the telephoto end, $m_{3W}$ denotes a magnification of the third lens group at the wide-angle end, and $m_{3T}$ denotes a magnification of the third lens group at the telephoto end, $$m_{2T}/m_{2W}<0.0$$

$$m_{3T}/m_{3W}<0.0$$

$$0.80<(m_{3T}/m_{3W})/(m_{2T}/m_{2W})<3.00, \text{ and}$$

the following conditional expression is satisfied where $D_{34W}$ denotes a distance between the third lens group and the fourth lens group at the wide-angle end, $D_{34T}$ denotes a distance between the third lens group and the fourth lens group at the telephoto end, and $f_w$ denotes a focal distance of an entire system at the wide-angle end, $$2.5<(D_{34W}-D_{34T})/f_w<6.0.$$

11. The zoom lens according to claim 10, wherein the following conditional expression is satisfied where $L_4$ denotes a distance along the optical axis from the most object side surface to the most image side surface of the fourth lens group, and $T_{4F-I}$ denotes a distance along the optical axis from the most object side surface of the fourth lens group to the image surface and an air conversion length when it is assumed that there is no optical element without having a refractive power on the image surface side of the fourth lens group, $$0.2<L_4/T_{4F-I}<0.5.$$

12. The zoom lens according to claim 10, wherein the following conditional expression is satisfied where $v_{1GP}$ denotes an average value of Abbe's number of a material of a positive lens in the first lens group, $$75<v_{1GP}<96.$$

13. The zoom lens according to claim 12, wherein
the first lens group is made of three lenses including, in order from the object side, a negative meniscus lens having a concave surface on the image surface side, a positive lens having a convex surface on the object side, the convex surface having an absolute value of a curvature radius smaller than that on the image side, and a positive lens having a convex surface on the object side, the convex surface having an absolute value of a curvature radius smaller than that on the image side, and
the first lens group includes a diffraction optical element.

14. The zoom lens according to claim 13, wherein the following conditional expression is satisfied where $f_{TC}$ denotes a focal distance of the entire system at the telephoto end with the extender lens group being inserted, and $f_{DOE}$ denotes a focal distance of a diffraction section of the diffraction optical element, $$0.02 < f_{TC}/f_{DOE} < 0.10.$$

15. The zoom lens according to claim 12, wherein the first lens group is made of five lenses including, in order from the object side, a negative meniscus lens having a concave surface on the image surface side, a positive lens having a convex surface on the object side, the convex surface having an absolute value of a curvature radius smaller than that on the image side, a negative meniscus lens having a concave surface on the image surface side, a positive lens having a convex surface on the object side, the convex surface having an absolute value of a curvature radius smaller than that on the image side, and a positive lens having a convex surface on the object side, the convex surface having an absolute value of a curvature radius smaller than that on the image side.

16. The zoom lens according to claim 10, wherein
the fourth lens group includes in order from the object side at least three positive lenses, and
the following conditional expression is satisfied where $v_{4GP}$ denotes an average value of Abbe's number of at least three positive lenses, $$75 < v_{4GP} < 96.$$

17. The zoom lens according to claim 10, wherein the second lens group includes three lenses or less.

18. The zoom lens according to claim 10, wherein the first lens group and the fourth lens group are fixed relative to the image surface during zooming.

* * * * *